US010779190B2

(12) United States Patent
Nogami et al.

(10) Patent No.: US 10,779,190 B2
(45) Date of Patent: Sep. 15, 2020

(54) TERMINAL DEVICE, BASE STATION DEVICE, AND COMMUNICATION METHOD

(71) Applicant: Sharp Kabushiki Kaisha, Sakai-shi, Osaka (JP)

(72) Inventors: Toshizo Nogami, Sakai (JP); Tatsushi Aiba, Sakai (JP); Shoichi Suzuki, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/113,858

(22) PCT Filed: Jan. 28, 2015

(86) PCT No.: PCT/JP2015/052323
§ 371 (c)(1),
(2) Date: Jul. 25, 2016

(87) PCT Pub. No.: WO2015/115465
PCT Pub. Date: Aug. 6, 2015

(65) Prior Publication Data
US 2016/0345199 A1    Nov. 24, 2016

(30) Foreign Application Priority Data

Jan. 30, 2014    (JP) .................. 2014-015303

(51) Int. Cl.
*H04W 72/04*    (2009.01)
*H04W 28/06*    (2009.01)
*H04W 76/27*    (2018.01)
*H04L 5/00*    (2006.01)
*H04W 72/00*    (2009.01)

(52) U.S. Cl.
CPC ............. *H04W 28/06* (2013.01); *H04L 5/003* (2013.01); *H04L 5/0007* (2013.01);
(Continued)

(58) Field of Classification Search
None
See application file for complete search history.

(56) References Cited

U.S. PATENT DOCUMENTS 9,503,892 B2 *  11/2016  Bashar .................. H04W 16/32
9,602,251 B2 *  3/2017   Yin ....................... H04L 1/1607
(Continued)

FOREIGN PATENT DOCUMENTS

JP    2013-243460 A    12/2013

OTHER PUBLICATIONS

ZTE, "Remaining Details of Signalling for TDD UL-DL Reconfiguration", 3GPP TSG RAN WG1 Meeting #75, R1-135365, Nov. 11-15, 2013, pp. 1-5.
(Continued)

*Primary Examiner* — Willie J Daniel, Jr.
(74) *Attorney, Agent, or Firm* — Keating & Bennett, LLP

(57) ABSTRACT

A first UL-DL configuration configured by using a common RRC message is set; an antenna port for one enhanced physical downlink control channel in a subframe is set based on whether or not the subframe is a predetermined special subframe in the first UL-DL configuration; and in a case where a second UL-DL configuration indicated by downlink control information which is transmitted on a physical downlink control channel is set, an antenna port for one enhanced physical downlink control channel in the subframe is set based on whether or not the subframe is the predetermined special subframe in the second UL-DL configuration.

10 Claims, 24 Drawing Sheets

(52) U.S. Cl.
CPC ......... *H04W 72/042* (2013.01); *H04W 76/27* (2018.02); *H04L 5/001* (2013.01); *H04W 72/00* (2013.01)

(56) References Cited

U.S. PATENT DOCUMENTS

| | | | |
|---|---|---|---|
| 9,660,931 B2 * | 5/2017 | Park | H04L 41/12 |
| 9,750,036 B2 * | 8/2017 | Seo | H04J 11/004 |
| 2013/0194931 A1 | 8/2013 | Lee et al. | |
| 2015/0131605 A1 | 5/2015 | Nogami et al. | |
| 2016/0234860 A1 * | 8/2016 | Shimezawa | H04L 1/0026 |

OTHER PUBLICATIONS

LG Electronics, "Details of UL-DL Reconfiguration Message", 3GPP TSG RAN WG1 Meeting #74bis, R1-134387, Oct. 7-11, 2013, pp. 1-7.

Official Communication issued in International Patent Application No. PCT/JP2015/052323, dated Apr. 28, 2015.

"3rd Generation Partnership Project; Technical Specification Group Radio Access Network; Evolved Universal Terrestrial Radio Access (E-UTRA); Physical Channels and Modulation (Release12)", 3GPP TS 36.211 V12.0.0, Dec. 2013, pp. 1-120.

Sharp, "Fallback Operation and Reliability Improvement of Explicit L1 Signalling for DL-UL Reconfiguration", 3GPP TSG RAN WG1 Meeting #74, R1-133228, Aug. 19-23, 2013, pp. 1-6.

CATT, "On Reconfiguration between Special Subframe and Downlink Subframe", 3GPP TSG-RAN WG1 Meeting #75, R1-135061, Nov. 11-15, 2013, pp. 1-3.

Ericsson et al., "Signalling support for dynamic TDD", 3GPP TSG-RAN WG1 Meeting #72, R1-130558, Jan. 28-Feb. 1, 2013, 3 pages.

Ericsson et al., "On standardization impact of TDD UL-DL adaptation", 3GPP TSG-RAN WG1 #69, R1-122016, May 21-25, 2012, pp. 1-3.

* cited by examiner

FIG. 6
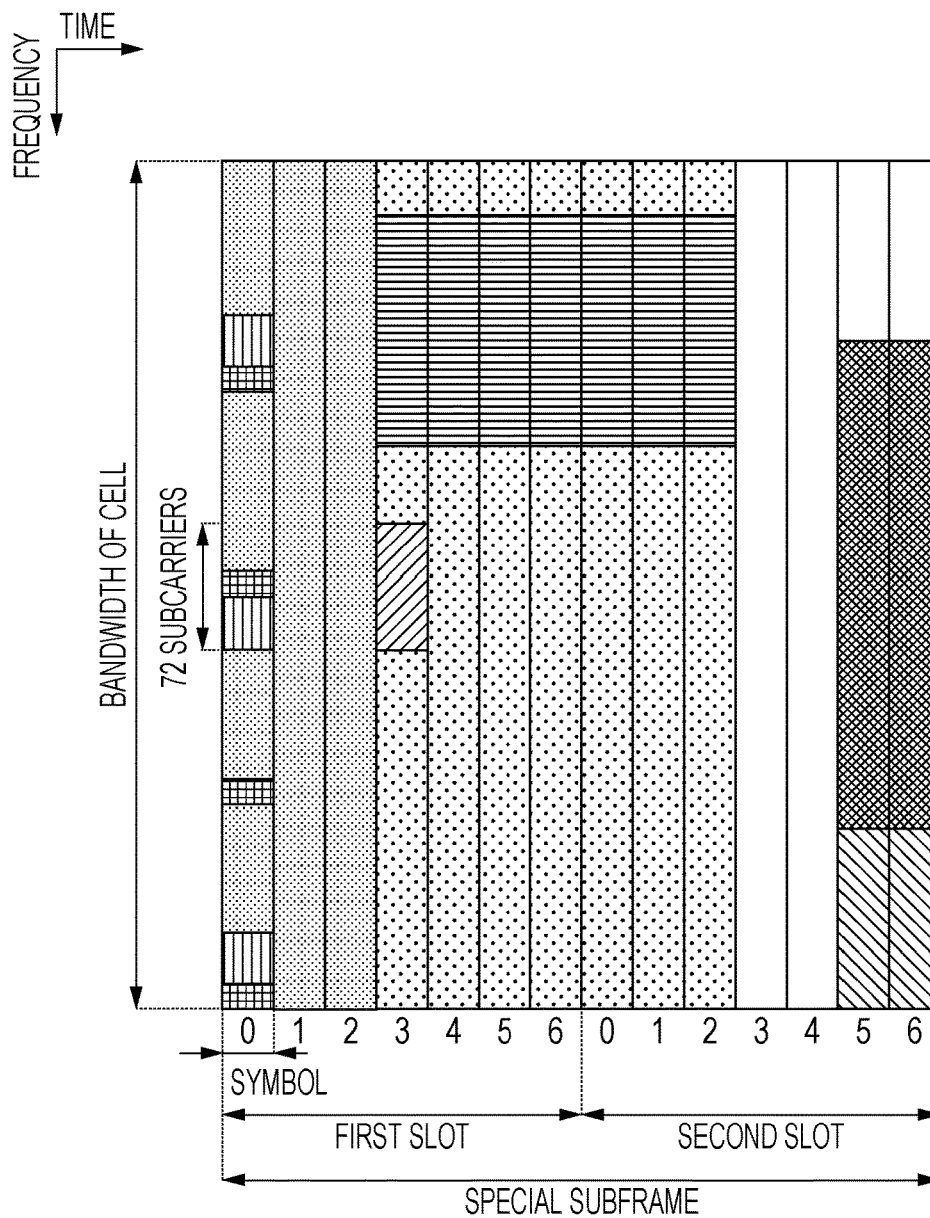
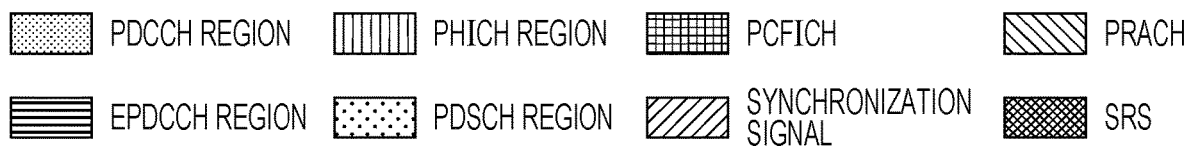

FIG. 7

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET# | (PRIMARY CELL UL-DL CONFIGURATION, SECONDARY CELL UL-DL CONFIGURATION) | SECONDARY CELL SECOND UL REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET# | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
|  | (1,0),(1,1),(1,6) | 1 |
|  | (2,0),(2,2),(2,1),(2,6) | 2 |
|  | (3,0),(3,3),(3,6) | 3 |
|  | (4,0),(4,1),(4,3),(4,4),(4,6) | 4 |
|  | (5,0),(5,1),(5,2),(5,3),(5,4),(5,5),(5,6) | 5 |
|  | (6,0),(6,6) | 6 |
| SET 2 | (0,1),(6,1) | 1 |
|  | (0,2),(1,2),(6,2) | 2 |
|  | (0,3),(6,3) | 3 |
|  | (0,4),(1,4),(3,4),(6,4) | 4 |
|  | (0,5),(1,5),(2,5),(3,5),(4,5),(6,5) | 5 |
|  | (0,6) | 6 |
| SET 3 | (3,1),(1,3) | 4 |
|  | (3,2),(4,2),(2,3),(2,4) | 5 |
| SET 4 | (0,1),(02),(0,3),(0,4),(0,5),(0,6) | 0 |
|  | (1,2),(1,4),(1,5) | 1 |
|  | (2,5) | 2 |
|  | (3,4),(3,5) | 3 |
|  | (4,5) | 4 |
|  | (6,1),(6,2),(6,3),(6,4),(6,5) | 6 |
| SET 5 | (1,3) | 1 |
|  | (2,3),(2,4) | 2 |
|  | (3,1),(3,2) | 3 |
|  | (4,2) | 4 |

FIG. 13

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 14

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| SPECIAL SUBFRAME CONFIGURATION | NORMAL CYCLIC PREFIX IN DOWNLINK | | | EXTENDED CYCLIC PREFIX IN DOWNLINK | | |
|---|---|---|---|---|---|---|
| | DwPTS | UpPTS | | DwPTS | UpPTS | |
| | | NORMAL CYCLIC PREFIX IN UPLINK | EXTENDED CYCLIC PREFIX IN UPLINK | | NORMAL CYCLIC PREFIX IN UPLINK | EXTENDED CYCLIC PREFIX IN UPLINK |
| 0 | 6592·Ts | 2192·Ts | 2560·Ts | 7680·Ts | 2192·Ts | 2560·Ts |
| 1 | 19760·Ts | 2192·Ts | 2560·Ts | 20480·Ts | 2192·Ts | 2560·Ts |
| 2 | 21952·Ts | 2192·Ts | 2560·Ts | 23040·Ts | 2192·Ts | 2560·Ts |
| 3 | 24144·Ts | 2192·Ts | 2560·Ts | 25600·Ts | 2192·Ts | 2560·Ts |
| 4 | 26336·Ts | 2192·Ts | 2560·Ts | 7680·Ts | 4384·Ts | 5120·Ts |
| 5 | 6592·Ts | 4384·Ts | 5120·Ts | 20480·Ts | 4384·Ts | 5120·Ts |
| 6 | 19760·Ts | 4384·Ts | 5120·Ts | 23040·Ts | 4384·Ts | 5120·Ts |
| 7 | 21952·Ts | 4384·Ts | 5120·Ts | 12800·Ts | — | — |
| 8 | 24144·Ts | 4384·Ts | 5120·Ts | — | — | — |
| 9 | 13168·Ts | 4384·Ts | 5120·Ts | — | — | — |

FIG. 17

| | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| UL REFERENCE UL-DL CONFIGURATION 0 | D | S | U | U | U | D | S | U | U | U |
| DL REFERENCE UL-DL CONFIGURATION 2 | D | S | U | D | D | D | S | U | D | D |
| THIRD UL-DL CONFIGURATION 4 | D | S | U | U | D | D | D | D | D | D |

FIG. 18

| | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| UL REFERENCE UL-DL CONFIGURATION 0 | D | S | U | U | U | D | S | U | U | U |
| DL REFERENCE UL-DL CONFIGURATION 3 | D | S | U | U | U | D | D | D | D | D |
| THIRD UL-DL CONFIGURATION 4 | D | S | U | U | D | D | D | D | D | D |

FIG. 19

| | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| UL REFERENCE UL-DL CONFIGURATION 0 | D | S | U | U | U | D | S | U | U | U |
| DL REFERENCE UL-DL CONFIGURATION 4 | D | S | U | U | D | D | D | D | D | D |
| THIRD UL-DL CONFIGURATION 2 | D | S | U | D | D | D | S | U | D | D |

FIG. 20

| | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| UL REFERENCE UL-DL CONFIGURATION 0 | D | S | U | U | U | D | S | U | U | U |
| DL REFERENCE UL-DL CONFIGURATION 4 | D | S | U | U | D | D | D | D | D | D |
| THIRD UL-DL CONFIGURATION 3 | D | S | U | U | U | D | D | D | D | D |

FIG. 21

| EPDCCH FORMAT | NUMBER OF ECCEs FOR ONE EPDCCH | | | |
|---|---|---|---|---|
| | CASE A | | CASE B | |
| | LOCALIZED TRANSMISSION | DISTRIBUTED TRANSMISSION | LOCALIZED TRANSMISSION | DISTRIBUTED TRANSMISSION |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | - | 32 | - | 16 |

FIG. 22

| $N^{Xp}_{RB}$ | NUMBER $M^{(L)}_p$ OF EPDCCH CANDIDATES IN CASE 1 | | | | | NUMBER $M^{(L)}_p$ OF EPDCCH CANDIDATES IN CASE 2 | | | | |
|---|---|---|---|---|---|---|---|---|---|---|
| | L=2 | L=4 | L=8 | L=16 | L=32 | L=1 | L=2 | L=4 | L=8 | L=16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

FIG. 23

| $N^{Xp}_{RB}$ | NUMBER $M^{(L)}_p$ OF EPDCCH CANDIDATES IN CASE 3 | | | | |
|---|---|---|---|---|---|
| | L=1 | L=2 | L=4 | L=8 | L=16 |
| 2 | 8 | 4 | 2 | 1 | 0 |
| 4 | 4 | 5 | 4 | 2 | 1 |
| 8 | 4 | 4 | 4 | 2 | 2 |

FIG. 24

| $N^{Xp}_{RB}$ | NUMBER $M^{(L)}_p$ OF EPDCCH CANDIDATES IN CASE 1 | | | | NUMBER $M^{(L)}_p$ OF EPDCCH CANDIDATES IN CASE 2 | | | |
|---|---|---|---|---|---|---|---|---|
| | L=2 | L=4 | L=8 | L=16 | L=1 | L=2 | L=4 | L=8 |
| 2 | 4 | 2 | 1 | 0 | 4 | 2 | 1 | 0 |
| 4 | 8 | 4 | 2 | 1 | 8 | 4 | 2 | 1 |
| 8 | 6 | 6 | 2 | 2 | 6 | 6 | 2 | 2 |

FIG. 25

| $N^{Xp}_{RB}$ | NUMBER $M^{(L)}_p$ OF EPDCCH CANDIDATES IN CASE 3 | | | |
|---|---|---|---|---|
| | L=1 | L=2 | L=4 | L=8 |
| 2 | 8 | 4 | 2 | 1 |
| 4 | 6 | 6 | 2 | 2 |
| 8 | 6 | 6 | 2 | 2 |

FIG. 26

| $N^{Xp1}_{RB}$ | $N^{Xp2}_{RB}$ | NUMBER $M^{(L)}_{p1}$ and $M^{(L)}_{p2}$ OF EPDCCH CANDIDATES IN CASE 1 | | | | | NUMBER $M^{(L)}_{p1}$ and $M^{(L)}_{p2}$ OF EPDCCH CANDIDATES IN CASE 2 | | | | |
|---|---|---|---|---|---|---|---|---|---|---|---|
| | | L=2 | L=4 | L=8 | L=16 | L=32 | L=1 | L=2 | L=4 | L=8 | L=16 |
| 2 | 2 | 4,4 | 2,2 | 1,1 | 0,0 | 0,0 | 4,4 | 2,2 | 1,1 | 0,0 | 0,0 |
| 4 | 4 | 3,3 | 3,3 | 1,1 | 1,1 | 0,0 | 3,3 | 3,3 | 1,1 | 1,1 | 0,0 |
| 8 | 8 | 3,3 | 2,2 | 1,1 | 1,1 | 1,1 | 3,3 | 2,2 | 1,1 | 1,1 | 1,1 |
| 4 | 2 | 5,3 | 3,2 | 1,1 | 1,0 | 0,0 | 5,3 | 3,2 | 1,1 | 1,0 | 0,0 |
| 8 | 2 | 4,2 | 4,2 | 1,1 | 1,0 | 1,0 | 4,2 | 4,2 | 1,1 | 1,0 | 1,0 |
| 8 | 4 | 3,3 | 2,2 | 2,1 | 1,1 | 1,0 | 3,3 | 2,2 | 2,1 | 1,1 | 1,0 |

FIG. 27

| $N^{Xp1}_{RB}$ | $N^{Xp2}_{RB}$ | NUMBER $M^{(L)}_{p1}$ and $M^{(L)}_{p2}$ OF EPDCCH CANDIDATES IN CASE 3 | | | | |
|---|---|---|---|---|---|---|
| | | L=1 | L=2 | L=4 | L=8 | L=16 |
| 2 | 2 | 2,2 | 3,3 | 2,2 | 1,1 | 0,0 |
| 4 | 4 | 2,2 | 2,2 | 2,2 | 1,1 | 1,1 |
| 8 | 8 | 2,2 | 2,2 | 2,2 | 1,1 | 1,1 |
| 2 | 2 | 3,1 | 3,2 | 3,1 | 1,1 | 1,0 |
| 8 | 2 | 3,1 | 4,1 | 3,1 | 1,1 | 1,0 |
| 8 | 8 | 2,2 | 2,2 | 2,2 | 1,1 | 1,1 |

FIG. 28

| $N^{Xp1}_{RB}$ | $N^{Xp2}_{RB}$ | NUMBER $M^{(L)}_{p1}$ and $M^{(L)}_{p2}$ OF EPDCCH CANDIDATES IN CASE 1 | | | | NUMBER $M^{(L)}_{p1}$ and $M^{(L)}_{p2}$ OF EPDCCH CANDIDATES IN CASE 2 | | | |
|---|---|---|---|---|---|---|---|---|---|
| | | L=2 | L=4 | L=8 | L=16 | L=1 | L=2 | L=4 | L=8 |
| 2 | 2 | 4,4 | 2,2 | 1,1 | 0,0 | 4,4 | 2,2 | 1,1 | 0,0 |
| 4 | 4 | 3,3 | 3,3 | 1,1 | 1,1 | 3,3 | 3,3 | 1,1 | 1,1 |
| 8 | 8 | 3,3 | 3,3 | 1,1 | 1,1 | 3,3 | 3,3 | 1,1 | 1,1 |
| 2 | 2 | 4,3 | 4,2 | 1,1 | 1,0 | 4,3 | 4,2 | 1,1 | 1,0 |
| 8 | 2 | 5,2 | 4,2 | 1,1 | 1,0 | 5,2 | 4,2 | 1,1 | 1,0 |
| 8 | 8 | 3,3 | 3,3 | 1,1 | 1,1 | 3,3 | 3,3 | 1,1 | 1,1 |

FIG. 29

| $N^{Xp1}_{RB}$ | $N^{Xp2}_{RB}$ | NUMBER $M^{(L)}_{p1}$ and $M^{(L)}_{p2}$ OF EPDCCH CANDIDATES IN CASE 3 | | | |
|---|---|---|---|---|---|
| | | L=1 | L=2 | L=4 | L=8 |
| 2 | 2 | 3,3 | 3,3 | 1,1 | 1,1 |
| 4 | 4 | 3,3 | 3,3 | 1,1 | 1,1 |
| 8 | 8 | 3,3 | 3,3 | 1,1 | 1,1 |
| 2 | 2 | 4,2 | 4,2 | 1,1 | 1,1 |
| 8 | 2 | 4,2 | 4,2 | 1,1 | 1,1 |
| 8 | 8 | 3,3 | 3,3 | 1,1 | 1,1 |

FIG. 30

| $N^{Xp1}_{RB}$ | $N^{Xp2}_{RB}$ | NUMBER $M^{(L)}_{p1}$ and $M^{(L)}_{p2}$ OF EPDCCH CANDIDATES IN CASE 1 | | | | | NUMBER $M^{(L)}_{p1}$ and $M^{(L)}_{p2}$ OF EPDCCH CANDIDATES IN CASE 2 | | | | |
|---|---|---|---|---|---|---|---|---|---|---|---|
| | | L=2 | L=4 | L=8 | L=16 | L=32 | L=1 | L=2 | L=4 | L=8 | L=16 |
| 2 | 2 | 4,4 | 2,2 | 1,1 | 0,0 | 0,0 | 4,4 | 2,2 | 1,1 | 0,0 | 0,0 |
| 4 | 4 | 4,2 | 4,3 | 0,2 | 0,1 | 0,0 | 4,2 | 4,3 | 0,2 | 0,1 | 0,0 |
| 8 | 8 | 4,1 | 4,2 | 0,2 | 0,2 | 0,1 | 4,1 | 4,2 | 0,2 | 0,2 | 0,1 |
| 2 | 4 | 4,3 | 2,4 | 0,2 | 0,1 | 0,0 | 4,3 | 2,4 | 0,2 | 0,1 | 0,0 |
| 2 | 8 | 4,1 | 2,2 | 0,4 | 0,2 | 0,1 | 4,1 | 2,2 | 0,4 | 0,2 | 0,1 |
| 4 | 4 | 5,2 | 4,2 | 1,1 | 1,0 | 0,0 | 5,2 | 4,2 | 1,1 | 1,0 | 0,0 |
| 4 | 8 | 4,1 | 4,2 | 0,2 | 0,2 | 0,1 | 4,1 | 4,2 | 0,2 | 0,2 | 0,1 |
| 8 | 2 | 5,1 | 4,2 | 2,1 | 1,0 | 0,0 | 5,1 | 4,2 | 2,1 | 1,0 | 0,0 |
| 8 | 4 | 6,1 | 4,2 | 0,2 | 0,1 | 0,0 | 6,1 | 4,2 | 0,2 | 0,1 | 0,0 |

FIG. 31

| $N^{Xp1}_{RB}$ | $N^{Xp2}_{RB}$ | NUMBER $M^{(L)}_{p1}$ and $M^{(L)}_{p2}$ OF EPDCCH CANDIDATES IN CASE 3 | | | | |
|---|---|---|---|---|---|---|
| | | L=1 | L=2 | L=4 | L=8 | L=16 |
| 2 | 2 | 4,1 | 4,2 | 2,2 | 0,1 | 0,0 |
| 4 | 4 | 4,1 | 4,1 | 2,2 | 0,1 | 0,1 |
| 8 | 8 | 4,1 | 4,1 | 2,2 | 0,1 | 0,1 |
| 2 | 4 | 4,1 | 4,1 | 2,2 | 0,1 | 0,1 |
| 2 | 8 | 4,1 | 4,1 | 2,2 | 0,1 | 0,1 |
| 4 | 2 | 4,1 | 4,1 | 2,2 | 1,1 | 0,0 |
| 4 | 8 | 4,1 | 4,1 | 2,2 | 0,1 | 0,1 |
| 8 | 2 | 4,1 | 4,1 | 4,1 | 0,1 | 0,0 |
| 8 | 4 | 4,1 | 4,1 | 2,2 | 0,1 | 0,1 |

FIG. 32

| ARO FIELD | $\Delta_{ARO}$ |
|---|---|
| 0 | 0 |
| 1 | -1 |
| 2 | -2 |
| 3 | 2 |

FIG. 33

| ARO FIELD | $\Delta_{ARO}$ |
|---|---|
| 0 | 0 |
| 1 | $-\sum_{i1=0}^{m-1} N_{ECCE,q,n-k_{i1}} - 2$ |
| 2 | $-\sum_{i1=m-\lceil m/3 \rceil}^{m-1} N_{ECCE,q,n-k_{i1}} - 1$ |
| 3 | 2 |

TERMINAL DEVICE, BASE STATION DEVICE, AND COMMUNICATION METHOD

TECHNICAL FIELD

The present invention relates to a terminal device, a base station device, and a communication method.

This application is based upon and claims the benefit of priority of the prior Japanese Patent Application No. 2014-015303, filed on Jan. 30, 2014, the entire contents of which are incorporated herein by reference.

BACKGROUND ART

A radio access scheme and a radio network (below referred to as "long term evolution (LTE)" or "evolved universal terrestrial radio access (EUTRA)") of the cellular mobile communication is examined in the 3rd Generation Partnership Project (3GPP). In LTE, a base station device is also referred to as an evolved NodeB (eNodeB), and a terminal device is also referred to as a user equipment (UE). The LTE is a cellular communication system in which a base station device covers an area, and a plurality of such areas is disposed so as to have a cell shape. A single base station device may manage a plurality of cells.

The LTE corresponds to time division duplex (TDD). LTE employing a TDD scheme is also referred to as TD-LTE or LTE TDD. Here, in TDD, an uplink signal and a downlink signal are subjected to time division duplex.

The 3GPP has examined that DL-UL Interference Management and Traffic Adaptation is applied to the TD-LTE. The traffic adaptation technique is a technique in which a ratio between uplink resources and downlink resources is changed depending on traffic of an uplink and traffic of a downlink. Here, the traffic adaptation technique is also referred to as dynamic TDD.

In NPL 1, a method using a flexible subframe is proposed as a method for realizing traffic adaptation. A base station device can receive an uplink signal or transmit a downlink signal in a flexible subframe. In NPL 1, a terminal device considers a flexible subframe as a downlink subframe as long as the base station device does not perform an instruction of transmission of an uplink signal in the flexible subframe.

NPL 1 discloses that a Hybrid Automatic Repeat reQuest (HARQ) timing for a physical downlink shared channel (PDSCH) is determined based on a UL-DL configuration (uplink-downlink configuration) (also referred to as a UL/DL configuration) which is newly applied, and a HARQ timing for a physical uplink shared channel (PUSCH) is determined based on the previous UL-DL configuration.

NPL 2 discloses (a) that a UL/DL reference configuration is applied, and (b) that a certain subframe may be scheduled for any of an uplink and a downlink by dynamic grant/assignment from a scheduler.

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21-25 May 2012.

NPL 2: "Signaling support for dynamic TDD", R1-130558, Ericsson, ST-Ericsson, 3GPP TSG-RAN WG1 Meeting #72, St Julian's, Malta, 28 Jan.-1 Feb. 2013.

SUMMARY OF INVENTION

Technical Problem

However, specific procedures when the base station device and the terminal device communicate with each other by using a downlink physical channel or an uplink physical channel are not disclosed in the above-described wireless communication system.

For example, a specific procedure when communication is performed by a physical downlink shared channel (PDSCH) is not disclosed. For example, a specific procedure when communication is performed by using an enhanced physical downlink control channel (EPDCCH) is not disclosed. For example, a specific procedure when communication is performed by using a physical uplink control channel (PUCCH) is not disclosed.

Considering the above problems, an object of the present invention is to provide a terminal device, a base station device, an integrated circuit, and a communication method which can perform communication by efficiently using radio resources.

Solution to Problem (1) To solve the above object, any aspect of the present invention includes units as follows. That is, a terminal device according to an aspect of the present invention includes a higher layer processing unit that sets a first UL-DL configuration configured by using a common RRC message, and a control unit that sets an antenna port for an enhanced physical downlink control channel for localized transmission of the enhanced physical downlink control channel, based on whether or not a subframe is a predetermined special subframe in the first UL-DL configuration. In a case where a second UL-DL configuration indicated by downlink control information which is transmitted on a physical downlink control channel is set, the control unit sets an antenna port for an enhanced physical downlink control channel for localized transmission of the enhanced physical downlink control channel, based on whether or not the subframe is the predetermined special subframe in the second UL-DL configuration. The predetermined special subframe is a subframe including three regions which are a region (DwPTS) in which downlink transmission is performed, a guard period (GP), and a region (UpPTS) in which uplink transmission is performed, in this order.

(2) In the terminal device according to the aspect of the present invention, the DwPTS in the predetermined special subframe is constituted by OFDM symbols of which the number is equal to or more than a predetermined number.

(3) In the terminal device according to the aspect of the present invention, the predetermined special subframe is a special subframe having a special subframe configuration 3, 4, or 8 in a normal cyclic prefix.

(4) A base station device according to another aspect of the present invention includes a higher layer processing unit that configures a first UL-DL configuration by using a common RRC message, and a control unit that sets an antenna port for an enhanced physical downlink control channel for localized transmission of the enhanced physical downlink control channel, based on whether or not a subframe is a predetermined special subframe in the first UL-DL configuration. In a case where a second UL-DL configuration indicated by downlink control information which is transmitted on a physical downlink control channel is configured, the control unit sets an antenna port for an enhanced physical downlink control channel for localized transmission of the enhanced physical downlink control channel, based on whether or not the subframe is the predetermined special subframe in the second UL-DL configuration. The predetermined special subframe is a subframe including three regions which are a region (DwPTS) in which downlink transmission is performed, a guard period (GP), and a region (UpPTS) in which uplink transmission is performed, in this order.

(5) In the base station device according to the aspect of the present invention, the DwPTS in the predetermined special subframe is constituted by OFDM symbols of which the number is equal to or more than a predetermined number.

(6) In the base station device according to the aspect of the present invention, the predetermined special subframe is a special subframe having a special subframe configuration 3, 4, or 8 in a normal cyclic prefix.

(7) A terminal device according to still another aspect of the present invention includes a higher layer processing unit that sets a first UL-DL configuration configured by using a common RRC message, and a control unit that sets the number of enhanced resource element groups per enhanced control channel element, based on whether or not a subframe is a predetermined special subframe in the first UL-DL configuration. In a case where a second UL-DL configuration indicated by downlink control information which is transmitted on a physical downlink control channel is set, the control unit sets the number of enhanced resource element groups per enhanced control channel element, based on whether or not the subframe is the predetermined special subframe in the second UL-DL configuration. The predetermined special subframe is a subframe including three regions which are a region (DwPTS) in which downlink transmission is performed, a guard period (GP), and a region (UpPTS) in which uplink transmission is performed, in this order.

(8) A base station device according to still another aspect of the present invention includes a higher layer processing unit that configures a first UL-DL configuration by using a common RRC message, a control unit that sets the number of enhanced resource element groups per enhanced control channel element, based on whether or not a subframe is a predetermined special subframe in the first UL-DL configuration. In a case where a second UL-DL configuration indicated by downlink control information which is transmitted on a physical downlink control channel is configured, the control unit sets the number of enhanced resource element groups per enhanced control channel element, based on whether or not the subframe is the predetermined special subframe in the second UL-DL configuration. The predetermined special subframe is a subframe including three regions which are a region (DwPTS) in which downlink transmission is performed, a guard period (GP), and a region (UpPTS) in which uplink transmission is performed, in this order.

(9) A communication method of a terminal device, according to still another aspect of the present invention includes setting a first UL-DL configuration which is configured by using a common RRC message, setting an antenna port for an enhanced physical downlink control channel for localized transmission of the enhanced physical downlink control channel, based on whether or not a subframe is a predetermined special subframe in the first UL-DL configuration, and setting an antenna port for an enhanced physical downlink control channel for localized transmission of the enhanced physical downlink control channel, based on whether or not the subframe is the predetermined special subframe in the second UL-DL configuration, in a case where a second UL-DL configuration indicated by downlink control information which is transmitted on a physical downlink control channel is set. The predetermined special subframe is a subframe including three regions which are a region (DwPTS) in which downlink transmission is performed, a guard period (GP), and a region (UpPTS) in which uplink transmission is performed, in this order.

(10) A communication method of a base station device, according to still another aspect of the present invention includes setting a first UL-DL configuration which is configured by using a common RRC message, setting an antenna port for an enhanced physical downlink control channel for localized transmission of the enhanced physical downlink control channel, based on whether or not a subframe is a predetermined special subframe in the first UL-DL configuration, and setting an antenna port for an enhanced physical downlink control channel for localized transmission of the enhanced physical downlink control channel, based on whether or not the subframe is the predetermined special subframe in the second UL-DL configuration, in a case where a second UL-DL configuration indicated by downlink control information which is transmitted on a physical downlink control channel is configured. The predetermined special subframe is a subframe including three regions which are a region (DwPTS) in which downlink transmission is performed, a guard period (GP), and a region (UpPTS) in which uplink transmission is performed, in this order.

Advantageous Effects of Invention

According to the present invention, it is possible to perform communication by efficiently using radio resources.

BRIEF DESCRIPTION OF DRAWINGS

FIG. 6 is a diagram illustrating an example of mapping a signal in a special subframe.

FIG. 7 is a table illustrating an example of an uplink-downlink configuration.

FIG. 10 is a diagram illustrating a correspondence between a pair (formed by a first UL reference UL-DL configuration for a serving cell (primary cell) and a first UL reference UL-DL configuration for another serving cell (secondary cell)), and a second UL reference UL-DL configuration for the secondary cell.

FIG. 12 is a diagram illustrating a correspondence between a pair (formed by a first DL reference UL-DL configuration for a primary cell and a first DL reference UL-DL configuration for a secondary cell), and a second DL reference UL-DL configuration for the secondary cell.

FIG. 13 is a diagram illustrating a correspondence between a subframe n to which a PDCCH/EPDCCH/PHICH is allocated, and a subframe (n+k) to which a PUSCH corresponding to the PDCCH/EPDCCH/PHICH is allocated.

FIG. 14 is a diagram illustrating a correspondence between a subframe n to which a PUSCH is allocated, and a subframe (n+k) to which a PHICH corresponding to the PUSCH is allocated.

FIG. 15 is a diagram illustrating a correspondence between a subframe (n−k) to which a PDSCH is allocated, and a subframe n in which HARQ-ACK corresponding to the PDSCH is transmitted.

FIG. 16 is a diagram illustrating a configuration of a special subframe.

FIG. 17 is a diagram illustrating a communication method according to the embodiment.

FIG. 18 is another diagram illustrating the communication method according to the embodiment.

FIG. 19 is still another diagram illustrating the communication method according to the embodiment.

FIG. 20 is still another diagram illustrating the communication method according to the embodiment.

FIG. 21 is a diagram illustrating a correspondence table between a PDCCH format and the number (aggregation level) of ECCEs per EPDCCH according to the embodiment.

FIG. 22 is a diagram illustrating a correspondence table between the number of PRBs included an EPDCCH-PRB set, the aggregation level, and the number of monitored EPDCCH candidates according to the embodiment.

FIG. 23 is a diagram illustrating a correspondence table between the number of PRBs included an EPDCCH-PRB set, the aggregation level, and the number of monitored EPDCCH candidates according to the embodiment.

FIG. 24 is a diagram illustrating a correspondence table between the number of PRBs included an EPDCCH-PRB set, the aggregation level, and the number of monitored EPDCCH candidates according to the embodiment.

FIG. 25 is a diagram illustrating a correspondence table between the number of PRBs included an EPDCCH-PRB set, the aggregation level, and the number of monitored EPDCCH candidates according to the embodiment.

FIG. 26 is a diagram illustrating a correspondence table between the number of PRBs included an EPDCCH-PRB set, the aggregation level, and the number of monitored EPDCCH candidates according to the embodiment.

FIG. 27 is a diagram illustrating a correspondence table between the number of PRBs included an EPDCCH-PRB set, the aggregation level, and the number of monitored EPDCCH candidates according to the embodiment.

FIG. 28 is a diagram illustrating a correspondence table between the number of PRBs included an EPDCCH-PRB set, the aggregation level, and the number of monitored EPDCCH candidates according to the embodiment.

FIG. 29 is a diagram illustrating a correspondence table between the number of PRBs included an EPDCCH-PRB set, the aggregation level, and the number of monitored EPDCCH candidates according to the embodiment.

FIG. 30 is a diagram illustrating a correspondence table between the number of PRBs included an EPDCCH-PRB set, the aggregation level, and the number of monitored EPDCCH candidates according to the embodiment.

FIG. 31 is a diagram illustrating a correspondence table between the number of PRBs included an EPDCCH-PRB set, the aggregation level, and the number of monitored EPDCCH candidates according to the embodiment.

FIG. 32 is a diagram illustrating a relationship between a value of a HARQ-ACK resource offset field and HARQ-ACK resource offset value according to the embodiment.

FIG. 33 is a diagram illustrating a relationship between a value of a HARQ-ACK resource offset field and HARQ-ACK resource offset value according to the embodiment.

DESCRIPTION OF EMBODIMENTS

Hereinafter, an embodiment of the present invention will be described.

In the embodiment, a plurality of cells may be configured in a terminal device. A technique in which the terminal device performs communication through a plurality of cells is referred to as cell aggregation or carrier aggregation. Here, the embodiment may be applied in each of a plurality of cells configured for the terminal device. The invention may be applied in some of a plurality of cells configured for the terminal device. Here, the cells configured for the terminal device are referred to as serving cells.

A plurality of serving cells to be configured includes one primary cell, and one or a plurality of secondary cells. The primary cell may be a serving cell in which an initial connection establishment procedure is performed, a serving cell in which a connection re-establishment procedure starts, or a cell of which an instruction as a primary cell is performed in a handover procedure. Here, when or after an RRC connection is established, the secondary cells may be configured.

In a wireless communication system of the embodiment, at least a time division duplex (TDD) scheme is applied. For example, in case of cell aggregation, the TDD scheme may be applied to all of a plurality of cells. In case of cell aggregation, cells where the TDD scheme is applied and cells where a frequency division duplex (FDD) scheme is applied may be aggregated. That is, in a case of cell aggregation, the embodiment may be applied to some cells.

Figure 1:
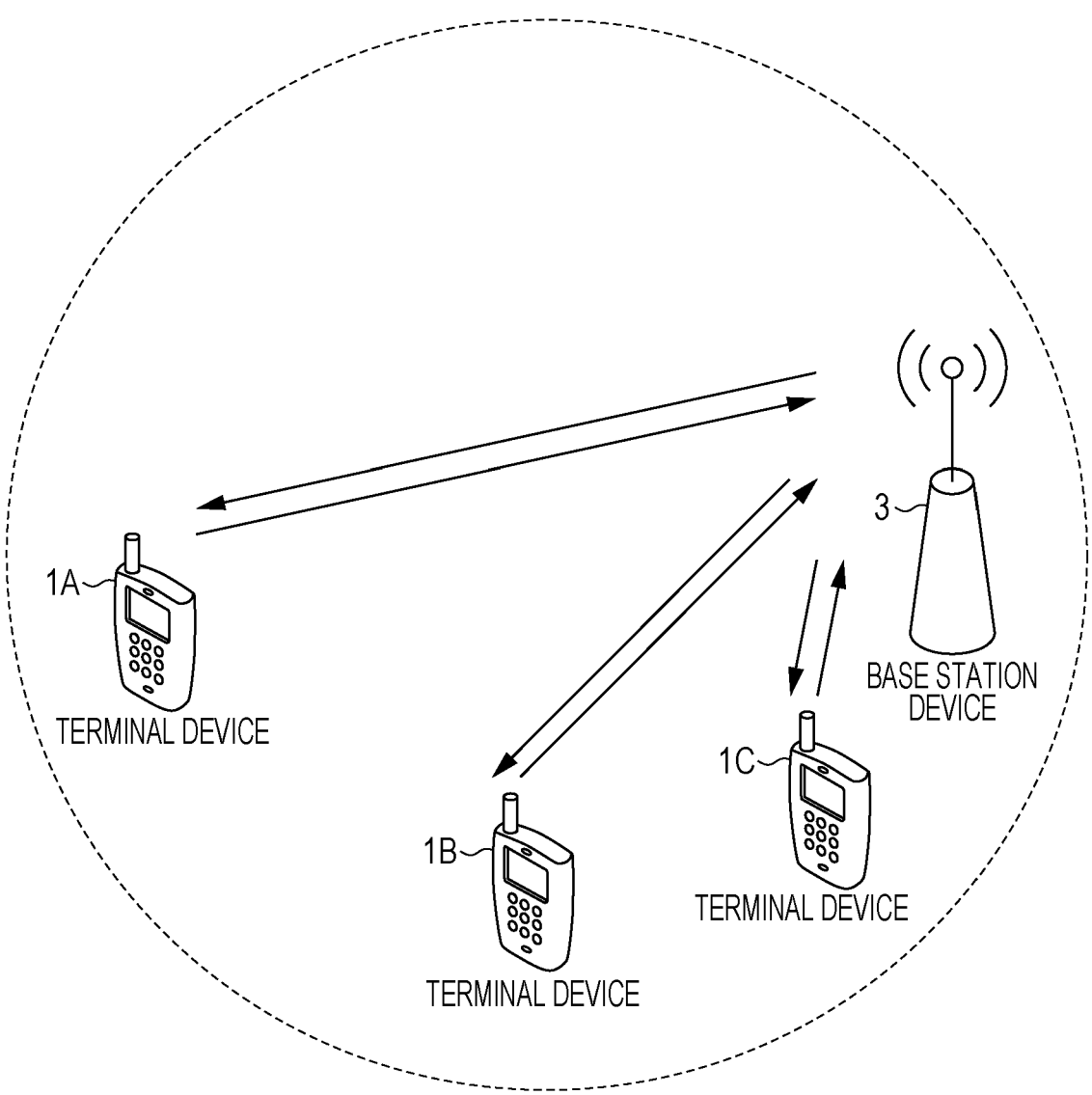
FIG. 1 is a schematic diagram illustrating a wireless communication system according to an embodiment.

FIG. 1 is a schematic diagram illustrating a wireless communication system according to the embodiment. As illustrated in FIG. 1, the wireless communication system according to the embodiment includes terminal devices 1A to 1C and a base station device 3. The terminal devices 1A to 1C are also described below as terminal devices 1.

A physical channel and a physical signal in the embodiment will be described.

In FIG. 1, the following uplink physical channels are used in a radio communication of an uplink from the terminal device 1 to the base station device 3. Each of the uplink physical channels is used for transmitting information which has been output from a higher layer.

Physical uplink control channel (PUCCH)
Physical uplink shared channel (PUSCH)
Physical random access channel (PRACH)

The PUCCH is used for transmitting uplink control information (UCI). The uplink control information includes channel state information (CSI) of a downlink and a scheduling request (SR) indicating a request of a PUSCH resource. The uplink control information includes acknowledgement (ACK)/negative-acknowledgement (NACK) in response to downlink data (Downlink Transport block, Downlink-Shared Channel: DL-SCH). Here, ACK/NACK is also referred to as HARQ-ACK, HARQ feedback, or response information.

The PUSCH is used for transmitting uplink data (Uplink Transport block, Uplink-Shared Channel: UL-SCH). That is, transmission of uplink data on an UL-SCH is performed through the PUSCH. That is, the UL-SCH which is a transport channel is mapped on the PUSCH which is a physical channel. The PUSCH may be used for transmitting HARQ-ACK and/or channel state information along with the uplink data. The PUSCH may be used for transmitting only channel state information or for transmitting only HARQ-ACK and channel state information.

The PUSCH is used for transmitting an RRC message. The RRC message is information/signal processed in a radio resource control (RRC) layer. The PUSCH is used for transmitting an MAC control element (CE). Here, the MAC CE is information/signal processed (transmitted) in a medium access control (MAC) layer.

The PRACH is used for transmitting a random access preamble. The PRACH is used for indicating an initial connection establishment procedure, a handover procedure, a connection re-establishment procedure, synchronization (timing adjustment) with uplink transmission, and a request of PUSCH resources.

In FIG. 1, the following uplink physical signal is used in a radio communication of an uplink. The uplink physical signal is not used for transmitting information which has been output from the higher layer, but is used by a physical layer.

Uplink reference signal (UL RS)

In the embodiment, the following two types of uplink reference signals are used.

Demodulation reference signal (DMRS)
Sounding reference signal (SRS)

The DMRS is associated with transmission of a PUSCH or a PUCCH. The DMRS is subjected to time multiplexing along with the PUSCH or the PUCCH. For example, the base station device 3 uses a DMRS for performing channel correction of the PUSCH or the PUCCH.

The SRS is not associated with transmission of a PUSCH or a PUCCH. The base station device 3 uses the SRS for measuring a channel state of an uplink. The terminal device 1 transmits a first SRS with a first resource configured by a higher layer. In a case where the terminal device 1 receives information indicating that transmission of the SRS is required on a PDCCH, the terminal device 1 transmission a second SRS with a second resource configured by the higher layer, only once. Here, the first SRS is also referred to as a periodic SRS or a type-0-triggered SRS. The second SRS is also referred to as an aperiodic SRS or a type-1-triggered SRS.

In FIG. 1, the following downlink physical channels are used in a radio communication of a downlink from the base station device 3 to the terminal device 1. Each of the downlink physical channels is used for transmitting information which has been output from a higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used for broadcasting master information block (MIB, Broadcast Channel: BCH) which is commonly used between the terminal devices 1. For example, the MIB is transmitted at an interval of 40 ms. The MIB is repeatedly transmitted in a period of 10 ms. The MIB includes information indicating a system frame number (SFN). Here, the SFN indicates the number of a radio frame. The MIB is system information.

The PCFICH is used for transmitting information which is used for performing an instruction of a region (OFDM symbol) used in transmission of a PDCCH.

The PHICH is used for transmitting a HARQ indicator (HARQ feedback, response information) which indicates acknowledgement (ACK)/negative-acknowledgement (NACK) in response to uplink data received by the base station device 3.

The PDCCH and the EPDCCH are used for transmitting downlink control information (DCI). Here, a plurality of DCI formats is defined for transmitting the downlink control information. That is, a field for the downlink control information is defined in a DCI format, and is mapped onto an information bit. The downlink control information may be also referred to as the DCI format.

For example, the DCI format 1A is defined as a DCI format for a downlink. The DCI format 1A is used for scheduling one PDSCH (transmitting one downlink transport block) in one cell. For example, the DCI format 1A, the DCI format 1B, the DCI format 1D, the DCI format 1, the DCI format 2A, the DCI format 2B, the DCI format 2C, and the DCI format 2D are defined as DCI formats for a downlink.

For example, the DCI format for a downlink includes information regarding scheduling of a PDSCH. For example, the DCI format for a downlink includes downlink control information such as information regarding resource block allocation, information regarding a modulation and coding scheme (MCS), information regarding a TPC command for a PUCCH, and a downlink assignment index (DAI). Here, the DCI format for a downlink is also referred to as a downlink grant (or downlink assignment).

For example, the DCI format 0 is defined as a DCI format for an uplink. The DCI format 0 is used for scheduling one PUSCH (transmitting one uplink transport block) in one cell.

For example, the DCI format for an uplink includes information regarding scheduling of a PUSCH, and the like. For example, the DCI format for an uplink includes downlink control information such as information regarding resource block allocation, information regarding an MCS, and information regarding a TPC command for a PUSCH. Here, the DCI format for an uplink is also referred to as an uplink grant (or uplink assignment).

In a case where resources of a PDSCH are scheduled by using downlink assignment, the terminal device 1 receives downlink data on the scheduled PDSCH. In a case where resources of a PUSCH are scheduled by using an uplink grant, the terminal device 1 transmits uplink data and/or uplink control information on the scheduled PUSCH.

The terminal device 1 monitors a set of PDCCH candidates and/or EPDCCH candidates. In the following descriptions, the PDCCH may be indicated by a PDCCH and/or an EPDDCH. The PDCCH candidate means a certain candidate having a probability of the PDCCH being mapped and transmitted by the base station device 3. Monitoring may include the meaning in that the terminal device 1 examines decoding of each PDCCH in a set of PDCCH candidates in accordance with all DCI formats to be monitored.

Here, the set of PDCCH candidates monitored by the terminal device 1 is also referred to as a search space. The search space includes a common search space (CSS) and a UE-specific search space (USS). The CSS corresponds to a region in which a plurality of terminal devices 1 monitors a PDCCH/EPDCCH commonly. The USS corresponds to a region defined based on at least a C-RNTI. The terminal device 1 monitors a PDCCH and detects the PDCCH for the terminal device 1 in a CSS and/or a USS.

The base station device 3 may configure a subframe (which may be a subframe in which monitoring of an EPDCCH is required) in which the terminal device 1 monitors an EPDCCH, for the terminal device 1. Here, the subframe in which the terminal device 1 monitors an EPDCCH may include a subframe (which may be a subframe in which monitoring of a USS of an EPDDCH is required) in which the terminal device 1 monitors the USS of an EPDDCH. The subframe in which the terminal device 1 monitors an EPDCCH may include a subframe in which the terminal device 1 monitors the USS of an EPDDCH except for a subframe based on a predefined rule.

For example, the base station device may transmit an RRC message with including information (may be a parameter, subframePatternConfig) indicating the subframe in which the terminal device 1 monitors an EPDCCH. The subframe in which the terminal device 1 monitors an EPDCCH may be configured for each cell.

An RNTI is used in transmission of downlink control information (transmission on PDCCH). The RNTI is assigned to the terminal device 1 by the base station device 3. Specifically, a cyclic redundancy check (CRC) parity bit is added to a DCI format (may be downlink control information). After addition, the CRC parity bit is scrambled by an RNTI. Here, the CRC parity bit added to the DCI format may be obtained from payload of the DCI format.

The terminal device 1 examines decoding of a DCI format having an added CRC parity bit which has been scrambled by an RNTI. The terminal device 1 detects a DCI format in which the CRC is determined to succeed, as a DCI format for the terminal device 1 (also referred to as blind decoding). That is, the terminal device 1 detects a PDCCH having a CRC which has been scrambled by an RNTI. The terminal device 1 detects a PDCCH having a DCI format to which a CRC parity bit scrambled by an RNTI is added.

Here, the RNTI includes a cell-radio network temporary identifier (C-RNTI). The C-RNTI is a unique identifier for the terminal device 1, which is used for distinguishing between RRC connection and scheduling. The C-RNTI is used for unicast transmission which is dynamically scheduled.

The RNTI includes a semi-persistent scheduling C-RNTI (SPS C-RNTI). The SPS C-RNTI is a unique identifier for the terminal device 1, which is used for semi-persistent scheduling. The SPS C-RNTI is used for unicast transmission which is semi-persistently scheduled.

Here, the transmission which is semi-persistently scheduled includes the meaning of transmission which is periodically scheduled. For example, the SPS C-RNTI is used for activation, reactivation, and/or retransmission of transmission which is semi-persistently scheduled. The SPS C-RNTI is used for release and/or deactivation of transmission which is semi-persistently scheduled. Here, the semi-persistently scheduling may be performed only in a primary cell.

For example, the base station device 3 may assign resources (physical resource block) to a semi-persistent PDSCH by using a DCI format (for example, DCI format 1 or DCI format 1A) for a downlink. The base station device 3 may instruct the terminal device 1 of activating transmission on the semi-persistent PDSCH. The base station device 3 may instruct the terminal device 1 of releasing (deactivating) resources of the semi-persistent PDSCH, by using the DCI format for a downlink.

Here, an instruction of releasing the resources of the semi-persistent PDSCH may be performed by setting a specific value in a field of downlink control information included in a DCI format to which a CRC parity bit scrambled by an SPS C-RNTI is added. For example, "0000" is set in a field of a HARQ process number, which is included in the DCI format 1A. "11111" is set in a field of an MCS. "00" is set in a field of a redundancy version. "All 1" is set in a field of resource block allocation. With such settings, an instruction of releasing resources of the semi-persistent PDSCH may be performed.

Here, a DCI format for performing an instruction of releasing resources of the semi-persistent PDSCH is also referred to as a PDCCH of performing an instruction of SPS release of a downlink (a PDCCH indicating downlink SPS release), or an EPDCCH of performing an instruction of SPS release of a downlink (a EPDCCH indicating downlink SPS release). A PDCCH/EPDCCH of performing an instruction of SPS release of a downlink (a PDCCH/EPDCCH indicating downlink SPS release) is also described below as a generic term of a PDCCH of performing an instruction of SPS release of a downlink and an EPDCCH of performing an instruction of SPS release of a downlink.

The PDSCH is used for transmitting downlink data. Transmission of downlink data on a PDSCH is also described as transmission on a PDSCH. Reception of downlink data on a PDSCH is also described as reception on a PDSCH.

The PDSCH is used for transmitting a system information block type 1 message. The system information block type 1 message is cell-specific information. The system information block type 1 message corresponds to an RRC message (common RRC message, RRC message common for terminals).

The PDSCH is used for transmitting a system information message. The system information message may include a system information block X other than a system information block type 1. The system information message is cell-specific information. The system information message corresponds to an RRC message.

The PDSCH is used for transmitting an RRC message. Here, an RRC message transmitted from the base station device 3 may be common for a plurality of terminal devices 1 in a cell. The RRC message transmitted from the base station device 3 is a message (also referred to as dedicated signaling) dedicated for a certain terminal device 1. That is, UE-specific information is transmitted by using a message dedicated for a certain terminal device 1. The PDSCH is used for transmitting an MAC CE.

Here, the RRC message and/or MAC CE are also referred to as a signal of a higher layer (higher layer signaling).

The PMCH is used for transmitting multicast data (Multicast Channel: MCH).

In FIG. 1, the following downlink physical signals are used in the radio communication of a downlink. The downlink physical signals are not used for transmitting information which has been output from a higher layer, but is used by a physical layer.

Synchronization signal (SS)

Downlink reference signal (DL RS)

The synchronization signal is used when the terminal device 1 takes synchronization of a downlink between a frequency domain and a time domain. For example, in the TDD scheme, the synchronization signal is mapped on the subframes 0, 1, 5, and 6 in a radio frame. In an FDD scheme, the synchronization signal is mapped on the subframes 0 and 5 in a radio frame.

The downlink reference signal is used when the terminal device 1 performs channel correction of a downlink physical channel. The downlink reference signal may be used when the terminal device 1 calculates channel state information of a downlink.

In the embodiment, the following five types of downlink reference signals are used.

Cell-specific reference signal (CRS)
UE-specific reference signal (URS) associated with PDSCH
Demodulation reference signal (DMRS) associated with EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in the entire band of a subframe. The CRS is used for demodulating a PBCH/PDCCH/PHICH/PCFICH/PDSCH. The CRS may be used when the terminal device 1 calculates channel state information of a downlink. The PBCH/PDCCH/PHICH/PCFICH is transmitted on an antenna port which is used in transmission of the CRS.

The URS associated with a PDSCH is transmitted in a subframe and a band used in transmission of a PDSCH associated with the URS. The URS is used for demodulating a PDSCH associated with the URS.

The PDSCH is transmitted through an antenna port which is used in transmission of the CRS or the URS. The DCI format 1A is used for scheduling the PDSCH which is transmitted on an antenna port used in transmission of the CRS. For example, the CRS is transmitted on one or several of antenna ports i (i=0, 1, 2, 3).

The DMRS associated with the EPDCCH is transmitted in a subframe and a band used in transmission of the EPDCCH associated with the DMRS. The DMRS is used for demodulating the EPDCCH associated with the DMRS. The EPDCCH is transmitted on an antenna port used in transmission of the DMRS.

The NZP CSI-RS is transmitted in a configured subframe. A resource in which the NZP CSI-RS is transmitted is configured by the base station device. The NZP CSI-RS is used when the terminal device 1 calculates channel state information of a downlink. The terminal device 1 performs signal measurement (channel measurement) by using the NZP CSI-RS.

Resources of the ZP CSI-RS are configured by the base station device 3. The base station device 3 transmits the ZP CSI-RS with zero output. That is, the base station device 3 does not transmit the ZP CSI-RS. The base station device 3 does not transmit the PDSCH and the EPDCCH in the configured resources of the ZP CSI-RS. For example, the terminal device 1 may measure interference between resources corresponding to the NZP CSI-RS corresponds, in a certain cell.

The MBSFN RS is transmitted in the entire band of a subframe which is used in transmission of the PMCH. The MBSFN RS is used for demodulating the PMCH. The PMCH is transmitted on an antenna port used in transmission of the MBSFN RS.

The PRS is used when the terminal device measures the geographical position thereof.

Here, the downlink physical channels and the downlink physical signal are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the MCH, the UL-SCH, and the DL-SCH are transport channels. Channels which are used in a medium access control (MAC) layer are referred to as transport channels. A unit of a transport channel which is used in the MAC layer is also referred to as a transport block (TB) or a MAC protocol data unit (PDU). Control of a Hybrid Automatic Repeat reQuest (HARQ) is performed for each transport block in the MAC layer. The transport block is a unit of data which is delivered to a physical layer by the MAC layer. In the physical layer, the transport block is mapped to a code word, and encoding is performed for each code word.

A constitution of a radio frame will be described below.

Figure 2:
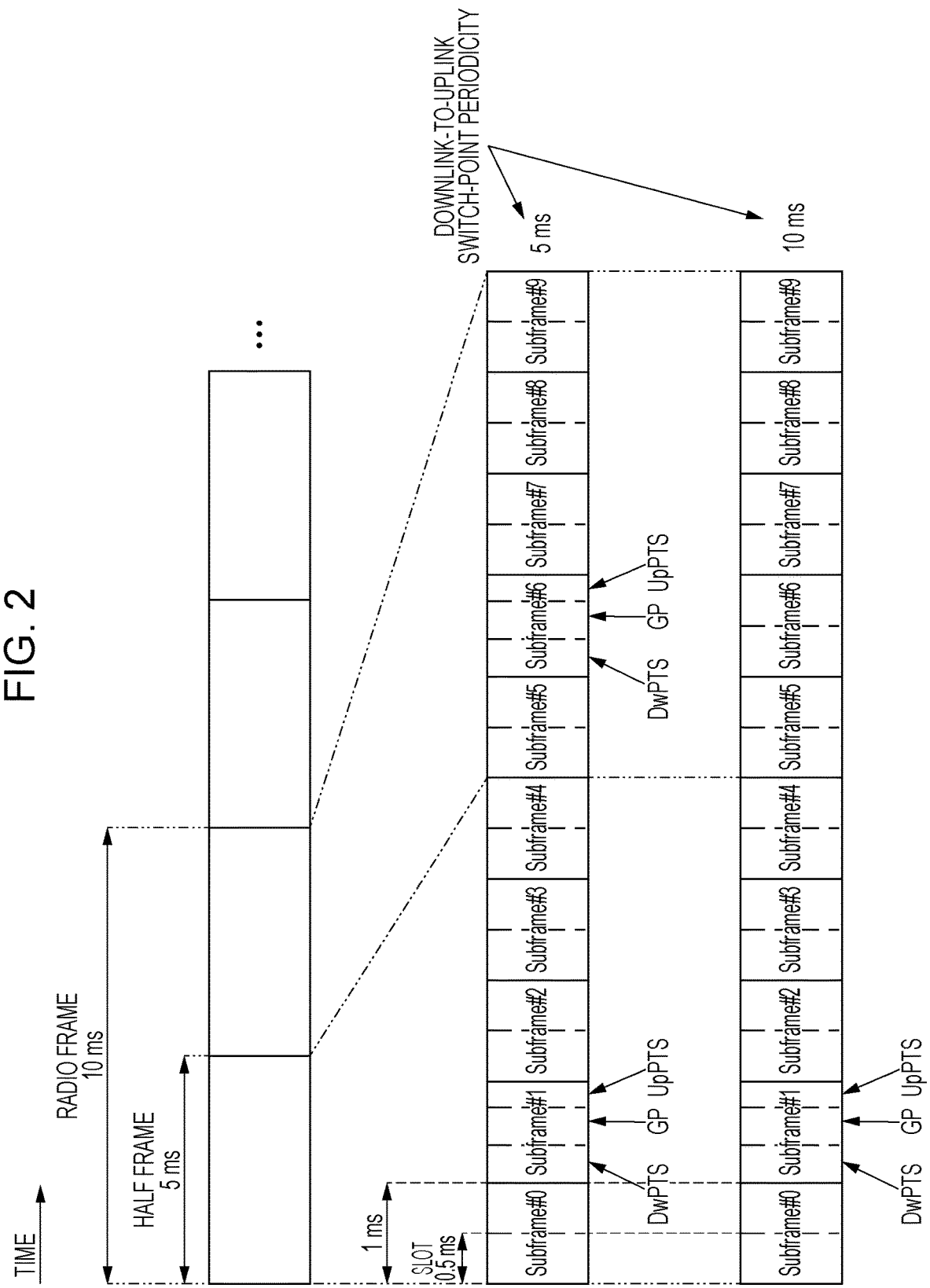
FIG. 2 is a diagram illustrating a constitution of a radio frame.

FIG. 2 is a schematic diagram illustrating a constitution of a radio frame in the embodiment. In FIG. 2, a horizontal axis indicates a time axis. For example, the length of each radio frame is Tf=307200 and Ts=10 ms. Here, Tf is referred to radio frame duration. Ts is referred to a basic time unit. Each radio frame is constituted by two half frames. The length of each of the half frames is 153600 and Ts=5 ms. Each of the half frames is constituted by five subframes. The length of each of the subframes is 30720 and Ts=1 ms.

Each of the subframes is defined by two consecutive slots. The length of each of the slots is Tslot=15360 and Ts=0.5 ms. An i-th subframe in a radio frame has a (2×i)th slot and a (2×i+1)th slot. That is, ten subframes can be used at each internal of 10 ms. Here, the subframe is also referred to as a transmission time interval (TTI).

In the embodiment, the following three types of subframes are defined.

Downlink subframe (first subframe)
Uplink subframe (second subframe)
Special subframe (third subframe)

The downlink subframe is a subframe reserved for downlink transmission. The uplink subframe is a subframe reserved for uplink transmission. The special subframe is constituted by three fields. The three fields are a downlink pilot time slot (DwPTS), a guard period (GP), and an uplink pilot time slot (UpPTS).

For example, the subframe 0, the subframe 5, and the DwPTS may be normally reserved for downlink transmission. The UpPTS and a subframe after the special subframe may be normally reserved for uplink transmission. Here, a single radio frame is configured by at least a downlink subframe, an uplink subframe, and a special subframe.

In a radio frame, downlink-to-uplink switch-point periodicity of 5 ms and 10 ms is supported. In a case where the downlink-to-uplink switch-point periodicity is 5 ms, special subframes are included in both half frames of a radio frame. In a case where the downlink-to-uplink switch-point periodicity is 10 ms, a special subframe is included only in the first half frame in a radio frame.

A constitution of a slot will be described below.

Figure 3:
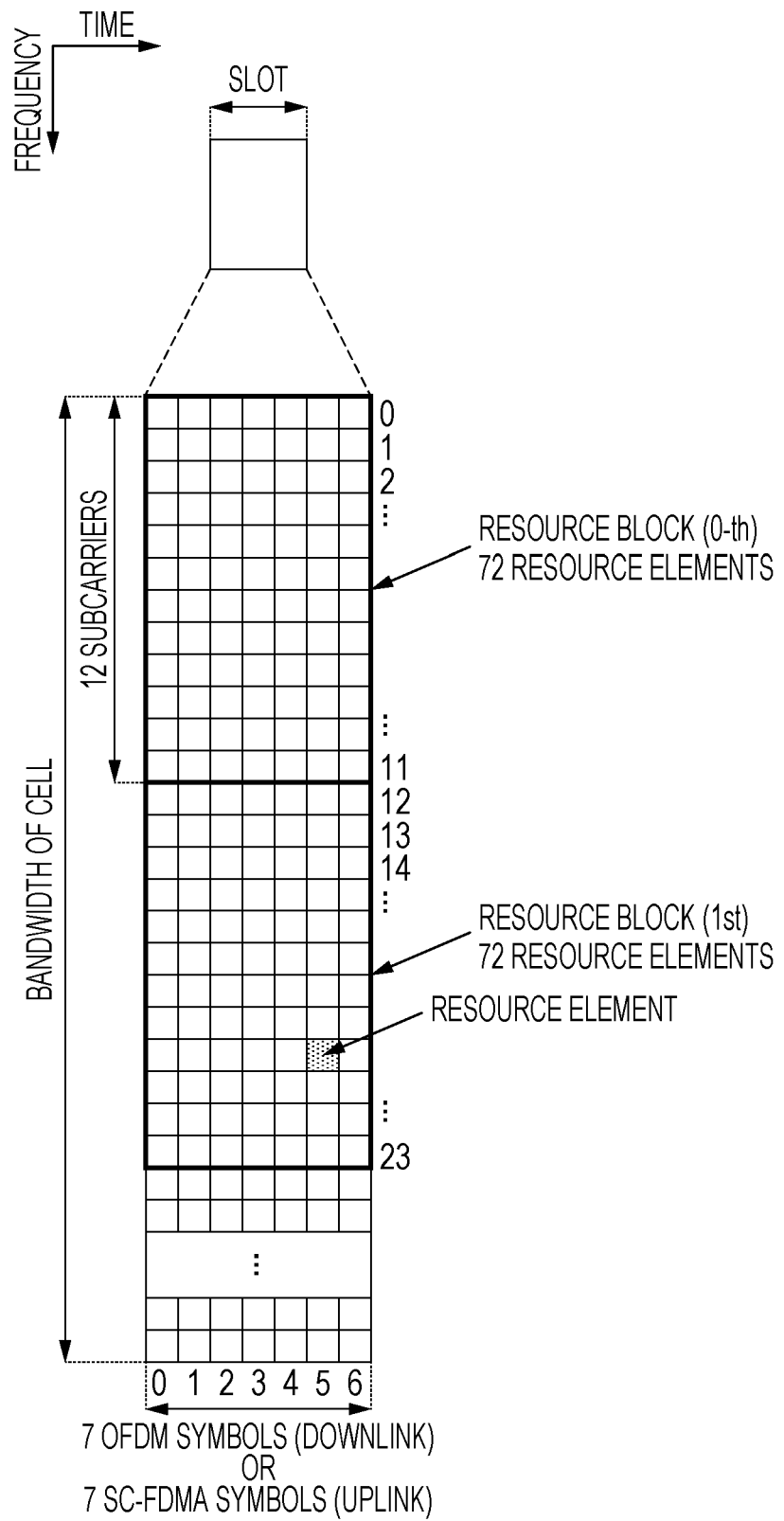
FIG. 3 is a diagram illustrating a constitution of a slot.

FIG. 3 is a diagram showing the constitution of a slot in the embodiment. In FIG. 3, a horizontal axis indicates a time axis, and a vertical axis indicates a frequency axis. A physical signal or a physical channel transmitted in each slot is expressed by resource grid. The resource grid is defined by a plurality of subcarriers and a plurality of OFDM symbols in a downlink. The resource grid is defined by a plurality of subcarriers and a plurality of SC-FDMA symbols in an uplink.

The number of subcarriers constituting one slot depends on the bandwidth of a cell. For example, the number of OFDM symbols or SC-FDMA symbols constituting one slot is 7. Here, each element in the resource grid is referred to as a resource element. The resource element is identified by using a subcarrier number, and an OFDM symbol number or a SC-FDMA symbol number.

A resource block is used for expressing mapping to a resource element of a certain physical channel (PDSCH, PUSCH, or the like). In the resource block, a virtual resource block and a physical resource block are defined. A certain physical channel is firstly mapped to the virtual resource block. Then, the virtual resource block is mapped to the physical resource block.

For example, one physical resource block is defined by seven continuous OFDM symbols or SC-FDMA symbols in a time domain and twelve contiguous subcarriers in a frequency domain. That is, one physical resource block is constituted by (7×12) resource elements. In addition, one physical resource block corresponds to one slot in the time domain, and corresponds to 180 kHz in the frequency domain. The physical resource block is numbered from 0 in the frequency domain.

A physical channel and a physical signal which are transmitted in each subframe will be described below.

Figure 4:
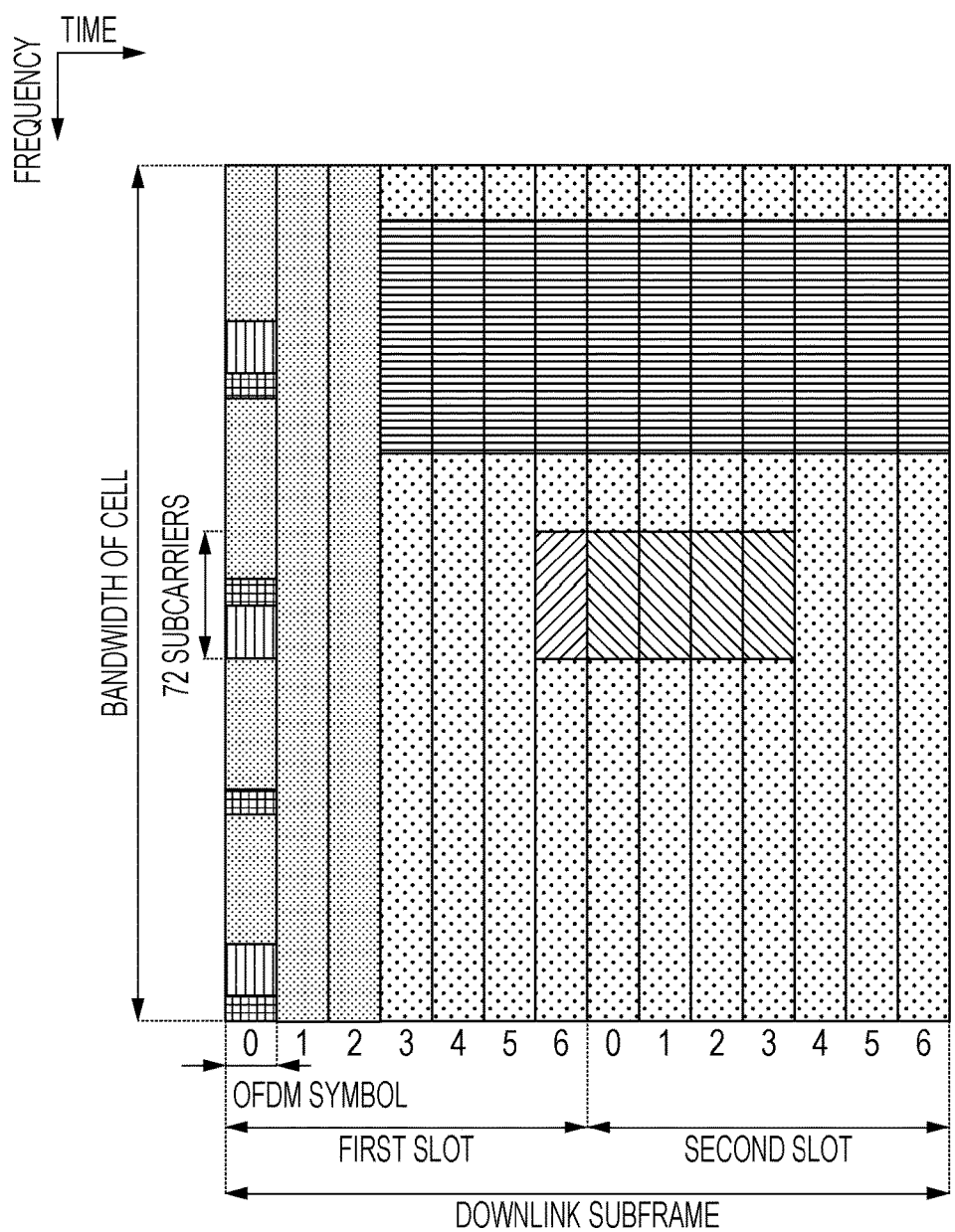
FIG. 4 is a diagram illustrating an example of mapping a signal in a downlink subframe.

FIG. 4 is a diagram showing an example of the mapping of physical channels and physical signals in a downlink subframe in the embodiment. In FIG. 4, a horizontal axis indicates a time axis, and a vertical axis indicates a frequency axis. As illustrated in FIG. 4, the base station device 3 may transmit a downlink physical channel (PBCH, PCFICH, PHICH, PDCCH, EPDCCH, PDSCH) and a downlink physical signal (synchronization signal, downlink reference signal) in a downlink subframe. For simplification of description, the downlink reference signal is not illustrated in FIG. 4.

Here, in a region of the PDCCH, a plurality of PDCCHs may be subjected to frequency multiplexing and time multiplexing. In an EPDCCH region, a plurality of EPDCCHs may be subjected to frequency multiplexing, time multiplexing, and spatial multiplexing. In a region of the PDSCH, a plurality of PDSCHs may be subjected to frequency multiplexing and spatial multiplexing. The PDCCH, and the PDSCH, or the EPDCCH may be subjected to time multiplexing. The PDSCH and EPDCCH may be subjected to frequency multiplexing.

Figure 5:
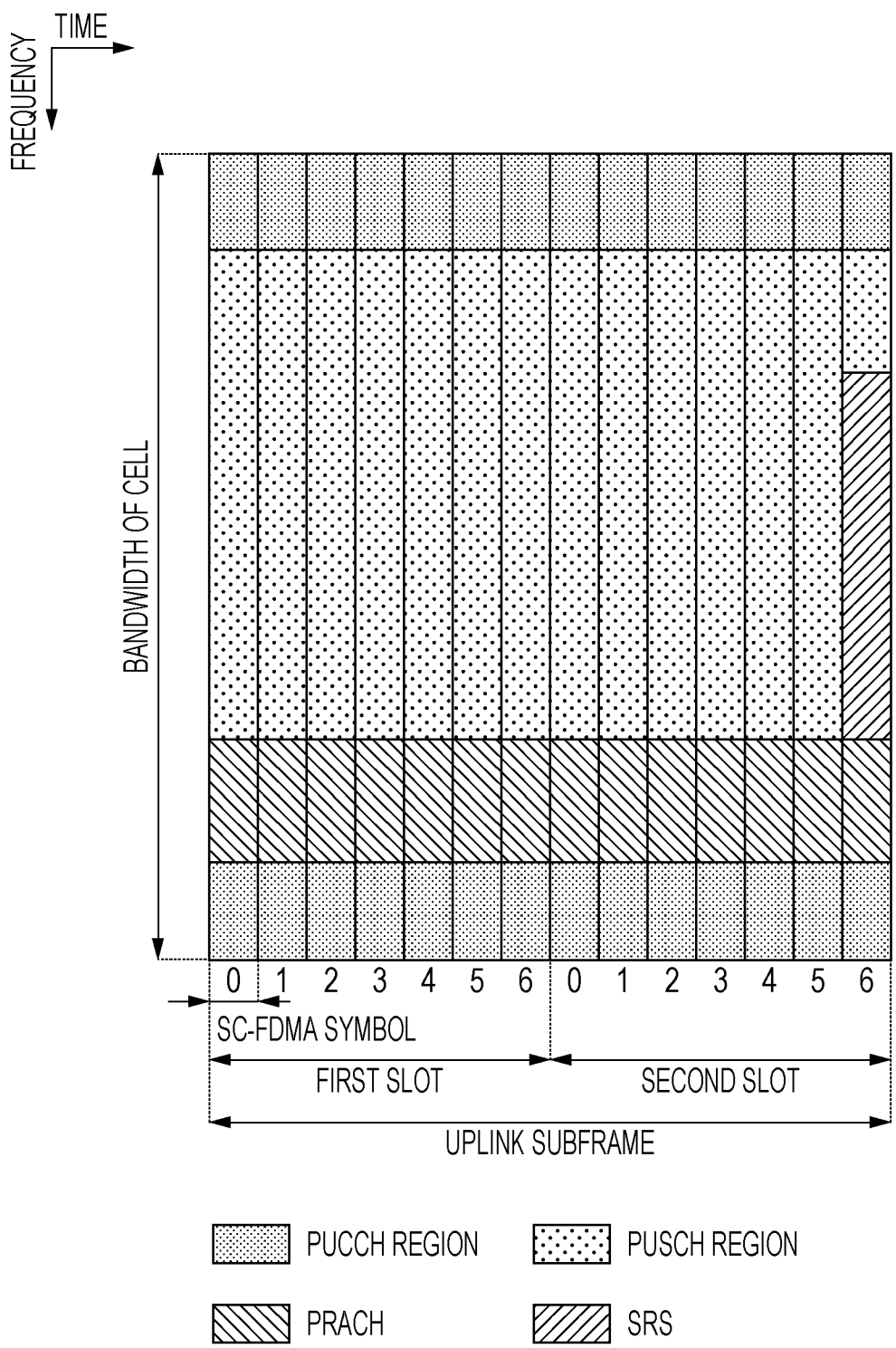
FIG. 5 is a diagram illustrating an example of mapping a signal in an uplink subframe.

FIG. 5 is a diagram illustrating an example of the mapping of physical channels and physical signals in an uplink subframe in the embodiment. In FIG. 5, a horizontal axis indicates a time axis, and a vertical axis indicates a frequency axis. The terminal device 1 may transmit an uplink physical channel (PUCCH, PUSCH, PRACH) and an uplink physical signal (DMRS, SRS) in an uplink subframe.

Here, in a region of the PUCCH, a plurality of PUCCHs may be subjected to frequency multiplexing, time multiplexing, and code multiplexing. In a PUSCH region, a plurality of PUSCHs may be subjected to frequency multiplexing, and spatial multiplexing. The PUCCH and the PUSCH may be subjected to frequency multiplexing. The PRACH may be allocated over a single subframe or two subframes. A plurality of PRACHs may be subjected to code multiplexing.

An SRS may be transmitted by using the last SC-FDMA symbol in the uplink subframe. It is impossible that the terminal device 1 simultaneously performs transmission of the SRS and transmission on a PUCCH/PUSCH/PRACH in a single SC-FDMA symbol in a single cell. In a single uplink subframe in a single cell, the terminal device 1 may perform transmission on a PUSCH and/or PUCCH by using SC-FDMA symbols other than the last SC-FDMA symbol in the uplink subframe, and may perform transmission of an SRS by using the last SC-FDMA symbol in the uplink subframe.

That is, in the single uplink subframe in the single cell, the terminal device 1 can perform both of transmission of the SRS and transmission on the PUSCH/PUCCH. Here, a DMRS may be subjected to time multiplexing along with the PUCCH or the PUSCH. Here, for simplification of description, the DMRS is not illustrated in FIG. 5.

FIG. 6 is a diagram illustrating an example of the mapping of physical channels and physical signals in a special subframe in the embodiment. In FIG. 6, a horizontal axis indicates a time axis, and a vertical axis indicates a frequency axis.

For example, as illustrated in FIG. 6, a DwPTS is constituted by the first to the tenth OFDMA symbols (OFDMA symbols 0 to 6 in a first slot and OFDMA symbols 0 to 2 in a second slot) in a special subframe. A GP is constituted by duration corresponding to the 11th symbol and the 12th symbol (symbol 3 and symbol 4 in the second slot) in the special subframe. An UpPTS is constituted by the 13th SC-FDMA symbol and the 14th SC-FDMA symbol (SC-FDMA symbol 5 and SC-FDMA symbol 6 in the second slot) in the special subframe.

The base station device 3 may transmit a PCFICH, a PHICH, a PDCCH, an EPDCCH, a PDSCH, a synchronization signal, and a downlink reference signal in the DwPTS of the special subframe. The base station device 3 may not transmit a PBCH in the DwPTS of the special subframe. The terminal device 1 may transmit a PRACH and an SRS in the UpPTS of the special subframe. That is, the terminal device 1 may not transmit a PUCCH, a PUSCH, and a DMRS in the UpPTS of the special subframe. Here, for simplification of description, the downlink reference signal is not illustrated in FIG. 6.

A first UL reference UL-DL configuration (uplink reference uplink-downlink configuration), a first DL reference UL-DL configuration (downlink reference uplink-downlink configuration), a second UL reference UL-DL configuration, a second DL reference UL-DL configuration, and a third UL-DL configuration (uplink-downlink configuration) will be described below.

Here, the third UL-DL configuration is also referred to a signal of explicit Layer 1 (Explicit L1 signaling). The third UL-DL configuration is also referred to a configuration of explicit Layer 1 (Explicit L1 configuration). The third UL-DL configuration is also referred to a transmission direction UL-DL configuration (transmission direction uplink-downlink configuration).

For example, the first UL reference UL-DL configuration, the first DL reference UL-DL configuration, the second UL reference UL-DL configuration, the second DL reference UL-DL configuration, and the third UL-DL configuration are defined by an UL-DL configuration (uplink-downlink configuration, UL-DL configuration).

Here, the UL-DL configuration is a configuration relating to a pattern of subframes in a radio frame. That is, the UL-DL configuration indicates that each subframe in a radio frame is any of a downlink subframe, an uplink subframe, and a special subframe.

That is, the first UL reference UL-DL configuration, the second UL reference UL-DL configuration, the first DL reference UL-DL configuration, the second DL reference UL-DL configuration, and the third UL-DL configuration are defined by a pattern of a downlink subframe, an uplink subframe, and a special subframe in a radio frame.

For example, the pattern of a downlink subframe, an uplink subframe, and a special subframe indicates which one of a downlink subframe, an uplink subframe, and a special subframe each of subframes #0 to #9 is. Preferably, the pattern is expressed by any combination of D, U, and S (which respectively indicate a downlink subframe, an uplink subframe, and a special subframe) which has a length of 10. More preferably, the leading subframe (that is, subframe #0) is D, and the second subframe (that is, subframe #1) is S.

FIG. 7 is a table illustrating an example of the UL-DL configuration in the embodiment. In FIG. 7, D indicates a downlink subframe, U indicates an uplink subframe, and S indicates a special subframe.

Here, setting an UL-DL configuration i as the first or second UL reference UL-DL configuration is referred to that a first or second UL reference UL-DL configuration i is set. Setting an UL-DL configuration i as the first or second DL reference UL-DL configuration is referred to that a first or second DL reference UL-DL configuration i is set. Setting an UL-DL configuration i as the third UL-DL configuration is referred to that a third UL-DL configuration i is set.

Setting an UL-DL configuration i as the UL reference UL-DL configuration is referred to that an UL reference UL-DL configuration i is set. Setting an UL-DL configuration i as the DL reference UL-DL configuration is referred to that a DL reference UL-DL configuration i is set.

A setting method for the first UL reference UL-DL configuration, the first DL reference UL-DL configuration, and the third UL-DL configuration will be described below.

The base station device 3 sets the first UL reference UL-DL configuration, the first DL reference UL-DL configuration, and the third UL-DL configuration. The DL reference UL-DL configuration and the third UL-DL configuration are UL-DL configurations set for dynamic TDD in addition to an UL-DL configuration (first UL reference UL-DL configuration) which is also used in a case where the dynamic TDD is not configured.

The base station device 3 may transmit first information (TDD-Config) indicating the first UL reference UL-DL configuration, to the terminal device 1 with including at least one of an MIB, a system information block type 1 message, a system information message, an RRC message, an MAC control element (CE), and control information (for example, DCI format) of the physical layer.

The base station device 3 may transmit second information indicating the first DL reference UL-DL configuration, to the terminal device 1 with including at least one of an MIB, a system information block type 1 message, a system information message, an RRC message, an MAC control element (CE), and control information (for example, DCI format) of the physical layer.

The base station device 3 may transmit third information indicating the third UL-DL configuration, to the terminal device 1 with including at least one of an MIB, a system information block type 1 message, a system information message, an RRC message, an MAC control element (CE), and control information (for example, DCI format) of the physical layer.

Here, the first UL reference UL-DL configuration, the second UL reference UL-DL configuration, the first DL reference UL-DL configuration, the second DL reference UL-DL configuration, and the third UL-DL configuration may be defined for each of a plurality of cells.

That is, the base station device 3 may transmit the first information, the second information, and the third information for each cell to the terminal device 1 in which a plurality of cells is configured. That is, the first information, the second information, and the third information may be configured for each cell.

That is, the terminal device 1 in which a plurality of cells is configured may set the first UL reference UL-DL configuration, the first DL reference UL-DL configuration, and the transmission direction DL-UL configuration for each cell, based on the first information, the second information, and the third information.

For example, the first information for a primary cell is preferably included in the system information block type 1 message or the RRC message. The first information for a secondary cell is preferably included in the RRC message.

The second information for a primary cell is preferably included in the system information block type 1 message, the system information message, or the RRC message. The second information for a secondary cell is preferably included in the RRC message (dedicated RRC message, UE-specific RRC message). The third information is preferably included in the control information (for example, DCI format) of the physical layer.

Here, the system information block type 1 message is initially transmitted on a PDSCH in the subframe 5 of a radio frame which satisfies the SFN mod 8=0. The system information block type 1 message is repeatedly transmitted on the PDSCH in the subframe 5 of another radio frame which satisfies the SFN mod 2=0. For example, the system information block type 1 message may include information indicating a constitution (lengths of a DwPTS, a GP, and an UpPTS) of a special subframe. The system information block type 1 message is cell-specific information.

The system information message is transmitted on the PDSCH. The system information message is cell-specific information. The system information message includes a system information block X other than the system information block type 1.

The RRC message is transmitted on the PDSCH. Here, the RRC message is information/signal processed in the RRC layer. The RRC message may be common for a plurality of terminal devices 1 in a cell, or may be dedicated for a specific terminal device 1.

The MAC CE is transmitted on the PDSCH. Here, the MAC CE is information/signal processed in the MAC layer.

Figure 8:
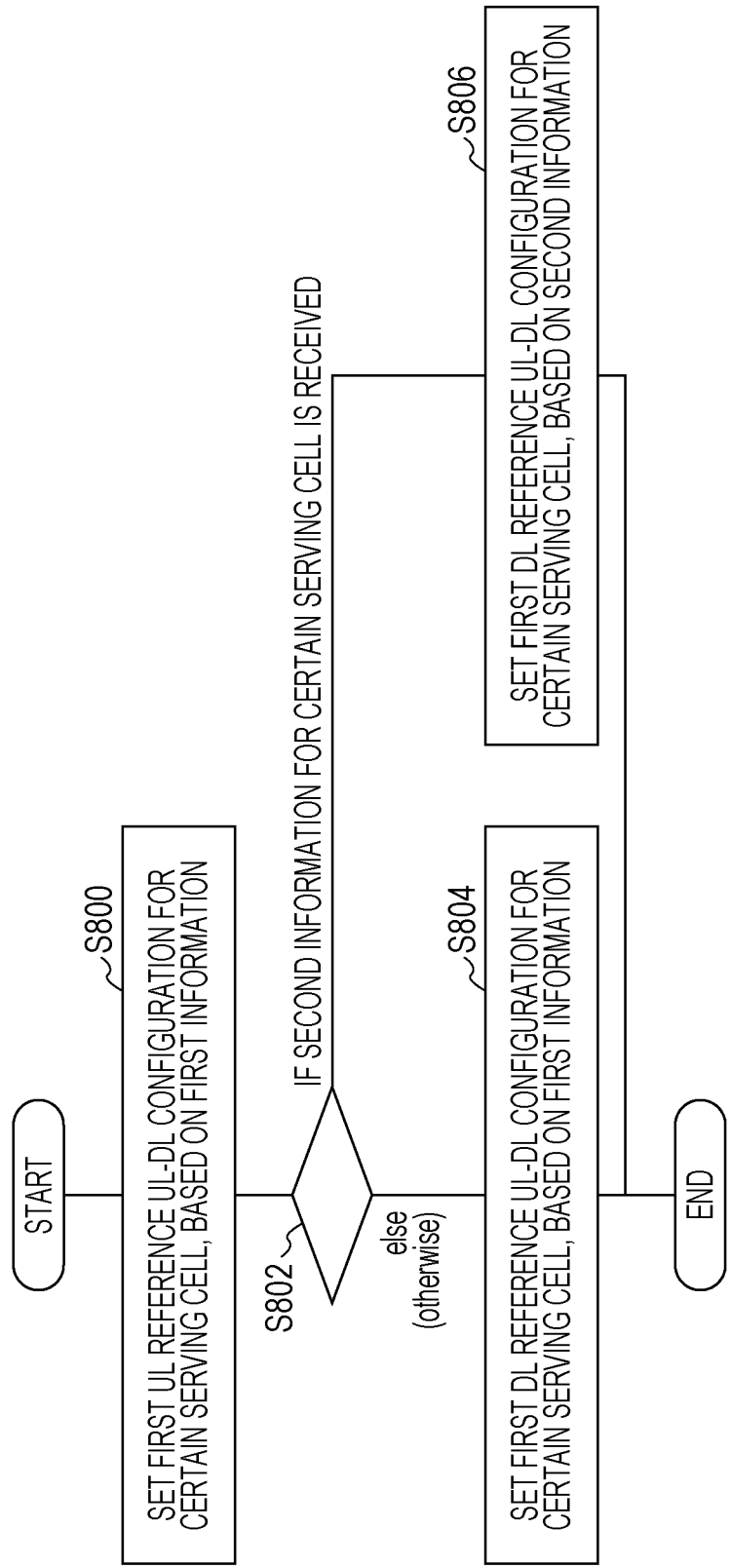
FIG. 8 is a flowchart illustrating a setting method of a first UL reference UL-DL configuration and a first DL reference UL-DL configuration.

FIG. 8 is a flowchart illustrating the setting method of the first UL reference UL-DL configuration and the first DL reference UL-DL configuration in the embodiment. The terminal device 1 may perform the setting method in FIG. 8 for each of a plurality of cells.

The terminal device 1 sets a first UL reference UL-DL configuration for a certain cell, based on first information (S800). The terminal device 1 determines whether or not the terminal device 1 receives second information for the certain cell (S802). Here, in a case where the terminal device 1 receives the second information for the certain cell, the terminal device 1 sets a first DL reference UL-DL configuration for the certain cell, based on the second information for the certain cell (S806). In a case (else/otherwise) where the terminal device 1 does not receive the second information for the certain cell, the terminal device 1 sets the first DL reference UL-DL configuration for the certain cell, based on the first information for the certain cell (S804).

Here, a cell in which the first DL reference UL-DL configuration is set based on the second information is also referred to as a cell in which dynamic TDD (may be eIMTA) is configured.

The base station device 3 transmits information associated with dynamic TDD (information associated with eIMTA), and thus can configure that the base station device 3 operates for the terminal device 1 by using dynamic TDD (may be eIMTA).

In a case where the terminal device 1 does not receive second information for the certain cell, the first UL reference UL-DL configuration and the first DL reference UL-DL configuration may not be defined. That is, in a case where the terminal device 1 does not receive second information for the certain cell, the terminal device 1 may set one UL-DL configuration for a certain cell, based on the first information for the certain cell.

The terminal device 1 receives second information and determines a subframe which allows transmission of an uplink, based on the received second information. Then, the terminal device 1 monitors third information. In a case where the terminal device 1 receives the third information, the terminal device 1 determines a subframe which allows transmission of an uplink, based on the received third information.

For example, the base station device 3 may transmit the third information to the terminal device 1 by using a PDCCH/EPDCCH. That is, the third information may be used when the base station device (cell) 3 controls an operation of dynamic TDD in coverage. Here, the third information may be transmitted and received in a CSS and/or an USS.

The terminal device 1 examines decoding of a received signal, and determines whether or not a PDCCH/EPDCCH (may be a DCI format) on which the third information is transmitted is detected. In a case where the terminal device 1 detects the PDCCH/EPDCCH on which the third information is transmitted, the terminal device 1 determines a subframe which allows transmission of an uplink, based on the detected third information. In a case where the terminal device 1 does not detect the PDCCH/EPDCCH on which the third information is transmitted, the terminal device 1 may maintain determinations until now, which relate to the subframe allowing transmission of an uplink.

A setting method of the second UL reference UL-DL configuration will be described below.

The base station device 3 and the terminal device 1 may set the second UL reference UL-DL configuration in a case where a plurality of cells is configured for the terminal device 1 and first UL reference UL-DL configurations for at least two cells are different from each other.

The base station device 3 and the terminal device 1 may not set the second UL reference UL-DL configuration in cases other than the case where a plurality of cells is configured for the terminal device 1 and first UL reference UL-DL configurations for at least two cells are different from each other. Here, the cases other than the case where first UL reference UL-DL configurations for at least two serving cells are different from each other may include a case where first UL reference UL-DL configurations for all serving cells (for example, two serving cells) are the same as each other.

The base station device 3 and the terminal device 1 may not set the second UL reference UL-DL configuration in a case where (only) one cell is configured for the terminal device 1.

Figure 9:
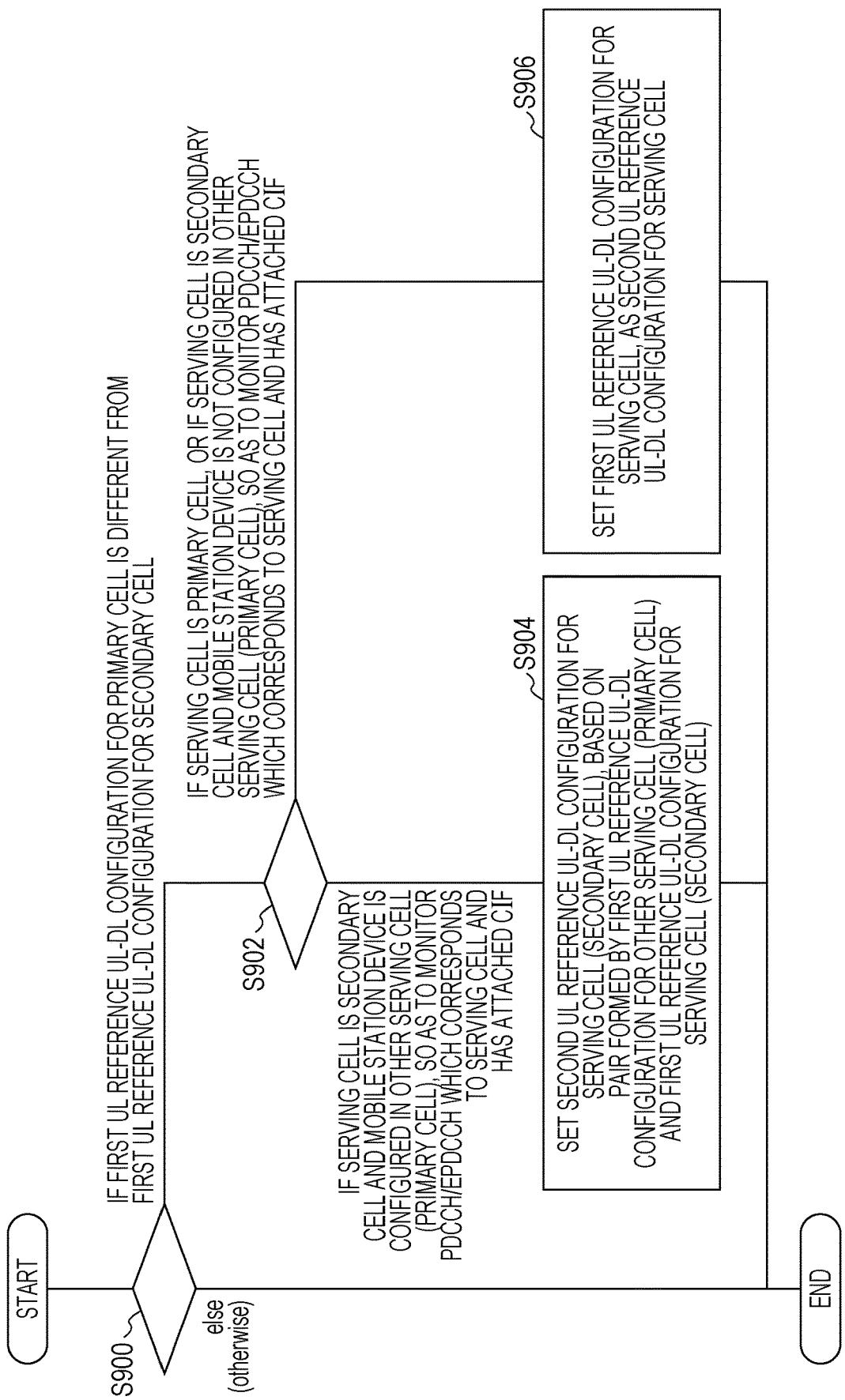
FIG. 9 is a flowchart illustrating a setting method of a second UL reference UL-DL configuration.

FIG. 9 is a flowchart illustrating the setting method of the second UL reference UL-DL configuration in the embodiment. FIG. 9 illustrates that one primary cell and one secondary cell are configured for the terminal device 1. Here, the terminal device 1 may perform the setting method in FIG. 9, for each of the primary cell and the secondary cell.

The terminal device 1 determines whether or not a first UL reference UL-DL configuration for the primary cell is different from a first UL reference UL-DL configuration for the secondary cell (S900). Here, in a case where the first UL reference UL-DL configuration for the primary cell is the same as the first UL reference UL-DL configuration for the secondary cell, the terminal device 1 does not set the second UL reference UL-DL configuration and ends a setting process for the second UL reference UL-DL configuration.

In a case where the first UL reference UL-DL configuration for the primary cell is different from the first UL reference UL-DL configuration for the secondary cell, the terminal device 1 determines whether a serving cell is the primary cell or the secondary cell, and/or the terminal device 1 is configured so as to monitor a PDCCH/EPDCCH which corresponds to the serving cell and has an attached carrier indicator field (CIF), in another serving cell (S902).

Here, in a case where the serving cell is the secondary cell, and the terminal device 1 is configured so as to monitor the PDCCH/EPDCCH which corresponds to the serving cell (secondary cell) and has an attached carrier indicator field (CIF), in the other serving cell (that is, primary cell), the terminal device 1 sets a second UL reference UL-DL configuration for the serving cell (secondary cell), based on a pair formed by the first UL reference UL-DL configuration for the other serving cell (primary cell) and the first UL reference UL-DL configuration for the serving cell (secondary cell) (S904).

For example, in S904, the terminal device 1 sets the second UL reference UL-DL configuration for the serving cell (secondary cell), based on a table in FIG. 10. FIG. 10 is a diagram illustrating a correspondence between a pair and the second UL reference UL-DL configuration for the secondary cell. The pair is formed by the first UL reference UL-DL configuration for the other serving cell (primary cell) and the first UL reference UL-DL configuration for the serving cell (secondary cell).

In FIG. 10, the primary cell UL-DL configuration refers to the first UL reference UL-DL configuration for the other serving cell (primary cell). The secondary cell UL-DL configuration refers to the first UL reference UL-DL configuration for the serving cell (secondary cell).

For example, in a case where the first UL reference UL-DL configuration 0 is set for the other serving cell (primary cell), and the first UL reference UL-DL configuration 2 is set for the serving cell (secondary cell), the second UL reference UL-DL configuration 1 is set for the secondary cell.

In a case where the serving cell is the primary cell, or the serving cell is the secondary cell, and the terminal device 1 is not configured so as to monitor the PDCCH/EPDCCH which corresponds to the serving cell (secondary cell) and has an attached carrier indicator field (CIF), in the other serving cell (that is, primary cell), the first UL reference UL-DL configuration for the serving cell is set as the second UL reference UL-DL configuration for the serving cell (S906).

Similarly, the base station device 3 sets the second UL reference UL-DL configuration based on the setting method illustrated in FIG. 9.

Here, monitoring a PDCCH/EPDCCH having an attached CIF includes the meaning that decoding of the PDCCH or the EPDCCH is examined in accordance with a DCI format including the CIF. The CIF indicates a field on which a carrier indicator is mapped. The value of the carrier indicator indicates a serving cell corresponding to a DCI format with which the carrier indicator is associated.

That is, in the other serving cell, the terminal device 1 which is configured so as to monitor a PDCCH/EPDCCH which corresponds to the serving cell and has an attached CIF monitors the PDCCH/EPDCCH having an attached CIF in the other serving cell.

In the other serving cell, it is preferable that the terminal device 1 which is configured so as to monitor a PDCCH/EPDCCH which corresponds to the serving cell and has an attached CIF receives the third information for the serving cell on the PDCCH/EPDCCH in the other serving cell.

In the other serving cell, the terminal device 1 which is not configured so as to monitor a PDCCH/EPDCCH which corresponds to the serving cell and has an attached CIF may monitor the PDCCH/EPDCCH which has an attached CIF or does not have an attached CIF, in the other serving cell.

In the other serving cell, it is preferable that the terminal device 1 which is not configured so as to monitor a PDCCH/EPDCCH which corresponds to the serving cell and has an attached CIF receives the third information for the serving cell on the PDCCH/EPDCCH in the other serving cell.

Here, the PDCCH/EPDCCH (may be a DCI format) for the primary cell is transmitted in the primary cell. That is, it is preferable that the third information for the primary cell is transmitted on the PDCCH/EPDCCH of the primary cell.

The base station device 3 may transmit a parameter (cif-Presence-r10) to the terminal device 1. The parameter (cif-Presence-r10) indicates whether or not a DCI format transmitted in the primary cell includes a CIF. The base station device 3 may transmit a parameter (CrossCarrier-SchedulingConfig-r10) associated with cross carrier scheduling to the terminal device 1 for each secondary cell.

Here, the parameter (CrossCarrierSchedulingConfig-r10) may include a parameter (schedulingCellInfo-r10) which indicates whether or not a PDCCH/EPDCCH corresponding to the associated secondary cell is transmitted in the secondary cell or in the other serving cell.

In a case where the parameter (schedulingCellInfo-r10) indicates that the PDCCH/EPDCCH corresponding to the associated secondary cell is transmitted in the secondary cell, the parameter (schedulingCellInfo-r10) may include a parameter (cif-Presence-r10) which indicates whether or not the DCI format transmitted in the secondary cell includes a CIF.

In a case where the parameter (schedulingCellInfo-r10) indicates that the PDCCH/EPDCCH corresponding to the associated secondary cell is transmitted in the other serving cell, the parameter (schedulingCellInfo-r10) may include a parameter (schedulingCellId) which indicates a serving cell in which downlink assignment or an uplink grant for the associated secondary cell.

A setting method of the second DL reference UL-DL configuration will be described below.

For example, the base station device 3 and the terminal device 1 set the second DL reference UL-DL configuration in a case where a plurality of cells is configured for the terminal device 1 and first DL reference UL-DL configurations for at least two cells are different from each other.

The base station device 3 and the terminal device 1 may not set the second DL reference UL-DL configuration in cases other than the case where a plurality of cells is configured for the terminal device 1 and first DL reference UL-DL configurations for at least two cells are different from each other. Here, the cases other than the case where first DL reference UL-DL configurations for at least two cells are different from each other may include a case where first DL reference UL-DL configurations for all serving cells (for example, two serving cells) are the same as each other.

The base station device 3 and the terminal device 1 may not set the second DL reference UL-DL configuration in a case where (only) one cell is configured for the terminal device 1.

Figure 11:
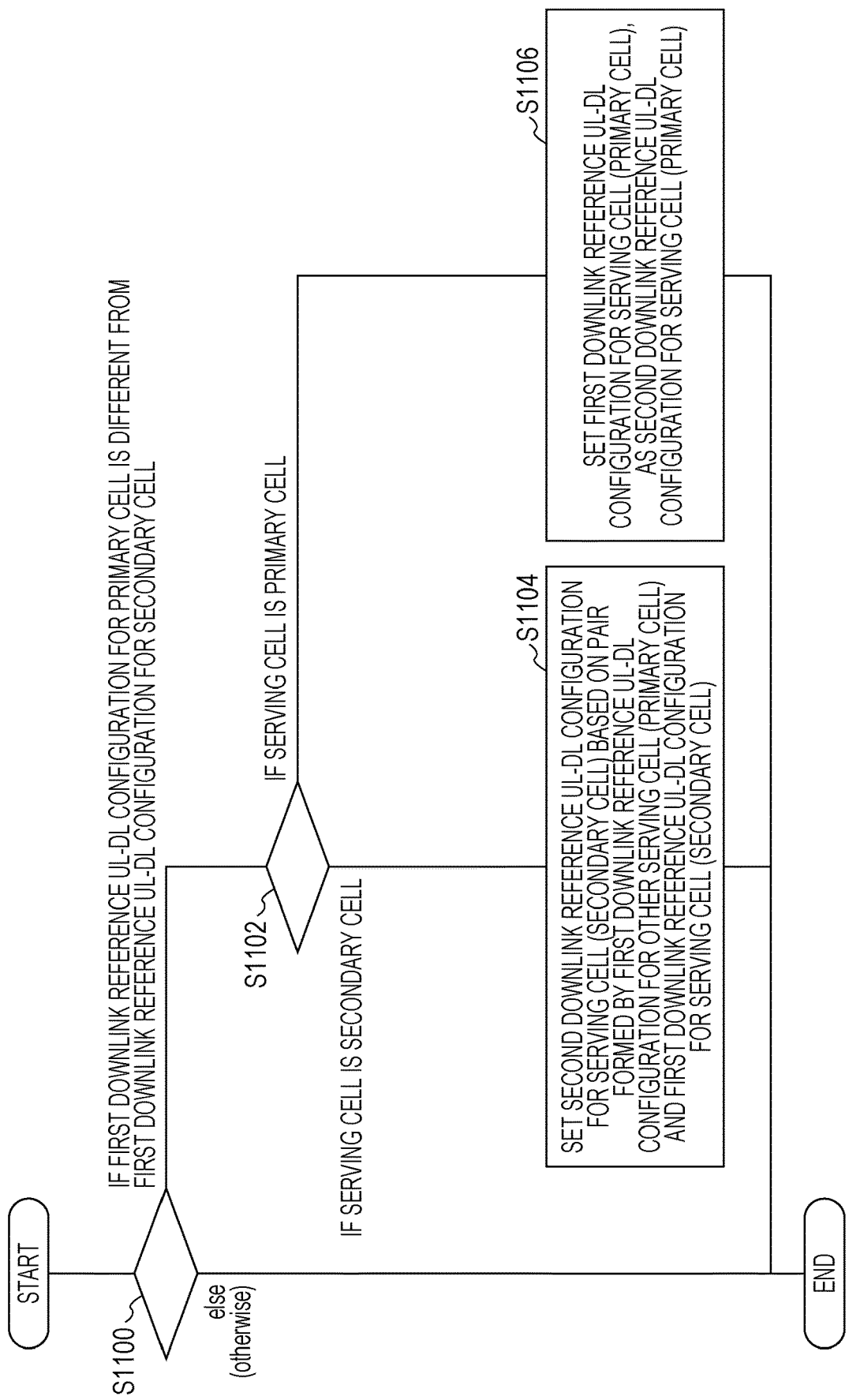
FIG. 11 is a flowchart illustrating a setting method of a second DL reference UL-DL configuration.

FIG. 11 is a flowchart illustrating the setting method of the second DL reference UL-DL configuration in the embodiment. FIG. 11 illustrates that one primary cell and one secondary cell are configured for the terminal device 1. The terminal device 1 may perform the setting method in FIG. 11, for each of the primary cell and the secondary cell.

The terminal device 1 determines whether or not a first DL reference UL-DL configuration for the primary cell is different from a first DL reference UL-DL configuration for the secondary cell (S1100). Here, in a case where the first DL reference UL-DL configuration for the primary cell is the same as the first DL reference UL-DL configuration for the secondary cell, the terminal device 1 does not set the second DL reference UL-DL configuration and ends a setting process for the second DL reference UL-DL configuration.

In a case where the first DL reference UL-DL configuration for the primary cell is different from the first DL reference UL-DL configuration for the secondary cell, the terminal device 1 determines whether a serving cell is the primary cell or the secondary cell (S1102).

Here, in a case where the serving cell is the secondary cell, the terminal device 1 sets the second UL reference UL-DL configuration for the serving cell (secondary cell) based on a pair formed by a first DL reference UL-DL configuration for the other serving cell (that is, primary cell), and a first DL reference UL-DL configuration for the serving cell (secondary cell) (S1104).

For example, in S1104, the terminal device 1 sets the second DL reference UL-DL configuration for the serving cell (secondary cell), based on a table in FIG. 12. FIG. 12 is a diagram illustrating a correspondence between a pair and the second DL reference UL-DL configuration for the secondary cell. The pair is formed by the first DL reference UL-DL configuration for the primary cell and the first DL reference UL-DL configuration for the secondary cell.

In FIG. 12, the primary cell UL-DL configuration refers to the first DL reference UL-DL configuration for the primary cell. The secondary cell UL-DL configuration refers to the first DL reference UL-DL configuration for the secondary cell.

For example, in a case where the pair formed by the first DL reference UL-DL configuration is set for the primary cell, and the first DL reference UL-DL configuration for the secondary cell belongs to Set 1 in FIG. 12, the second DL reference UL-DL configuration for the secondary cell is defined in Set 1.

For example, in a case where the terminal device 1 is not configured so as to monitor a PDCCH/EPDCCH which corresponds to the secondary cell and has an attached CIF, in the primary cell, and a pair formed by the first DL reference UL-DL configuration for the primary cell and the first DL reference UL-DL configuration for the secondary cell belongs to Set 2 in FIG. 12, the second DL reference UL-DL configuration for the secondary cell is defined in Set 2.

In a case where the first DL reference UL-DL configuration 1 is set for the primary cell, and the first DL reference UL-DL configuration 0 is set for the secondary cell, the second DL reference UL-DL configuration 1 is set for the secondary cell.

In a case where the serving cell is the primary cell, the first DL reference UL-DL configuration for the serving cell (primary cell) is set as the second DL reference UL-DL configuration for the serving cell (primary cell) (S1106).

Similarly, the base station device 3 sets the second DL reference UL-DL configuration based on the setting method illustrated in FIG. 11.

The first UL reference UL-DL configuration will be described below.

The first UL reference UL-DL configuration is used at least for specifying a subframe which allows or does not allow transmission of an uplink in a cell. Here, in the following descriptions, "specifying" includes at least the meaning of "determining", "selecting", and "instructing".

For example, the terminal device 1 does not transmit an uplink in a subframe of which an instruction as a downlink subframe is performed by using the first UL reference UL-DL configuration. The terminal device 1 does not transmit an uplink in a DwPTS and a GP of a subframe of which an instruction as a special subframe is performed by using the first UL reference UL-DL configuration.

The first DL reference UL-DL configuration will be described below.

The first DL reference UL-DL configuration is used at least for specifying a subframe which allows or does not allow transmission of a downlink in a cell.

For example, the terminal device 1 does not transmit a downlink in a subframe of which an instruction as an uplink subframe is performed by using the first DL reference UL-DL configuration. The terminal device 1 does not transmit a downlink in an UpPTS and a GP of a subframe of which an instruction as a special subframe is performed by using the first DL reference UL-DL configuration.

The terminal device 1 which sets the first DL reference UL-DL configuration based on the first information may perform measurement by using a signal of a downlink (for example, measurement relating to channel state information) in a DwPTS of a downlink subframe or a special subframe of which an instruction is performed by using the first UL reference UL-DL configuration or the first DL reference UL-DL configuration.

Here, a subframe of which an instruction as an uplink subframe is performed by using the first UL reference UL-DL configuration and of which an instruction as a downlink subframe is performed by using the first DL reference UL-DL configuration is also referred to as a first flexible subframe. The first flexible subframe may be a subframe reserved for transmitting an uplink and transmitting a downlink.

A subframe of which an instruction as a special subframe is performed by using the first UL reference UL-DL configuration and of which an instruction as a downlink subframe is performed by using the first DL reference UL-DL configuration is also referred to as a second flexible subframe. The second flexible subframe may be a subframe reserved for transmitting a downlink. The second flexible subframe may be a subframe reserved for transmitting a downlink and in a DwPTS and for transmitting an uplink in an UpPTS.

A subframe of which an instruction as an uplink subframe is performed by using the first UL reference UL-DL configuration and of which an instruction as an uplink subframe is performed by using the first DL reference UL-DL configuration is also referred to as a fixed uplink subframe. The fixed uplink subframe is reserved for transmitting an uplink.

The third UL-DL configuration will be described below.

The base station device 3 and the terminal device 1 set a third UL-DL configuration relating to a direction (up/down) of transmission in a subframe. For example, the third UL-DL configuration may be used for specifying a direction of transmission in a subframe. The third UL-DL configuration may be used for specifying the direction of transmission in a subframe (of which an instruction as a different subframe is performed), by using the first UL reference UL-DL configuration and the first DL reference UL-DL configuration.

That is, the terminal device 1 controls transmission in the first flexible subframe and the second flexible subframe, based on scheduling information (DCI format and/or HARQ-ACK) and the third UL-DL configuration.

For example, the third information indicating the third UL-DL configuration may be information for performing an instruction of a subframe which allows transmission of an uplink. The third information indicating the third UL-DL configuration may be information for performing an instruction of a subframe which allows transmission of a downlink. The third information indicating the third UL-DL configuration may be information for performing an instruction of a subframe which allows transmission of an uplink in an UpPTS and transmission of a downlink in a DwPTS.

The base station device 3 may perform scheduling of transmission of a downlink in a subframe of which an instruction as a downlink subframe is performed by using the third UL-DL configuration. The terminal device 1 may perform a process of receiving a downlink in the subframe of which an instruction as a downlink subframe is performed by using the third UL-DL configuration.

The base station device 3 may perform scheduling of transmission of an uplink in a subframe of which an instruction as an uplink subframe is performed by using the third UL-DL configuration. The terminal device 1 may perform a process of transmitting an uplink in the subframe of which an instruction as an uplink subframe is performed by using the third UL-DL configuration.

The base station device 3 may perform scheduling of transmission of a downlink in a DwPTS of a subframe of which an instruction as a special subframe is performed by using the third UL-DL configuration. The terminal device 1 may perform a process of receiving a downlink in the DwPTS of the subframe of which an instruction as a special subframe is performed by using the third UL-DL configuration.

Here, the third UL-DL configuration may be used when the terminal device performs an instruction (notification) of a downlink subframe in which a PDCCH and/or EPDCCH is monitored. The third UL-DL configuration (third information) may be used when the terminal device performs an instruction (notification) of a downlink subframe in which channel state information is measured (downlink subframe in which measuring channel state information is allowed).

The first UL reference UL-DL configuration and the second UL reference UL-DL configuration will be described below.

The first UL reference UL-DL configuration and the second UL reference UL-DL configuration may be used for specifying a correspondence between a subframe n in which a PDCCH/EPDCCH/PHICH is allocated, and a subframe (n+k) in which a PUSCH corresponding to the PDCCH/EPDCCH/PHICH is allocated.

For example, in a case where one primary cell is configured, or in a case where one primary cell and one secondary cell are configured, and the first UL reference UL-DL configuration for the primary cell is the same as the first UL reference UL-DL configuration for the secondary cell, in each of the two serving cells, the corresponding first UL reference UL-DL configuration is used for specifying a correspondence between a subframe in which a PDCCH/EPDCCH/PHICH is allocated, and a subframe in which a PUSCH corresponding to the PDCCH/EPDCCH/PHICH is allocated.

In a case where one primary cell and one secondary cell are configured, and the first UL reference UL-DL configuration for the primary cell is different from the first UL reference UL-DL configuration for the secondary cell, in each of the two serving cells, the corresponding second UL reference UL-DL configuration is used for specifying a correspondence between a subframe in which a PDCCH/EPDCCH/PHICH is allocated, and a subframe in which a PUSCH corresponding to the PDCCH/EPDCCH/PHICH is allocated.

FIG. 13 is a diagram illustrating a correspondence between a subframe n in which a PDCCH/EPDCCH/PHICH is allocated, and a subframe (n+k) in which a PUSCH corresponding to the PDCCH/EPDCCH/PHICH is allocated, in the embodiment. The terminal device 1 specifies a value of k in accordance with the table in FIG. 13.

In FIG. 13, in a case where one primary cell is configured or in a case where one primary cell and one secondary cell are configured, and the first UL reference UL-DL configuration for the primary cell is the same as the first UL reference UL-DL configuration for the secondary cell, the first UL reference UL-DL configuration is referred as an UL reference UL-DL configuration.

In a case where one primary cell and one secondary cell are configured and the first UL reference UL-DL configuration for the primary cell is different from the first UL reference UL-DL configuration for the secondary cell, the second UL reference UL-DL configuration is referred as an UL reference UL-DL configuration.

In the following descriptions, in FIG. 13, the first UL reference UL-DL configuration and the second UL reference UL-DL configuration are simply referred to as an UL-DL configuration.

For example, in a case where the terminal device 1 detects a PDCCH/EPDCCH which corresponds to a cell in which UL-DL configurations 1 to 6 are set, and has an attached uplink grant in which the terminal device 1 is set as a target, in a subframe n, the terminal device 1 performs transmission on a PUSCH in accordance with the uplink grant, in a subframe (n+k) specified based on the table in FIG. 13.

In a case where the terminal device 1 detects a PHICH which corresponds to a cell in which UL-DL configurations 1 to 6 are set, and has attached NACK in which the terminal device 1 is set as a target, in a subframe n, transmission on a PUSCH is performed in a subframe (n+k) specified based on the table in FIG. 13.

An uplink grant which corresponds to a cell in which the UL-DL configuration 0 is configured and which sets the terminal device 1 as a target includes a 2-bit uplink index (UL index). An uplink grant which corresponds to a cell in which UL-DL configurations 1 to 6 are configured, and which sets the terminal device 1 as a target does not include the uplink index (UL index).

In a case where the most significant bit (MSB) of the uplink index included in the uplink grant which corresponds to a cell in which the UL-DL configuration 0 is set is set to 1, in the subframe n, the terminal device 1 performs transmission on a PUSCH (adjusts transmission on the PUSCH) in accordance with the uplink grant, in the subframe (n+k) specified based on the table in FIG. 13.

In a case where the terminal device 1 receives a PHICH having attached NACK which corresponds to a cell in which the UL-DL configuration 0 is set in a first resource set in the subframe n=0 or 5, the terminal device 1 performs transmission on a PUSCH in accordance with the PHICH, in the subframe (n+k) specified based on the table in FIG. 13.

In a case where the least significant bit (LSB) of the uplink index included in the uplink grant which corresponds to a cell in which the UL-DL configuration 0 is set is set to 1, in the subframe n, the terminal device 1 performs transmission on a PUSCH in accordance with the uplink grant, in a subframe (n+7).

In a case where the terminal device 1 receives a PHICH having attached NACK which corresponds to a cell in which the UL-DL configuration 0 is set, in a second resource set in the subframe n=0 or 5, the terminal device 1 performs transmission on a PUSCH in accordance with the uplink grant, in accordance with the subframe (n+7).

In a case where the terminal device 1 receives a PHICH having attached NACK which corresponds to a cell in which the UL-DL configuration 0 is set, in the subframe n=1 or 6, the terminal device 1 performs transmission on a PUSCH in accordance with the uplink grant, in the subframe (n+7).

For example, in a case where the terminal device 1 detects a PDCCH/EPDCCH/PHICH corresponding to a cell in which the UL-DL configuration 0 is set, in [SFN=m, subframe 1], the terminal device 1 performs transmission on a PUSCH in a subframe [SFN=m, subframe 7] after six subframes.

The first UL reference UL-DL configuration and the second UL reference UL-DL configuration may be used for specifying a correspondence between a subframe n in which a PUSCH is allocated, and a subframe (n+k) in which a PHICH corresponding to the PUSCH is allocated.

That is, for example, in a case where one primary cell is configured or in a case where one primary cell and one secondary cell are configured, and the first UL reference UL-DL configuration for the primary cell is the same as the first UL reference UL-DL configuration for the secondary cell, in each of the two serving cells, the corresponding first UL reference UL-DL configuration is used for specifying a correspondence between the subframe n in which a PUSCH is allocated, and the subframe (n+k) in which a PHICH corresponding to the PUSCH is allocated.

In a case where one primary cell and one secondary cell are configured, and the first UL reference UL-DL configuration for the primary cell is different from the first UL reference UL-DL configuration for the secondary cell, in each of the two serving cells, the corresponding second UL reference UL-DL configuration is used for specifying a correspondence between a subframe n in which a PUSCH is allocated, and a subframe (n+k) in which a PHICH corresponding to the PUSCH is allocated.

FIG. 14 is a diagram illustrating a correspondence between a subframe n in which a PUSCH is allocated, and a subframe (n+k) in which a PHICH corresponding to the PUSCH is allocated, in the embodiment. The terminal device 1 specifies a value of k in accordance with the table in FIG. 14.

In FIG. 14, in a case where one primary cell is configured or in a case where one primary cell and one secondary cell are configured, and the first UL reference UL-DL configuration for the primary cell is the same as the first UL reference UL-DL configuration for the secondary cell, the first UL reference UL-DL configuration is referred as an UL reference UL-DL configuration.

In a case where one primary cell and one secondary cell are configured and the first UL reference UL-DL configuration for the primary cell is different from the first UL reference UL-DL configuration for the secondary cell, the second UL reference UL-DL configuration is referred as an UL reference UL-DL configuration.

In the following descriptions, in FIG. 14, the first UL reference UL-DL configuration and the second UL reference UL-DL configuration are simply referred to as an UL-DL configuration.

In a case where transmission on a PUSCH is scheduled in the subframe n, the terminal device 1 specifies a PHICH resource in the subframe (n+k) specified based on the table in FIG. 14.

For example, in a case where transmission on a PUSCH is scheduled for a cell in which the UL-DL configuration 0 is set, in [SFN=m, subframe n=2], the PHICH resource is specified in [SFN=m, subframe n=6].

The first DL reference UL-DL configuration and the second DL reference UL-DL configuration will be described below.

The first DL reference UL-DL configuration and the second DL reference UL-DL configuration are used for specifying a correspondence between the subframe n in which a PDSCH is allocated, and a subframe (n+k) in which HARQ-ACK corresponding to the PDSCH is transmitted.

For example, in a case where one primary cell is configured or in a case where one primary cell and one secondary cell are configured, and the first DL reference UL-DL configuration for the primary cell is the same as the first DL reference UL-DL configuration for the secondary cell, in each of the two serving cells, the corresponding first DL reference UL-DL configuration is used for specifying a correspondence between the subframe n in which a PDSCH is allocated, and the subframe (n+k) in which HARQ-ACK corresponding to the PDSCH is transmitted.

In a case where one primary cell and one secondary cell are configured, and the first DL reference UL-DL configuration for the primary cell is different from the first DL reference UL-DL configuration for the secondary cell, in each of the two serving cells, the corresponding second DL reference UL-DL configuration is used for specifying a correspondence between the subframe n in which a PDSCH is allocated, and the subframe (n+k) in which HARQ-ACK corresponding to the PDSCH is transmitted.

FIG. 15 is a diagram illustrating a correspondence between a subframe (n−k) in which a PDSCH is allocated, and a subframe n in which HARQ-ACK corresponding to the PDSCH is allocated, in the embodiment. The terminal device 1 specifies a value of k in accordance with the table in FIG. 15.

Here, a set of $k_i$ in each square in FIG. 15 is also referred to as an association set index K $\{k_0, k_1, \ldots, k_{M-1}\}$ of a downlink (downlink association set index K $\{k_0, k_1, \ldots, k_{M-1}\}$). In FIG. 15, each of $k_0, k_1, \ldots, k_{M-1}$ is also referred to as an element in the set K. M indicates the number of elements in the set K associated with an uplink subframe n.

In FIG. 15, in a case where one primary cell is configured, or in a case where one primary cell and one secondary cell are configured, and the first DL reference UL-DL configuration for the primary cell is the same as the first DL reference UL-DL configuration for the secondary cell, the first DL reference UL-DL configuration is referred as a DL reference UL-DL configuration.

In a case where one primary cell and one secondary cell are configured, and the first DL reference UL-DL configuration for the primary cell is different from the first DL reference UL-DL configuration for the secondary cell, the second DL reference UL-DL configuration is referred to as the DL reference UL-DL configuration.

In the following descriptions, in FIG. 15, the first DL reference UL-DL configuration and the second DL reference UL-DL configuration are simply referred to as an UL-DL configuration.

In a case where the terminal device 1 detects transmission on a PDSCH in which the terminal device 1 is set as a target and transmission of the corresponding HARQ-ACK is required, in a subframe (n−k) (k is specified by the table in FIG. 15) of a serving cell, the terminal device 1 transmits HARQ-ACK in a subframe n.

That is, the terminal device 1 transmits HARQ-ACK in an uplink subframe n, based on detection of transmission on a PDSCH in a subframe (n−k) (may be a plurality of subframes). The terminal device 1 may transmit HARQ-ACK in the uplink subframe n, based on detection of a PDCCH/EPDCCH of performing an instruction of SPS release of a downlink in the subframe (n−k) (may be a plurality of subframes). Here, k∈K is satisfied. K is illustrated in FIG. 15 and is defined for requiring a supply of HARQ-ACK.

Here, for example, the terminal device 1 does not perform a response of HARQ-ACK to transmission on the PDSCH which is used in transmission of system information. The terminal device 1 performs a response of HARQ-ACK to transmission on a PDSCH scheduled by a DCI format which has attached CRC scrambled by a C-RNTI.

For example, the terminal device 1 transmits HARQ-ACK in response to transmission on the PDSCH received in a subframe (n−6) and/or (n−7), in a cell in which the UL-DL configuration 1 is set in the subframe n=2. That is, in the UL-DL configuration 1, the number M of elements in the set K associated with the subframe n (uplink subframe n) is 2 (M=2).

Here, in a case where second information is not received, the first DL reference UL-DL configuration may not be configured. In this case, the base station device 3 and the terminal device 1 may perform a process which is performed based on the above-described first DL reference UL-DL configuration, based on the first UL reference UL-DL configuration (serving cell UL-DL configuration).

For example, in a case where one primary cell and one secondary cell are configured, second information for the primary cell is received without receiving second information for the secondary cell, the first UL reference UL-DL configuration (serving cell UL-DL configuration) for the secondary cell is different from the first DL reference UL-DL configuration for the primary cell, and the serving cell is the secondary cell, the second DL reference UL-DL configuration for the serving cell (secondary cell) may be set based on a pair formed by the first DL reference UL-DL configuration for the other serving cell (primary cell) and the first UL reference UL-DL configuration for the serving cell (secondary cell).

For example, in a case where one primary cell and one secondary cell are configured, second information for the secondary cell is received without receiving second information for the primary cell, the first UL reference UL-DL configuration (serving cell UL-DL configuration) for the primary cell is different from the first DL reference UL-DL configuration for the secondary cell, and the serving cell is the secondary cell, the second DL reference UL-DL configuration for the serving cell (secondary cell) may be set based on a pair formed by the first UL reference UL-DL configuration for the other serving cell (primary cell) and the first DL reference UL-DL configuration for the serving cell (secondary cell).

For example, in a case where one primary cell and one secondary cell are configured, second information for the secondary cell is received without receiving second information for the primary cell, the first UL reference UL-DL configuration (serving cell UL-DL configuration) for the primary cell is different from the first DL reference UL-DL configuration for the secondary cell, and the serving cell is the secondary cell, in each of the two serving cells, the corresponding second DL reference UL-DL configuration may be used for specifying a correspondence between a subframe n in which a PDSCH is allocated, and a subframe (n+k) in which HARQ-ACK corresponding to the PDSCH is transmitted.

For example, in a case where one primary cell and one secondary cell are configured, second information for the secondary cell is received without receiving second information for the primary cell, and the first UL reference UL-DL configuration (serving cell UL-DL configuration) for the primary cell is the same as the first DL reference UL-DL configuration for the secondary cell, in the primary cell, the corresponding first UL reference UL-DL configuration (serving cell UL-DL configuration) may be used for specifying a correspondence between the subframe n in which a PDSCH is allocated, and the subframe (n+k) in which HARQ-ACK corresponding to the PDSCH is transmitted. In the secondary cell, the corresponding first DL reference UL-DL configuration may be used for specifying a correspondence between the subframe n in which a PDSCH is allocated, and the subframe (n+k) in which HARQ-ACK corresponding to the PDSCH is transmitted.

For example, in a case where one primary cell and one secondary cell are configured, second information for the secondary cell is received without receiving second information for the primary cell, and the first UL reference UL-DL configuration (serving cell UL-DL configuration) for the primary cell is different from the first DL reference UL-DL configuration for the secondary cell, in the primary cell, in FIGS. 10 and 12, the primary cell UL-DL configuration may refer to the first UL reference UL-DL configuration for the primary cell.

Here, the second UL reference UL-DL configuration and the second DL reference UL-DL configuration may not be set for a serving cell in which the first DL reference UL-DL configuration is set.

FIG. 16 is a diagram illustrating a configuration of a special subframe (Special subframe configuration) in the embodiment. In the embodiment, a normal cyclic prefix (CP) may be applied (supported) in a downlink. An extended cyclic prefix (CP) may be applied in the downlink. A normal CP may be applied in an uplink. An extended CP may be applied in the uplink.

Here, the total length of a DwPTS, a GP, and an UpPTS may be 30720 and Ts=1 ms. The DwPTS may be a field reserved for downlink transmission. The UpPTS may be a field reserved for uplink transmission. The GP may be a field in which downlink transmission and uplink transmission is not performed.

That is, the length of the DwPTS may be set based on the configuration of a special subframe. The length of the UpPTS may be set based on the configuration of a special subframe. The length of the GP may be set based on the configuration of a special subframe.

The base station device 3 may transmit a parameter (specialSubframe Patterns) to the terminal device 1. The parameter (specialSubframe Patterns) indicates the configuration of a special subframe. For example, the base station device 3 may transmit the parameter indicating the configuration of a special subframe, to the terminal device 1 with including at least one of an MIB, a system information block type 1 message, a system information message, an RRC message, an MAC control element (CE), and control information (for example, DCI format) of a physical layer.

Setting a configuration i as the configuration of a special subframe is described below as setting a special subframe configuration i.

Here, a plurality of formats of a PUCCH is defined (supported) for transmission of HARQ-ACK (may be transmission of uplink control information).

For example, PUCCH format 1b for up to 4-bit HARQ-ACK with channel selection is used. PUCCH format 3 for up to 20-bit HARQ-ACK is used. Here, PUCCH format 3 may be used for up to 20-bit HARQ-ACK and 1-bit scheduling request (1-bit positive/negative SR).

Here, PUCCH format 3 may be used for spatially bundled HARQ-ACK of up to 20-bit and the 1-bit scheduling request. PUCCH format 3 may be used for HARQ-ACK, a scheduling request, and a CSI which are up to 22 bits. PUCCH format 3 may be used for spatially bundled HARQ-ACK, a scheduling request, and a CSI which are up to 22 bits.

Here, spatial HARQ-ACK bundling over a plurality of code words in one subframe in one serving cell may be performed by a logical AND operation of all the corresponding individual HARQ-ACKs.

The base station device 3 may configure a format of a PUCCH used in transmission of HARQ-ACK, for the terminal device 1. For example, the base station device 3 may transmit a parameter (pucch-Format) to the terminal device 1 with including an RRC message, in response to transmission of HARQ-ACK. The parameter (pucch-Format) is for performing an instruction of one among a plurality of formats of a PUCCH. The base station device 3 performs configuring so as to use any of PUCCH format 1b and PUCCH format 3 with channel selection, in response to transmission of the HARQ-ACK.

Here, the following descriptions may be applied for TDD in a case where PUCCH format 1b with channel selection is configured for transmission of HARQ-ACK. The following descriptions may be applied for TDD in a case where PUCCH format 3 is configured for transmission of HARQ-ACK.

Basically, an operation of the terminal device 1 will be described below. However, the base station device 3 may also perform similar operation corresponding to the terminal device 1.

The terminal device 1 may determine the number of HARQ-ACK bits associated with the uplink subframe n, based on Expression 1.

$$O = \sum_{c=1}^{N_{cells}^{DL}} O_c^{ACK} \qquad \text{[Expression 1]}$$

Here, in Expression 1, O indicates the number of HARQ-ACK bits. $N_{cells}^{DL}$ indicates the number of configured cells. $O_c^{ACK}$ indicates the number of HARQ-ACK bits for a c-th cell (c?0). Here, the c-th cell may mean a certain cell.

The HARQ-ACK bits of $o_{c,0}^{ACK}, o_{c,1}^{ACK}, \ldots, o_{c,j}^{ACK}$ ($j=O_c^{ACK}-1$) for the c-th cell are constituted as follows. For example, in a case where a transmission mode configured in the c-th cell supports one transport block (transmission f one downlink transport block), $O_c^{ACK}=B_c^{DL}$ may be applied. For example, in a case where spatial bundling in the c-th cell is applied, $O_c^{ACK}=B_c^{DL}$ may be applied. For example, in a case where the transmission mode configured in the c-th cell supports transport blocks of up to two (transmission of downlink transport blocks of up to two), and spatial bundling is not applied, $O_c^{ACK}=2B_c^{DL}$ may be applied.

Here, in a case where the transmission mode configured in the c-th cell supports one transport block, regarding DL reference UL-DL configurations 1-6, HARQ-ACK for transmission on a PDSCH of which an instruction is performed by the corresponding PDCCH/EPDCCH or HARQ-ACK for a PDCCH/EPDCCH for performing an instruction of downlink SPS release in the subframe (n–k) is associated with $o_{c,\ DAI(k)-1}^{ACK}$.

In a case where the transmission mode configured in the c-th cell supports transport blocks of up to two, regarding the DL reference UL-DL configurations 1-6, HARQ-ACK for transmission on a PDSCH of which an instruction is performed by the corresponding PDCCH/EPDCCH or HARQ-ACK for a PDCCH/EPDCCH for performing an instruction of downlink SPS release in the subframe (n–k) is associated with $o_{c,\ DAI(k)-2}^{ACK}$ and $o_{c,\ DAI(k)-1}^{ACK}$.

Here, DAI(k) indicates a value of the DAI in a DCI format for a downlink, which is detected in the subframe (n–k). $o_{c,\ DAI(k)-2}^{ACK}$ and $o_{c,\ DAI(k)-1}^{ACK}$ respectively indicate HARQ-ACK for the code word 0 and the code word 1.

In a case where the transmission mode configured in the c-th cell supports one transport block, regarding the DL reference UL-DL configuration 0, HARQ-ACK for transmission on a PDSCH of which an instruction is performed by the corresponding PDCCH/EPDCCH or HARQ-ACK for a PDCCH/EPDCCH for performing an instruction of downlink SPS release in the subframe (n–k) is associated with $o_{c,\ 0}^{ACK}$.

In a case where the transmission mode configured in the c-th cell supports transport blocks of up to two, regarding the DL reference UL-DL configuration 0, HARQ-ACK for transmission on a PDSCH of which an instruction is performed by the corresponding PDCCH/EPDCCH or HARQ-ACK for a PDCCH/EPDCCH for performing an instruction of downlink SPS release in the subframe (n–k) is associated with $o_{c,\ 0}^{ACK}$ and $o_{c,\ 1}^{ACK}$. Here, $o_{c,\ 0}^{ACK}$ and $o_{c,\ 1}^{ACK}$ respectively indicate HARQ-ACK for the code word 0 and the code word 1.

Here, the base station device 3 may perform configuring for the terminal device 1 so as to receive transmission on a PDSCH, based on one of a plurality of transmission modes. For example, the base station device 3 may configure a transmission mode of a downlink, for the terminal device 1 by using an RRC message.

$B_c^{DL}$ indicates the number of downlink subframes in which the terminal device 1 has necessity for transmitting HARQ-ACK for the c-th cell. Here, $B_c^{DL}$ may indicate the number of downlink subframes and special subframes in which the terminal device 1 has necessity for transmitting HARQ-ACK for the c-th cell. That is, $B_c^{DL}$ may indicate the number of performing transmission on a PDSCH in which the terminal device 1 has necessity for transmitting HARQ-ACK for the c-th cell. $B_c^{DL}$ may indicate the number of performing transmission on a PDSCH and the number of performing transmission of a PDCCH/EPDCCH for performing an instruction of SPS release of a downlink. In the PDSCH and the PDCCH/EPDCCH, the terminal device 1 has necessity for transmitting HARQ-ACK for the c-th cell.

Here, $B_c^{DL}=M$ may be satisfied in a case where it is assumed that the terminal device 1 performs transmission on a PUCCH. As described above, M indicates the number of elements in the set K associated with an uplink subframe n. Here, in this case, the set K does not include a special subframe of special subframe configurations 0 and 5 with normal downlink CP or of special subframe configurations 0 and 4 with extended downlink CP.

That is, in a case where special subframe configurations other than the case of the special subframe configurations 0 and 5 with the normal downlink CP or the special subframe configurations 0 and 4 with the extended downlink CP are set for the c-th cell, the terminal device 1 may determine a HARQ-ACK bit for the c-th cell by using $B_c^{DL}=M$.

$B_c^{DL}=M-1$ may be satisfied in a case where it is assumed that the terminal device 1 performs transmission on the PUCCH. Here, in this case, the set K includes a special subframe of special subframe configurations 0 and 5 with normal downlink CP or of special subframe configurations 0 and 4 with extended downlink CP.

That is, in a case where the special subframe configurations 0 and 5 with the normal downlink CP or the special subframe configurations 0 and 4 with the extended downlink CP are set for the c-th cell, the terminal device 1 may determine a HARQ-ACK bit for the c-th cell by using $B_c^{DL}=M-1$.

That is, in a case where the special subframe configurations 0 and 5 with the normal downlink CP or the special subframe configurations 0 and 4 with the extended downlink CP are set for the c-th cell, the terminal device 1 may exclude the special subframe of the c-th cell from subframes used for determining a HARQ-ACK bit.

That is, regarding the special subframe configurations 0 and 5 with the normal downlink CP or the special subframe configurations 0 and 4 with the extended downlink CP, the terminal device 1 may not expect transmission on a PDSCH in a DwPTS of the special subframe. The terminal device 1 may determine whether or not transmission on a PDSCH in the DwPTS of the special subframe is expected, based on the length of the CP and the configuration of the special subframe.

That is, regarding the special subframe configurations 0 and 5 with the normal downlink CP or the special subframe configurations 0 and 4 with the extended downlink CP, transmission on a PDSCH may not be performed in the DwPTS of the special subframe.

Regarding the special subframe configurations 0 and 5 with the normal downlink CP or the special subframe configurations 0 and 4 with the extended downlink CP, the terminal device 1 may not monitor an EPDCCH in the DwPTS of the special subframe. The terminal device 1 may determine whether or not the EPDCCH is monitored in the DwPTS of the special subframe, based on the length of the CP and the configuration of the special subframe.

That is, regarding the special subframe configurations 0 and 5 with the normal downlink CP or the special subframe configurations 0 and 4 with the extended downlink CP, transmission on an EPDCCH may not be performed in the DwPTS of the special subframe.

Here, as described above, determination of a HARQ-ACK bit (determination of the number of HARQ-ACK bits, determination of the payload size of HARQ-ACK, and determination of the number of reserved HARQ-ACK fields) is also referred to as determination of the codebook size of HARQ-ACK.

That is, in a certain cell, regarding the special subframe configurations 0 and 5 with the normal downlink CP or the special subframe configurations 0 and 4 with the extended downlink CP, the special subframe of the cell may be excluded from the determination of the HARQ-ACK codebook size.

With the determination method of the HARQ-ACK codebook size until now, a communication method in the embodiment will be described below in detail.

Here, in the following descriptions, the first UL reference UL-DL configuration and the second UL reference UL-DL configuration are also collectively referred to as an UL reference UL-DL configuration. The first DL reference UL-DL configuration and the second DL reference UL-DL configuration are also collectively referred to as a DL reference UL-DL configuration.

In a case where the first UL reference UL-DL configuration is set and the second UL reference UL-DL configuration is not set, the UL reference UL-DL configuration may correspond to the first UL reference UL-DL configuration. In a case where the first UL reference UL-DL configuration is set and the second UL reference UL-DL configuration is set, the UL reference UL-DL configuration may correspond to the first UL reference UL-DL configuration. In a case where the first UL reference UL-DL configuration is set and the second UL reference UL-DL configuration is set, the UL reference UL-DL configuration may correspond to the second UL reference UL-DL configuration.

In a case where the first DL reference UL-DL configuration is set and the second DL reference UL-DL configuration is not set, the DL reference UL-DL configuration may correspond to the first DL reference UL-DL configuration. In a case where the first DL reference UL-DL configuration is set and the second DL reference UL-DL configuration is set, the DL reference UL-DL configuration may correspond to the first DL reference UL-DL configuration. In a case where the first DL reference UL-DL configuration is set and the second DL reference UL-DL configuration is set, the DL reference UL-DL configuration may correspond to the second DL reference UL-DL configuration.

FIG. 17 is a diagram illustrating the communication method in the embodiment. Here, FIG. 17 illustrates a case where the UL reference UL-DL configuration 0, the DL reference UL-DL configuration 2, and the third UL-DL configuration 4 are set for a certain cell, as an example. The terminal device 1 determines the HARQ-ACK codebook size for the cell.

That is, the subframe 6 in FIG. 17 is a subframe of which an instruction as a special subframe is performed based on the UL reference UL-DL configuration. The subframe 6 in FIG. 17 is a subframe of which an instruction as a special subframe is performed based on the DL reference UL-DL configuration. The subframe 6 in FIG. 17 is a subframe of which an instruction as a downlink subframe is performed based on the third UL-DL configuration.

That is, in the embodiment, a configuration (may be a reconfiguration) is supported between the downlink-to-uplink switch-point periodicity of 5 ms and the downlink-to-uplink switch-point periodicity of 10 ms.

For example, an UL-DL configuration of the downlink-to-uplink switch-point periodicity of 5 ms may be set based on the UL reference UL-DL configuration. An UL-DL configuration of the downlink-to-uplink switch-point periodicity of 10 ms may be set based on the third UL-DL configuration. In addition, the UL-DL configuration of the downlink-to-uplink switch-point periodicity of 10 ms may be set based on the UL reference UL-DL configuration. The UL-DL configuration of the downlink-to-uplink switch-point periodicity of 5 ms may be set based on the third UL-DL configuration.

Here, the terminal device 1 may determine a special subframe used for determining the HARQ-ACK codebook size, based on the DL reference UL-DL configuration. That is, the terminal device 1 may determine whether or not a subframe (that is, subframe 6 in FIG. 17) of which an instruction as a special subframe is performed based on the DL reference UL-DL configuration is used for determining the HARQ-ACK codebook size, based on whether or not the special subframe configurations 0 and 5 with the normal downlink CP or the special subframe configurations 0 and 4 with the extended downlink CP are set.

For example, in a case where special subframe configurations other than the case of the special subframe configurations 0 and 5 with the normal downlink CP or the special subframe configurations 0 and 4 with the extended downlink CP are set, the terminal device 1 may use a subframe (that is, subframe 6 in FIG. 17) of which an instruction as a special subframe is performed based on the DL reference UL-DL configuration, in order to determine the HARQ-ACK codebook size. That is, in this case, the terminal device 1 may determine the HARQ-ACK codebook size by using $B_c^{DL}=M$.

In a case where the special subframe configurations 0 and 5 with the normal downlink CP or the special subframe configurations 0 and 4 with the extended downlink CP are set, the terminal device 1 may exclude a subframe (that is, subframe 6 in FIG. 17) of which an instruction as a special subframe is performed based on the DL reference UL-DL configuration, from the determination of the HARQ-ACK codebook size. That is, in this case, the terminal device 1 may determine the HARQ-ACK codebook size by using $B_c^{DL}=M-1$.

That is, regarding the special subframe configurations 0 and 5 with the normal downlink CP or the special subframe configurations 0 and 4 with the extended downlink CP, the terminal device 1 may not expect transmission on a PDSCH in a DwPTS of a subframe (that is, subframe 6 in FIG. 17) of which an instruction as a special subframe is performed based on the DL reference UL-DL configuration.

Regarding special subframe configurations other than the special subframe configurations 0 and 5 with the normal downlink CP or the special subframe configurations 0 and 4 with the extended downlink CP, the terminal device 1 may expect transmission on a PDSCH in a DwPTS of a subframe (that is, subframe 6 in FIG. 17) of which an instruction as a special subframe is performed based on the DL reference UL-DL configuration.

That is, the terminal device 1 may determine whether or not transmission on a PDSCH in the DwPTS of a subframe (that is, subframe 6 in FIG. 17) of which an instruction as a special subframe is performed based on the DL reference UL-DL configuration is expected, based on the length of the CP and the configuration of the special subframe.

Regarding the special subframe configurations 0 and 5 with the normal downlink CP or the special subframe configurations 0 and 4 with the extended downlink CP, transmission on a PDSCH may not be performed in the DwPTS of a subframe (that is, subframe 6 in FIG. 17) of which an instruction as a special subframe is performed based on the DL reference UL-DL configuration.

Regarding special subframe configurations other than the special subframe configurations 0 and 5 with the normal downlink CP or the special subframe configurations 0 and 4 with the extended downlink CP, transmission on a PDSCH may be performed in the DwPTS of a subframe (that is, subframe 6 in FIG. 17) of which an instruction as a special subframe is performed based on the DL reference UL-DL configuration.

Regarding the special subframe configurations 0 and 5 with the normal downlink CP or the special subframe configurations 0 and 4 with the extended downlink CP, the terminal device 1 may not monitor an EPDCCH in the DwPTS of a subframe (that is, subframe 6 in FIG. 17) of which an instruction as a special subframe is performed based on the DL reference UL-DL configuration.

Regarding special subframe configurations other than the special subframe configurations 0 and 5 with the normal downlink CP or the special subframe configurations 0 and 4 with the extended downlink CP, the terminal device 1 may monitor an EPDCCH in the DwPTS of a subframe (that is, subframe 6 in FIG. 17) of which an instruction as a special subframe is performed based on the DL reference UL-DL configuration.

That is, the terminal device 1 may determine whether or not the terminal device 1 monitors an EPDCCH in the DwPTS of a subframe (that is, subframe 6 in FIG. 17) of which an instruction as a special subframe is performed based on the DL reference UL-DL configuration, based on the length of the CP and the configuration of the special subframe.

Regarding the special subframe configurations 0 and 5 with the normal downlink CP or the special subframe configurations 0 and 4 with the extended downlink CP, transmission on an EPDCCH may not be performed in the DwPTS of a subframe (that is, subframe 6 in FIG. 17) of which an instruction as a special subframe is performed based on the DL reference UL-DL configuration.

Regarding special subframe configurations other than the special subframe configurations 0 and 5 with the normal downlink CP or the special subframe configurations 0 and 4 with the extended downlink CP, transmission on an EPDCCH may be performed in the DwPTS of a subframe (that is, subframe 6 in FIG. 17) of which an instruction as a special subframe is performed based on the DL reference UL-DL configuration.

That is, in a certain cell, regarding the special subframe configurations 0 and 5 with the normal downlink CP or the special subframe configurations 0 and 4 with the extended downlink CP, a special subframe of the cell, of which an instruction is performed based on the DL reference UL-DL configuration may be excluded from the determination of the HARQ-ACK codebook size. The terminal device 1 may determine the HARQ-ACK codebook size based on the DL reference UL-DL configuration, the length of the CP, and the configuration of the special subframe.

FIG. 18 is another diagram illustrating the communication method in the embodiment. Here, FIG. 18 illustrates a case where the UL reference UL-DL configuration 0, the DL reference UL-DL configuration 3, and the third UL-DL configuration 4 are set for a certain cell, as an example. The terminal device 1 determines the HARQ-ACK codebook size for the cell.

That is, the subframe 6 in FIG. 18 is a subframe of which an instruction as a special subframe is performed based on the UL reference UL-DL configuration. The subframe 6 in FIG. 18 is a subframe of which an instruction as a downlink subframe is performed based on the DL reference UL-DL configuration. The subframe 6 in FIG. 18 is a subframe of which an instruction as a downlink subframe is performed based on the third UL-DL configuration.

Here, the terminal device 1 may use a subframe (that is, subframe 6 in FIG. 18) of which an instruction as a downlink subframe is performed based on the DL reference UL-DL configuration, in order to determine the HARQ-ACK codebook size. That is, in this case, the terminal device 1 may determine the HARQ-ACK codebook size by using $B_c^{DL}=M$.

That is, the terminal device 1 may expect transmission on a PDSCH in a subframe (that is, subframe 6 in FIG. 18) of which an instruction as a downlink subframe is performed based on the DL reference UL-DL configuration. That is, a downlink subframe of a certain cell (that is, subframe 6 in FIG. 18) of which an instruction is performed based on the DL reference UL-DL configuration may be used for determining the HARQ-ACK codebook size.

The terminal device 1 may monitor an EPDCCH in a subframe (that is, subframe 6 in FIG. 18) of which an instruction as a downlink subframe is performed based on the DL reference UL-DL configuration.

FIG. 19 is still another diagram illustrating the communication method in the embodiment. Here, FIG. 19 illustrates a case where the UL reference UL-DL configuration 0, the DL reference UL-DL configuration 4, and the third UL-DL configuration 2 are set for a certain cell, as an example. The terminal device 1 determines the HARQ-ACK codebook size for the cell.

That is, the subframe 6 in FIG. 19 is a subframe of which an instruction as a special subframe is performed based on the UL reference UL-DL configuration. The subframe 6 in FIG. 19 is a subframe of which an instruction as a downlink subframe is performed based on the DL reference UL-DL configuration. The subframe 6 in FIG. 19 is a subframe of which an instruction as a special subframe is performed based on the third UL-DL configuration. A section corresponding to DL in both of the UL reference UL-DL configuration and the DL reference UL-DL configuration also corresponds to DL in the third UL-DL configuration. A section corresponding to UL in both of the UL reference UL-DL configuration and the DL reference UL-DL configuration also corresponds to UL in the third UL-DL configuration. A subframe of which an instruction as a special subframe may be performed based on the DL reference UL-DL configuration is a subframe of which an instruction as a special subframe is performed based on the UL reference UL-DL configuration. Regarding a subframe of which an instruction as a special subframe is performed based on the DL reference UL-DL configuration, an instruction as a special subframe is also performed in the third UL-DL configuration.

Here, the terminal device 1 may determine a special subframe used for determining the HARQ-ACK codebook size, based on the third UL-DL configuration. That is, the terminal device 1 may determine whether or not a subframe (that is, subframe 6 in FIG. 19) of which an instruction as a special subframe is performed based on the third UL-DL configuration is used for determining the HARQ-ACK codebook size, based on whether or not the special subframe configurations 0 and 5 with the normal downlink CP or the special subframe configurations 0 and 4 with the extended downlink CP are set.

For example, in a case where special subframe configurations other than the case of the special subframe configurations 0 and 5 with the normal downlink CP or the special subframe configurations 0 and 4 with the extended downlink CP are set, the terminal device 1 may use a subframe (that is, subframe 6 in FIG. 19) of which an instruction as a special subframe is performed based on the third UL-DL configuration, in order to determine the HARQ-ACK codebook size. That is, in this case, the terminal device 1 may determine the HARQ-ACK codebook size by using $B_c^{DL}=M$.

In a case where the special subframe configurations 0 and 5 with the normal downlink CP or the special subframe configurations 0 and 4 with the extended downlink CP are set, the terminal device 1 may exclude a subframe (that is, subframe 6 in FIG. 19) of which an instruction as a special subframe is performed based on the third UL-DL configuration, from the determination of the HARQ-ACK codebook size. That is, in this case, the terminal device 1 may determine the HARQ-ACK codebook size by using $B_c^{DL}=M-1$.

That is, regarding the special subframe configurations 0 and 5 with the normal downlink CP or the special subframe configurations 0 and 4 with the extended downlink CP, the terminal device 1 may not expect transmission on a PDSCH in a DwPTS of a subframe (that is, subframe 6 in FIG. 19) of which an instruction as a special subframe is performed based on the third UL-DL configuration.

Regarding special subframe configurations other than the special subframe configurations 0 and 5 with the normal downlink CP or the special subframe configurations 0 and 4 with the extended downlink CP, the terminal device 1 may expect transmission on a PDSCH in a DwPTS of a subframe (that is, subframe 6 in FIG. 19) of which an instruction as a special subframe is performed based on the third UL-DL configuration.

That is, the terminal device 1 may determine whether or not transmission on a PDSCH in the DwPTS of a subframe (that is, subframe 6 in FIG. 19) of which an instruction as a special subframe is performed based on the third UL-DL configuration is expected, based on the length of the CP and the configuration of the special subframe.

That is, regarding the special subframe configurations 0 and 5 with the normal downlink CP or the special subframe configurations 0 and 4 with the extended downlink CP, transmission on a PDSCH may not be performed in the DwPTS of a subframe (that is, subframe 6 in FIG. 19) of which an instruction as a special subframe is performed based on the third UL-DL configuration.

Regarding special subframe configurations other than the special subframe configurations 0 and 5 with the normal downlink CP or the special subframe configurations 0 and 4 with the extended downlink CP, transmission on a PDSCH may be performed in the DwPTS of a subframe (that is, subframe 6 in FIG. 19) of which an instruction as a special subframe is performed based on the third UL-DL configuration.

Regarding the special subframe configurations 0 and 5 with the normal downlink CP or the special subframe configurations 0 and 4 with the extended downlink CP, the terminal device 1 may not monitor an EPDCCH in the DwPTS of a subframe (that is, subframe 6 in FIG. 19) of which an instruction as a special subframe is performed based on the third UL-DL configuration.

Regarding special subframe configurations than the special subframe configurations 0 and 5 with the normal downlink CP or the special subframe configurations 0 and 4 with the extended downlink CP, the terminal device 1 may monitor an EPDCCH in the DwPTS of a subframe (that is, subframe 6 in FIG. 19) of which an instruction as a special subframe is performed based on the third UL-DL configuration.

That is, the terminal device 1 may determine whether or not the terminal device 1 monitors an EPDCCH in the DwPTS of a subframe (that is, subframe 6 in FIG. 19) of which an instruction as a special subframe is performed based on the third UL-DL configuration, based on the length of the CP and the configuration of the special subframe.

Regarding the special subframe configurations 0 and 5 with the normal downlink CP or the special subframe configurations 0 and 4 with the extended downlink CP, transmission on an EPDCCH may not be performed in the DwPTS of a subframe (that is, subframe 6 in FIG. 19) of which an instruction as a special subframe is performed based on the third UL-DL configuration.

Regarding special subframe configurations other than the special subframe configurations 0 and 5 with the normal downlink CP or the special subframe configurations 0 and 4 with the extended downlink CP, transmission on an EPDCCH may be performed in the DwPTS of a subframe (that is, subframe 6 in FIG. 19) of which an instruction as a special subframe is performed based on the third UL-DL configuration.

That is, in a certain cell, regarding the special subframe configurations 0 and 5 with the normal downlink CP or the special subframe configurations 0 and 4 with the extended downlink CP, a special subframe of the cell, of which an instruction is performed based on the third UL-DL configuration may be excluded from the determination of the HARQ-ACK codebook size. The terminal device 1 may determine the HARQ-ACK codebook size based on the third UL-DL configuration, the length of the CP, and the configuration of the special subframe.

FIG. 20 is still another diagram illustrating the communication method in the embodiment. Here, FIG. 20 illustrates a case where the UL reference UL-DL configuration 0, the DL reference UL-DL configuration 4, and the third UL-DL configuration 3 are set for a certain cell, as an example. The terminal device 1 determines the HARQ-ACK codebook size for the cell.

That is, the subframe 6 in FIG. 20 is a subframe of which an instruction as a special subframe is performed based on the UL reference UL-DL configuration. The subframe 6 in FIG. 20 is a subframe of which an instruction as a downlink subframe is performed based on the DL reference UL-DL configuration. The subframe 6 in FIG. 20 is a subframe of which an instruction as a downlink subframe is performed based on the third UL-DL configuration.

Here, the terminal device 1 may use a subframe (that is, subframe 6 in FIG. 20) of which an instruction as a downlink subframe is performed based on the third UL-DL configuration, in order to determine the HARQ-ACK codebook size. That is, in this case, the terminal device 1 may determine the HARQ-ACK codebook size by using $B_c^{DL}=M$.

That is, the terminal device 1 may expect transmission on a PDSCH in a subframe (that is, subframe 6 in FIG. 20) of which an instruction as a downlink subframe is performed based on the third UL-DL configuration. That is, a downlink subframe (that is, subframe 6 in FIG. 20) of a certain cell, of which an instruction is performed based on the DL reference UL-DL configuration may be used for determining the HARQ-ACK codebook size.

The terminal device 1 may monitor an EPDCCH in a subframe (that is, subframe 6 in FIG. 20) of which an instruction as a downlink subframe is performed based on the third UL-DL configuration.

Here, the above-described transmission method of HARQ-ACK (determination method of a HARQ-ACK code word size) in FIGS. 17 to 20 presents operations in a case where at least the DL reference UL-DL configuration is set for the terminal device 1. That is, the operations in FIGS. 17 to 20 represent operations in the terminal device 1 in which dynamic TDD (may be eIMTA) is configured.

A determination method of the HARQ-ACK codebook size in a case where at least the DL reference UL-DL configuration is not set for the terminal device 1 will be described below. That is, the operations in the terminal device 1 in which dynamic TDD (may be eIMTA) is not configured.

Here, the terminal device 1 in which the DL reference UL-DL configuration is not set may determine a special subframe used in determination of the HARQ-ACK codebook size, based on the UL reference UL-DL configuration. That is, the terminal device 1 may determine whether or not a subframe of which an instruction as a special subframe is performed based on the UL reference UL-DL configuration is used in determination of the HARQ-ACK codebook size, based on whether or not the special subframe configurations 0 and 5 with the normal downlink CP or the special subframe configurations 0 and 4 with the extended downlink CP are set.

For example, in a case where special subframe configurations other than the case of the special subframe configurations 0 and 5 with the normal downlink CP or the special subframe configurations 0 and 4 with the extended downlink CP are set, the terminal device 1 may use a subframe of which an instruction as a special subframe is performed based on the UL reference UL-DL configuration, in order to determine the HARQ-ACK codebook size. That is, in this case, the terminal device 1 may determine the HARQ-ACK codebook size by using $B_c^{DL}=M$.

In a case where the special subframe configurations 0 and 5 with the normal downlink CP or the special subframe configurations 0 and 4 with the extended downlink CP are set, the terminal device 1 may exclude a subframe of which an instruction as a special subframe is performed based on the UL reference UL-DL configuration, from the determination of the HARQ-ACK codebook size. That is, in this case, the terminal device 1 may determine the HARQ-ACK codebook size by using $B_c^{DL}=M-1$.

That is, regarding the special subframe configurations 0 and 5 with the normal downlink CP or the special subframe configurations 0 and 4 with the extended downlink CP, the terminal device 1 may not expect transmission on a PDSCH in a DwPTS of a subframe of which an instruction as a special subframe is performed based on the UL reference UL-DL configuration.

Regarding special subframe configurations other than the special subframe configurations 0 and 5 with the normal downlink CP or the special subframe configurations 0 and 4 with the extended downlink CP, the terminal device 1 may not expect transmission on a PDSCH in the DwPTS of a subframe of which an instruction as a special subframe is performed based on the UL reference UL-DL configuration.

That is, the terminal device 1 may determine whether or not transmission on a PDSCH in the DwPTS of a subframe of which an instruction as a special subframe is performed based on the UL reference UL-DL configuration is expected, based on the length of the CP and the configuration of the special subframe.

Regarding the special subframe configurations 0 and 5 with the normal downlink CP or the special subframe configurations 0 and 4 with the extended downlink CP, transmission on a PDSCH may not be performed in the DwPTS of a subframe of which an instruction as a special subframe is performed based on the UL reference UL-DL configuration.

Regarding special subframe configurations other than the special subframe configurations 0 and 5 with the normal downlink CP or the special subframe configurations 0 and 4 with the extended downlink CP, transmission on a PDSCH may be performed in the DwPTS of a subframe of which an instruction as a special subframe is performed based on the UL reference UL-DL configuration.

Regarding the special subframe configurations 0 and 5 with the normal downlink CP or the special subframe configurations 0 and 4 with the extended downlink CP, the terminal device 1 may not monitor an EPDCCH in the DwPTS of a subframe of which an instruction as a special subframe is performed based on the UL reference UL-DL configuration.

Regarding special subframe configurations other than the special subframe configurations 0 and 5 with the normal downlink CP or the special subframe configurations 0 and 4 with the extended downlink CP, the terminal device 1 may monitor an EPDCCH in the DwPTS of a subframe of which an instruction as a special subframe is performed based on the UL reference UL-DL configuration.

That is, the terminal device 1 may determine whether or not the terminal device 1 monitors an EPDCCH in the DwPTS of a subframe of which an instruction as a special subframe is performed based on the UL reference UL-DL configuration, based on the length of the CP and the configuration of the special subframe.

Regarding the special subframe configurations 0 and 5 with the normal downlink CP or the special subframe configurations 0 and 4 with the extended downlink CP, transmission on an EPDCCH may not be performed in the DwPTS of a subframe of which an instruction as a special subframe is performed based on the UL reference UL-DL configuration.

Regarding special subframe configurations other than the special subframe configurations 0 and 5 with the normal downlink CP or the special subframe configurations 0 and 4 with the extended downlink CP, transmission on an EPDCCH may be performed in the DwPTS of a subframe of which an instruction as a special subframe is performed based on the UL reference UL-DL configuration.

That is, in a certain cell, regarding the special subframe configurations 0 and 5 with the normal downlink CP or the special subframe configurations 0 and 4 with the extended downlink CP, a special subframe of the cell, of which an instruction is performed based on the UL reference UL-DL configuration may be excluded from the determination of the HARQ-ACK codebook size. The terminal device 1 may determine the HARQ-ACK codebook size based on the UL reference UL-DL configuration, the length of the CP, and the configuration of the special subframe.

The terminal device 1 may use a subframe of which an instruction as a downlink subframe is performed based on the UL reference UL-DL configuration, in order to determine the HARQ-ACK codebook size. That is, in this case, the terminal device 1 may determine the HARQ-ACK codebook size by using $B_c^{DL}=M$.

That is, the terminal device 1 may expect transmission on a PDSCH in a subframe of which an instruction as a downlink subframe is performed based on the UL reference UL-DL configuration. That is, a downlink subframe of a certain cell, of which an instruction is performed based on the UL reference UL-DL configuration may be used in determination of the HARQ-ACK codebook size.

The terminal device 1 may monitor an EPDCCH in a subframe of which an instruction as a downlink subframe is performed based on the UL reference UL-DL configuration.

The terminal device 1 which has determined the HARQ-ACK codebook size as described above transmits HARQ-ACK by using the determined HARQ-ACK codebook size. That is, the terminal device 1 sets ACK or NACK in the corresponding field of the HARQ-ACK, based on detection of transmission on a PDSCH in a subframe (n–k) (may be a plurality of subframes) (here, k∈K is satisfied and K is illustrated in FIG. 15). The terminal device 1 transmits HARQ-ACK or spatially bundled HARQ-ACK in an uplink subframe n.

The terminal device 1 may set ACK or NACK in the corresponding field of the HARQ-ACK, based on detection of a PDCCH/EPDCCH for performing an instruction of SPS release of a downlink in a subframe (n–k) (may be a plurality of subframes) (here, k∈K is satisfied and K is illustrated in FIG. 15). The terminal device 1 may transmit HARQ-ACK in an uplink subframe n.

Here, in a case where any of a PDSCH and a PDCCH/EPDCCH which is used for performing an instruction of downlink SPS release is not detected for a certain cell in a certain subframe, the terminal device 1 may generate NACK. That is, in a case where any of a PDSCH and a PDCCH/EPDCCH which is used for performing an instruction of downlink SPS release is not detected for a certain cell in a certain subframe, the terminal device 1 may set NACK in the corresponding field of the HARQ-ACK.

Here, in a case where a downlink transmission mode configured in the cell supports transport blocks of up to two, and spatial bundling is not applied, the terminal device 1 may generate two pieces of NACK. In a case where the downlink transmission mode configured in the cell supports one transport block, the terminal device 1 may generate one piece of NACK. In a case where spatial bundling is applied in the cell, the terminal device 1 may generate one piece of NACK.

Here, in a case where the downlink transmission mode configured in a certain cell supports transport blocks of up to two for the cell in a certain subframe, the terminal device 1 receives one transport block in the subframe in the cell, and spatial HARQ-ACK bundling is not applied to the cell, the terminal device 1 may generate one piece of NACK for a transport block which is different from the one transport block which has been received.

In a case where the downlink transmission mode configured in a certain cell supports transport blocks of up to two for the cell in a certain subframe, the terminal device 1 receives (detects) a PDCCH/EPDCCH for performing an instruction of downlink SPS release in the subframe in the cell, and spatial HARQ-ACK bundling is not applied to the cell, the terminal device 1 generates one piece of NACK as HAR-ACK corresponding to the code word 1. Here, one piece of ACK for the received PDCCH/EPDCCH for performing an instruction of downlink SPS release may be generated as HARQ-ACK corresponding to the code word 0.

In a case where the downlink transmission mode configured in a certain cell supports transport blocks of up to two for the cell in a certain subframe, the terminal device 1 receives (detects) a PDCCH/EPDCCH for performing an instruction of downlink SPS release in the subframe of the cell, and spatial HARQ-ACK bundling is not applied to the cell, the terminal device 1 generates one piece of NACK as HAR-ACK corresponding to the code word 0. Here, one piece of ACK for the received PDCCH/EPDCCH for performing an instruction of downlink SPS release may be generated as HARQ-ACK corresponding to the code word 1.

In a case where the downlink transmission mode configured in a certain cell supports transport blocks of up to two for the cell in a certain subframe, the terminal device 1 receives (detects) a PDCCH/EPDCCH for performing an instruction of downlink SPS release in the subframe of the cell, and spatial HARQ-ACK bundling is not applied to the cell, the terminal device 1 may generate two pieces of ACK. That is, in this case, two pieces of ACK (the same HARQ-ACK responses) for both of the transport blocks may be generated as a response to the PDCCH/EPDCCH for performing an instruction of downlink SPS release.

In a case where the downlink transmission mode configured in a certain cell supports transport blocks of up to two for the cell in a certain subframe, the base station device 3 receives a PDCCH/EPDCCH for performing an instruction of downlink SPS release in the subframe of the cell, and spatial HARQ-ACK bundling is not applied to the cell, the base station device 3 may determine that the terminal device 1 succeeds in reception (detection) of the PDCCH/EPDCCH for performing an instruction of downlink SPS release, if at least one among pieces of HARQ-ACK for both of the transport blocks is ACK.

Here, as described above, the terminal device 1 may determine whether or not transmission on a PDSCH in a certain subframe (may be the DwPTS of a certain subframe) is expected, based on the length of the CP and the configuration of the subframe.

An example of an operation of the terminal device 1 will be described below based on the length of the CP, the configuration of a subframe, and the third UL-DL configuration.

For example, in a case where the special subframe configurations 0 and 5 with the normal downlink CP or the special subframe configurations 0 and 4 with the extended downlink CP are set, the terminal device 1 may not expect transmission on a PDSCH in a subframe (may be the DwPTS of the subframe) of which an instruction as a special subframe is performed based on the third UL-DL configuration.

In a case where the special subframe configurations 0 and 5 with the normal downlink CP or the special subframe configurations 0 and 4 with the extended downlink CP are set, the terminal device 1 may not expect transmission on a PDSCH in a subframe of which an instruction as a downlink subframe is performed based on the third UL-DL configuration.

Here, in a case where the special subframe configurations 0 and 5 with the normal downlink CP or the special subframe configurations 0 and 4 with the extended downlink CP are set, the terminal device 1 may monitor an EPDCCH (may be an uplink grant transmitted on the EPDCCH) in a subframe of which an instruction as a downlink subframe is performed based on the third UL-DL configuration.

In a case where the special subframe configurations 0 and 5 with the normal downlink CP or the special subframe configurations 0 and 4 with the extended downlink CP are set, the terminal device 1 may not monitor an EPDCCH (may be an uplink grant transmitted on the EPDCCH) in a subframe of which an instruction as a downlink subframe is performed based on the third UL-DL configuration.

In a case where special subframe configurations other than the case of the special subframe configurations 0 and 5 with the normal downlink CP or the special subframe configurations 0 and 4 with the extended downlink CP are set, the terminal device 1 may expect transmission on a PDSCH in a subframe (may be the DwPTS of the subframe)

of which an instruction as a special subframe is performed based on the third UL-DL configuration.

In a case where special subframe configurations other than the case of the special subframe configurations 0 and 5 with the normal downlink CP or the special subframe configurations 0 and 4 with the extended downlink CP are set, the terminal device 1 may expect transmission on a PDSCH in a subframe of which an instruction as a downlink subframe is performed based on the third UL-DL configuration.

That is, the terminal device 1 may determine whether or not transmission on a PDSCH in a subframe (may be the DwPTS of the certain subframe) of which an instruction as a special subframe is performed based on the third UL-DL configuration is expected, based on whether or not the special subframe configurations 0 and 5 with the normal downlink CP or the special subframe configurations 0 and 4 with the extended downlink CP are set.

The terminal device 1 may determine whether or not transmission on a PDSCH in a subframe of which an instruction as a downlink subframe is performed based on the third UL-DL configuration is expected, based on whether or not the special subframe configurations 0 and 5 with the normal downlink CP or the special subframe configurations 0 and 4 with the extended downlink CP are set.

An example of an operation of the terminal device 1 will be described below based on the length of the CP, the configuration of a subframe, the UL reference UL-DL configuration, the DL reference UL-DL configuration, and the third UL-DL configuration.

As described above, the terminal device 1 may expect transmission on a PDSCH in a subframe (also described as a DL-S subframe for clear descriptions) of which an instruction as a downlink subframe and a special subframe is performed based on the third UL-DL configuration. Here, in this case, in a case where an instruction of the DL-S subframe is performed as a special subframe based on the first UL-DL configuration, and is performed as a special subframe based on the second UL-DL configuration, the terminal device 1 may determine whether or not transmission on a PDSCH in the DL-S subframe is expected, based on the length of the CP, and the configuration of the special subframe.

That is, the terminal device 1 may determine whether or not transmission on a PDSCH in the DL-S subframe is expected, based on whether or not the special subframe configurations 0 and 5 with the normal downlink CP or the special subframe configurations 0 and 4 with the extended downlink CP are set.

That is, in a case where the special subframe configurations 0 and 5 with the normal downlink CP or the special subframe configurations 0 and 4 with the extended downlink CP are set, the terminal device 1 may not expect transmission on a PDSCH in the DL-S subframe. In a case where special subframe configurations other than the special subframe configurations 0 and 5 with the normal downlink CP or the special subframe configurations 0 and 4 with the extended downlink CP are set, the terminal device 1 may expect transmission on a PDSCH in the DL-S subframe.

In a case where an instruction of the DL-S subframe is performed as a special subframe based on the first UL-DL configuration, and is performed as a downlink subframe based on the second UL-DL configuration, the terminal device 1 may expect transmission on a PDSCH in the DL-S subframe. That is, in this case, the terminal device 1 may expect transmission on a PDSCH in the DL-S subframe, regardless of the length of the CP and the configuration of the special subframe.

Here, as described above, not expecting transmission on a PDSCH in a certain subframe includes a case where the subframe is excluded from the determination of the HARQ-ACK codebook size.

As described above, the terminal device 1 may monitor an EPDCCH in a subframe (also described as an EPDCCH monitoring DL-S subframe for clear descriptions) of which an instruction as a downlink subframe and a special subframe is performed based on the third UL-DL configuration among subframes (also described as EPDCCH monitoring subframes for clear descriptions) in which an EPDCCH is monitored. Here, as described above, the subframe in which an EPDCCH is monitored is configured as a subframe in which the terminal device 1 is required to monitor an EPDCCH.

Here, in this case, in a case (also described as a first case) where an instruction of the EPDCCH monitoring DL-S subframe is performed as a special subframe based on the first UL-DL configuration, and is performed as a special subframe based on the second UL-DL configuration, the terminal device 1 may determine whether or not the terminal device 1 monitors an EPDCCH in the EPDCCH monitoring DL-S subframe, based on the length of the CP and the configuration of the special subframe.

That is, the terminal device 1 may determine whether or not the terminal device 1 monitors an EPDCCH in the EPDCCH monitoring DL-S subframe, based on whether or not the special subframe configurations 0 and 5 with the normal downlink CP or the special subframe configurations 0 and 4 with the extended downlink CP are set.

That is, in a case where the special subframe configurations 0 and 5 with the normal downlink CP or the special subframe configurations 0 and 4 with the extended downlink CP are set, the terminal device 1 may not monitor an EPDCCH in the EPDCCH monitoring DL-S subframe. In a case where special subframe configurations other than the special subframe configurations 0 and 5 with the normal downlink CP or the special subframe configurations 0 and 4 with the extended downlink CP are set, the terminal device 1 may monitor an EPDCCH in the EPDCCH monitoring DL-S subframe.

In a case (also described as a first case) where an instruction of the EPDCCH monitoring DL-S subframe is performed as a special subframe based on the first UL-DL configuration, and is performed as a downlink subframe based on the second UL-DL configuration, the terminal device 1 may monitor an EPDCCH in the EPDCCH monitoring DL-S subframe. That is, in this case, the terminal device 1 may monitor an EPDCCH in the EPDCCH monitoring DL-S subframe regardless of the length of the CP and the configuration of the special subframe.

Here, the above-described communication method may be applied to a case where (only) one cell is configured for the terminal device 1. In addition, the above-described communication method may be applied to a case where a plurality of cells (for example, two cells) is configured for the terminal device 1 and first UL reference UL-DL configurations for all of the plurality of cells (for example, the two cells) are the same as each other.

The above-described communication method may be applied to a case where a plurality of cells is configured for the terminal device 1 and first UL reference UL-DL configurations for at least two cells are not the same as each other (different from each other).

Here, in a case where a plurality of cells is configured for the terminal device 1 and first UL reference UL-DL configurations for at least two cells are not the same as each other, the HARQ-ACK codebook size may be normally determined by using $B_c^{DL}=M_c$, in comparison to a case where it is assumed that the terminal device 1 performs transmission on a PUCCH in a subframe n.

Here, $M_c$ indicates the number of elements in a set $K_c$ associated with the subframe n for a certain cell. That is, the terminal device 1 transmits HARQ-ACK in an uplink subframe n, based on detection of transmission on a PDSCH in a subframe (n−k) of the cell. Here, $k \in K_c$ is satisfied. $K_c$ is illustrated in FIG. 15. Here, in this case, the UL-DL configuration in FIG. 15 refers to the DL reference UL-DL configuration. That is, in this case, the DL reference UL-DL configuration is used as the UL-DL configuration in FIG. 15.

Next, an enhanced physical downlink control channel (EPDCCH) will be described. The EPDCCH is transmitted and received by using a resource element (RE), similar to other physical channels such as a PDSCH. Each element (element corresponding to one subcarrier and one OFDM symbol) in resource grid for an antenna port P is referred to as an RE. The resource grid is obtained in such a manner that a signal to be transmitted is described for each slot by using grid of a subcarrier and an OFDM symbol. The element is uniquely identified by k and l which form an index pair in one slot. k is an ascending index which starts from 0 in a frequency-axis direction. l is an ascending index which starts from 0 in a time-axis direction.

An enhanced RE group (EREG) is used for defining mapping of an EPDCCH on REs. 16 EREGs to which numbers of 0 to 15 are respectively assigned are provided for each resource block pair. Cyclic numbers from 0 to 15 are assigned to all REs except for an RE for operating a DMRS which is for antenna ports 107, 108, 109, and 110 for a normal cyclic prefix (CP), and for the antenna ports 107 and 108 for an extended CP, in one PRB pair in an ascending order in which the frequency is the leading and the time is the tail. All REs to which the number of i in the PRB pair is assigned constitute an EREG to which the number of i is assigned. Here, the CP is a signal that is attached to the front of a valid symbol section of OFDM symbols (SC-FDMA symbols in a case of an uplink) in a downlink. The CP is a signal in which a portion (generally, the last portion) of the valid symbol section is copied. Regarding a CP length, two types of CPs which are a normal CP and an extended CP are provided. The normal CP has a normal length (for example, 160 samples or 144 samples with respect to the valid symbol length of 2048 samples). The extended CP has a length longer than that of the normal CP (for example, 512 samples or 1024 samples with respect to the valid symbol length of 2048 samples).

The EPDCCH is used for operating scheduling assignment. One EPDCCH is transmitted by using one enhanced control channel element (ECCE) or an aggregation of some continuous enhanced control channel elements. Here, each ECCE is constituted by a plurality of EREGs. The number of ECCEs used for one EPDCCH depends on a format of the EPDCCH and the number of EREGs for each ECCE. Both of localized transmission and distributed transmission are supported. One EPDCCH can use either of localized transmission and distributed transmission which are different from each other in an EREG of an ECCE and mapping on a PRB pair.

The terminal device monitors a plurality of EPDCCHs as will be described later. Installation of one or two PRB pairs used when the terminal device monitors EPDCCH transmission may be configured. As configured by a higher layer, all EPDCCH candidates in an EPDCCH set $X_m$ are used only in the localized transmission or only in the distributed transmission. Numbers of 0 to $N_{ECCE,m,i}-1$ are assigned to ECCEs usable in transmission of an EPDCCH in an EPDCCH set $X_m$ of a subframe i. Here, $N_{ECCE,m,i}$ is the number of ECCEs which are usable in transmission of an EPDCCH in the EPDCCH set $X_m$ of a subframe i. In a case of localized mapping, an ECCE having the number of n corresponds to EREGs to which numbers of $((n \bmod N^{RB}_{ECCE}) + j N^{RB}_{ECCE})$ in a PRB in which an index is floor $(n/N^{RB}_{ECCE})$ are assigned. In a case of distributed mapping, an ECCE having the number of n corresponds to EREGs to which numbers of $(\text{floor}(n/N^{Xm}_{RB}) + j N^{RB}_{ECCE})$ in a PRB in which an index is $(n + j \max(1, N^{Xm}_{RB}/N^{ECCE}_{EREG})) \bmod N^{Xm}_{RB}$ are assigned. Here, $j=0, 1, \ldots, N^{ECCE}_{EREG}-1$. $N^{ECCE}_{EREG}$ is the number of EREGs per ECCE. $N^{RB}_{ECCE}$ is equal to $16/N^{ECCE}_{EREG}$ and is the number of ECCEs per PRB pair. floor indicates a floor function. mod indicates a remainder function (mod function). max indicates a maximum value function (max function). Here, it is assumed that PRB pairs constituting the EPDCCH set $X_m$ respectively have the number of 0 to $N^{Xm}_{RB}-1$ in an ascending order.

$N^{ECCE}_{EREG}$ is determined based on the CP and the type of a subframe. More specifically, $N^{ECCE}_{EREG}$ is 8 in the following cases: a case of a normal CP and a normal subframe (normal downlink subframe); a case of the normal CP and a special subframe in which a special subframe configuration is 3, 4, or 8, $N^{ECCE}_{EREG}$ is 4; a case of the normal CP and a special subframe (that is, a special subframe in which a DwPTS is constituted by OFDM symbols of 6 to 10) in which the special subframe configuration is 1, 2, 6, 7, or 9; a case of an extended CP and the normal subframe; and a case of the extended CP and a special subframe (that is, a special subframe in which a DwPTS is constituted by OFDM symbols of 6 to 10) in which the special subframe configuration is 1, 2, 3, 5, or 6. The special subframe configuration will be described later in detail.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. It is possible to define the number of EREGs per ECCE for a special subframe in which an EPDCCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus it can be set that which value is applied as the number of EREGs per ECCE does not depend on whether or not a signal of explicit Layer 1 is detected. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

FIG. 21 is a diagram illustrating a correspondence table between an EPDCCH format and the number (aggregation level) of ECCEs per EPDCCH. Case A in the correspondence table of FIG. 21 is used in a case where a condition corresponding to Case 1 which will be described later is satisfied. Case B is used in other cases. $n_{EPDCCH}$ which is a value for a specific terminal device is defined as the number of downlink REs satisfying all the following criteria of (a1) to (a4) in one PRB pair configured for EPDCCH transmission of an EPDCCH set $X_0$ (first EPDCCH set among EPDCCH sets of up to two).

(a1) It is a portion of any one of 16 EREGs in the PRB pair.

(a2) It is assumed not to be used as a CRS by the terminal device. Here, as long as different values are not provided for the number of antenna ports for a CRS and a parameter in frequency shift, the position of the CRS is given by the parameters (the number of antenna ports by an antenna port which is the same as that of a PBCH, and frequency shift obtained based on a physical cell identifier) in the serving cell. Conversely, in a case where a combination of the parameters is configured in the terminal device by re-MappingQCL-ConfigID-r11 which is a higher layer parameter, the position of the CRS is determined by using the parameters.

(a3) It is assumed not to be used as a CSIRS by the terminal device. Here, the position of the CSIRS is given by a configuration of a zero-power CSIRS (in a case where a different value is not provided for a configuration for the zero-power CSIRS) and a configuration of a nonzero-power CSIRS. Conversely, in a case where the zero-power CSIRS is configured in the terminal device by re-MappingQCL-ConfigID-r11 which is a higher layer parameter, the position of the CSIRS is determined by using the parameters.

(a4) It is satisfied that an index l in a first slot in a subframe is equal to or more than $l_{EPDCCHStart}$. That is, mapping on REs on OFDM symbols after a symbol of $l_{EPDCCHStart}$ is performed in one subframe. Here, l indicates an index which is assigned to an OFDM symbol in a slot. l is assigned in an order from the leading OFDM symbol in a slot, in an ascending order from 0 in a time direction. $l_{EPDCCHStart}$ will be described later.

Each of $b(0), \ldots, b(M_{bit}-1)$ is a block of bits transmitted on one EPDCCH in one subframe. $b(0), \ldots, b(M_{bit}-1)$ are scrambled based on $h(i)=(b(i)+c(i))\mod 2$, and as a result, blocks of scrambled bits which are referred to as $h(0), \ldots, h(M_{bit}-1)$ are obtained. Here, $M_{bit}$ is the number of bits transmitted on one EPDCCH. c(i) indicates a scrambling sequence which is specific to a terminal device and is initialized by a parameter $c_{init}$. The scrambling sequence generator satisfies $c_{init}=\text{floor}(n_s/2)2^9+n^{EPDCCH}_{ID, m}$. m indicates an EPDCCH set number. $n_s$ indicates a slot number in a radio frame. $n^{EPDCCH}_{ID, m}$ indicates a DMRS scrambling initialization parameter which is allowed to be configured for each EPDCCH set by higher layer signaling. $n^{EPDCCH}_{ID, m}$ can have a value of any of 0 to 503.

Each of $h(0), \ldots, h(M_{bit}-1)$ is a block of scrambled bits. $h(0), \ldots, h(M_{bit}-1)$ are modulated, and as a result, blocks of complex-value modulation symbols which are referred to as $d(0), \ldots, d(M_{symb}-1)$ are obtained. Here, $M_{symb}$ indicates the number of modulation symbols transmitted on one EPDCCH. As a modulation method of an EPDCCH, Quadrature Phase Shift Keying (QPSK) is used. A block of complex-value modulation symbols is mapped on a single layer and is subjected to precoding, based on a relational expression of y(i)=d(i). Here, $i=0, \ldots, M_{symb}-1$ is satisfied. y indicates a modulation symbol which is subjected to precoding.

$y(0), \ldots, y(M_{symb}-1)$ are block of complex-value symbols. $y(0), \ldots, y(M_{symb}-1)$ are mapped on REs (REs having a position determined by k and l) on an associated antenna port in an order starting from y(0), so as to satisfy all the following criteria of (m1) to (m4).

(m1) It is a portion of an EREG assigned for EPDCCH transmission.

(m2) It is assumed not to be used as a CRS by the terminal device. Here, as long as different values are not provided for the number of antenna ports for a CRS and a parameter in frequency shift, the position of the CRS is given by the parameters (the number of antenna ports by an antenna port which is the same as that of a PBCH, and frequency shift obtained based on a physical cell identifier) in the serving cell. Conversely, in a case where a combination of the parameters is configured in the terminal device by re-MappingQCL-ConfigID-r11 which is a higher layer parameter, the position of the CRS is determined by using the parameters.

(m3) It is assumed not to be used as a CSIRS by the terminal device. Here, the position of the CSIRS is given by a configuration of a zero-power CSIRS (in a case where a different value is not provided for a configuration for the zero-power CSIRS) and a configuration of a nonzero-power CSIRS. Conversely, in a case where the zero-power CSIRS is configured in the terminal device by re-MappingQCL-ConfigID-r11 which is a higher layer parameter, the position of the CSIRS is determined by using the parameters.

(m4) It is satisfied that an index l in a first slot in a subframe is equal to or more than $l_{EPDCCHStart}$. That is, mapping on REs on OFDM symbols after a symbol of $l_{EPDCCHStart}$ is performed in one subframe. Here, l indicates an index which is assigned to an OFDM symbol in a slot. l is assigned in an order from the leading OFDM symbol in a slot, in an ascending order from 0 in a time direction. $l_{EPDCCHStart}$ will be described later.

Mapping on REs (REs having a position which is determined by k and l) in an antenna port P has an ascending order of an index k before an index l (in a direction in which k and l are increased). The mapping starts from a first slot and ends in a second slot in a subframe.

Here, the antenna port P is a logical antenna port. One antenna port may correspond to one physical antenna. A signal of one antenna port may be actually transmitted on a plurality of physical antennae. In addition, signals of plurality of antenna ports may be actually transmitted on the same physical antenna. If antenna ports are the same, the same channel characteristics are obtained. Here, the antenna ports 0 to 3 are antenna ports associated (used) in transmission of a CRS. The antenna port 4 is an antenna port associated (used) in transmission of a reference signal for a multimedia broadcast multicast service single frequency network (MBSFN). The antenna ports 5 and 7 to 14 are antenna ports associated (used) in transmission of an UE-specific reference signal which has been associated with a PDSCH. The antenna ports 107 to 110 are antenna ports associated (used) in transmission of a demodulation reference signal which has been associated with an EPDCCH. The antenna port 6 is an antenna port associated (used) in transmission of a positioning reference signal. The antenna ports 15 to 22 are antenna ports associated (used) in transmission of a CSIRS.

In localized transmission, a single antenna port P to be used is determined by n' and the following (n1) to (n4). n' is calculated by an expression of $n'=n_{ECCE,\,low}$ mod $N^{RB}_{ECCE}+ n_{RNTI}$ mod min $(N^{EPDCCH}_{ECCE}, N^{RB}_{ECCE})$. Here, $n_{ECCE,\,low}$ indicates an index of the minimum ECCE used by EPDCCH transmission, in the EPDCCH set. $n_{RNTI}$ is equal to a cell-RNTI (C-RNTI) which is one type of a radio network temporary identifier (RNTI). $N^{EPDCCH}_{ECCE}$ indicates the number of ECCEs used for the EPDCCH. min indicates the minimum value function (min function).

(n1) In a case of a normal CP, and a normal subframe or a special subframe having the special subframe configuration 3, 4, or 8, n'=0 corresponds to P=107. In a case where the normal CP and a special subframe having the special subframe configuration 1, 2, 6, 7, or 9, n'=0 corresponds to P=107. In a case of an extended CP, n'=0 corresponds to P=107 despite any subframe type.

(n2) In a case of a normal CP, and a normal subframe or a special subframe (special subframe in which a DwPTS includes 11 OFDM symbols or more) having the special subframe configuration 3, 4, or 8, n'=1 corresponds to P=108. In a case where the normal CP and a special subframe (special subframe in which a DwPTS includes OFDM symbols of 4 to 10) having the special subframe configuration 1, 2, 6, 7, or 9, n'=1 corresponds to P=109. In a case of an extended CP, n'=1 corresponds to P=108 despite any subframe type.

(n3) In a case of a normal CP, and a normal subframe or a special subframe having the special subframe configuration 3, 4, or 8, n'=2 corresponds to P=109.

(n4) In a case of a normal CP, and a normal subframe or a special subframe having the special subframe configuration 3, 4, or 8, n'=3 corresponds to P=110.

In this manner, an antenna port to be used is determined based on the number of OFDM symbols which is used for downlink transmission and is included in a subframe. Thus, in a case where the number of OFDM symbols to be included is small, it is possible to reduce the total number of antenna ports, and thus, to efficiently use REs of a downlink.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. It is possible to define an antenna port for a special subframe in which an EPDCCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus it can be set that which antenna port is used does not depend on whether or not a signal of explicit Layer 1 is detected. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

In distributed transmission, each RE in one EREG starts from the antenna port 107 and is correlated with one of two antenna ports in accordance with a rule of alternate use. Here, in a normal CP, the two antenna ports correspond to the antenna port 107 and the antenna port 109. In an extended CP, the two antenna ports correspond to the antenna port 107 and the antenna port 108.

Regarding each serving cell, the base station device may configure one or two EPDCCH-PRB sets (also referred to as a set of PRB pairs in which EPDCCHs may be allocated, and an EPDCCH set) for monitoring an EPDCCH for a UE by signaling of a higher layer. Here, a plurality of PRB pairs corresponding to one EPDCCH-PRB set (the number of PRB pairs corresponding to one EPDCCH-PRB set and a PRB pair corresponds to the EPDCCH-PRB set) is also obtained by signaling of the higher layer. Each EPDCCH-PRB set is constituted by a set of ECCEs to which numbers of 0 to $N_{ECCE,\,p,\,k}-1$ are respectively assigned. Here, $N_{ECCE,\,p,\,k}-1$ indicates the number of ECCEs in an EPDCCH-PRB set p ((p+1)th EPDCCH-PRB set, p is 0 or 1) in a subframe k. Each EPDCCH-PRB set may be configured for either of localized EPDCCH transmission and distributed EPDCCH transmission. That is, in an EPDCCH-PRB set in which localized EPDCCH transmission is configured, one EPDCCH is allocated in the frequency direction, with relative localization. In an EPDCCH-PRB set in which distributed EPDCCH transmission is configured, one EPDCCH is allocated in the frequency direction, with relative distribution.

The terminal device monitors a set of EPDCCH candidates in one effective serving cell or more, so as to be configured by higher layer signaling for control information. Here, monitoring (performing monitoring) implicitly means that decoding of each EPDCCH in the set of EPDCCH candidates is examined in accordance with a DCI format to be monitored. A set of EPDCCH candidates to be monitored is defined in a UE-specific search space (USS) of an EPDCCH. Here, the USS is a logical area which is configured so as to be specific to a terminal device, and is an area which may be used in transmission of downlink control information.

A subframe in which a UE monitors an EPDCCH USS is configured for each serving cell by a higher layer. More specifically, the higher layer configures monitoring of an EPDCCH in a subframe which is not a subframe required for uplink transmission for a FDD half duplex terminal device, and does not correspond to a portion of the measurement gap. The configuring of the higher layer is performed during an active time (period which is not a deactivation timer start period in discontinuous reception, period which is not a non-reception period, and total period when a terminal device is operated). Here, the discontinuous reception is an operation in that there is no need (may be deactivated) for operating the terminal device (which is an activated state) except for some periods, for optimizing battery consumption of a terminal device. The frequency division duplex (FDD) half duplex terminal device is a terminal device which does not have a function of simultaneously performing uplink transmission and downlink reception (in the same subframe) in an FDD band. The measurement gap is a period when transmission and reception is stopped in a serving cell in order to perform measurement (received power measurement of a cell other than the serving cell) for mobility (handover). The pattern of measurement gap is configured by RRC.

The terminal device does not monitor an EPDCCH in the following cases (e1) to (e4).

(e1) Case of a special subframe (special subframe in which the number of OFDM symbols in a DwPTS is less than 6) of the special subframe configurations 0 and 5 in TDD and a normal downlink CP.

(e2) Case of a special subframe (special subframe in which the number of OFDM symbols in a DwPTS is less than 6) of the special subframe configurations 0, 4, and 7 in TDD and an extended downlink CP.

(e3) Case of a subframe of which an instruction of decoding a physical multicast channel (PMCH) is performed by a higher layer.

(e4) Case where TDD and different UL/DL configurations from each other are configured in a primary cell and a secondary cell, a subframe which is a downlink subframe in the secondary cell and the same subframe in the primary cell is a special subframe, and the terminal device does not have capability of simultaneously performing transmission and reception between the primary cell and the secondary cell.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. It is possible to define a subframe in which EPDCCH monitoring is performed, for a special subframe in which an EPDCCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus a subframe in which an EPDCCH is monitored can be set so as not to depend on whether or not a signal of explicit Layer 1 is detected. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

Here, the special subframe is a subframe including three regions which are a region (DwPTS) in which downlink transmission is performed, a guard period (GP), and a region (UpPTS) in which uplink transmission is performed, in one subframe in this order. The lengths of the DwPTS, the GP, and the UpPTS are uniquely determined by the special subframe configuration and a CP length. The PMCH may be allocated only in an MBSFN subframe which is a channel for providing a multimedia broadcast/multicast service (MBMS).

As the special subframe configuration, any of the following 10 configurations is configured.

In the special subframe configuration 0, a DwPTS in a normal downlink CP is 6592 samples, and an UpPTS is 2192 samples in a normal uplink CP and 2560 samples in an extended uplink CP. A DwPTS in an extended downlink CP is 7680 samples, and an UpPTS is 2192 samples in a normal uplink CP and 2560 samples in an extended uplink CP. The DwPTS is constituted by three OFDM symbols. The UpPTS is constituted by one SC-FDMA symbol.

In the special subframe configuration 1, a DwPTS in a normal downlink CP is 19760 samples, and an UpPTS is 2192 samples in a normal uplink CP and 2560 samples in an extended uplink CP. A DwPTS in an extended downlink CP is 20480 samples, and an UpPTS is 2192 samples in a normal uplink CP and 2560 samples in an extended uplink CP. The DwPTS is constituted by 9 OFDM symbols in a case of the normal downlink CP, and by 8 OFDM symbols in a case of the extended downlink CP. The UpPTS is constituted by one SC-FDMA symbol.

In the special subframe configuration 2, a DwPTS in a normal downlink CP is 21952 samples, and an UpPTS is 2192 samples in a normal uplink CP and 2560 samples in an extended uplink CP. A DwPTS in an extended downlink CP is 23040 samples, and an UpPTS is 2192 samples in a normal uplink CP and 2560 samples in an extended uplink CP. The DwPTS is constituted by 10 OFDM symbols in a case of the normal downlink CP, and by 9 OFDM symbols in a case of the extended downlink CP. The UpPTS is constituted by one SC-FDMA symbol.

In the special subframe configuration 3, a DwPTS in a normal downlink CP is 24144 samples, and an UpPTS is 2192 samples in a normal uplink CP and 2560 samples in an extended uplink CP. A DwPTS in an extended downlink CP is 25600 samples, and an UpPTS is 2192 samples in a normal uplink CP and 2560 samples in an extended uplink CP. The DwPTS is constituted by 11 OFDM symbols in a case of the normal downlink CP, and by 10 OFDM symbols in a case of the extended downlink CP. The UpPTS is constituted by one SC-FDMA symbol.

In the special subframe configuration 4, a DwPTS in a normal downlink CP is 26336 samples, and an UpPTS is 2192 samples in a normal uplink CP and 2560 samples in an extended uplink CP. A DwPTS in an extended downlink CP is 7680 samples, and an UpPTS is 4384 samples in a normal uplink CP and 5120 samples in an extended uplink CP. The DwPTS is constituted by 12 OFDM symbols in a case of the normal downlink CP, and by 3 OFDM symbols in a case of the extended downlink CP. The UpPTS is constituted by one SC-FDMA symbol in a case of the normal downlink CP, and by two SC-FDMA symbols in a case of the extended downlink CP.

In the special subframe configuration 5, a DwPTS in a normal downlink CP is 6592 samples, and an UpPTS is 4384 samples in a normal uplink CP and 5120 samples in an extended uplink CP. A DwPTS in an extended downlink CP is 20480 samples, and an UpPTS is 4384 samples in a normal uplink CP and 5120 samples in an extended uplink CP. The DwPTS is constituted by 3 OFDM symbols in a case of the normal downlink CP, and by 8 OFDM symbols in a case of the extended downlink CP. The UpPTS is constituted by 2 SC-FDMA symbols.

In the special subframe configuration 6, a DwPTS in a normal downlink CP is 19760 samples, and an UpPTS is 4384 samples in a normal uplink CP and 5120 samples in an extended uplink CP. A DwPTS in an extended downlink CP is 23040 samples, and an UpPTS is 4384 samples in a normal uplink CP and 5120 samples in an extended uplink CP. The DwPTS is constituted by 9 OFDM symbols. The UpPTS is constituted by 2 SC-FDMA symbols.

In the special subframe configuration 7, a DwPTS in a normal downlink CP is 21952 samples, and an UpPTS is 4384 samples in a normal uplink CP and 5120 samples in an extended uplink CP. A DwPTS in an extended downlink CP is 12800 samples, and an UpPTS is 4384 samples in a normal uplink CP and 5120 samples in an extended uplink CP. The DwPTS is constituted by 10 OFDM symbols in a case of the normal downlink CP, and by 5 OFDM symbols in a case of the extended downlink CP. The UpPTS is constituted by 2 SC-FDMA symbols.

In the special subframe configuration 8, a DwPTS in a normal downlink CP is 24144 samples, and an UpPTS is 4384 samples in a normal uplink CP and 5120 samples in an extended uplink CP. The DwPTS is constituted by 11 OFDM symbols in a case of the normal downlink CP. The UpPTS is constituted by 2 SC-FDMA symbols.

In the special subframe configuration 9, a DwPTS in a normal downlink CP is 13168 samples, and an UpPTS is 4384 samples in a normal uplink CP and 5120 samples in an extended uplink CP. The DwPTS is constituted by 6 OFDM symbols in a case of the normal downlink CP. The UpPTS is constituted by 2 SC-FDMA symbols.

Here, in a case where the UpPTS is constituted by one SC-FDMA symbol, the terminal device may transmit a sounding reference signal (SRS) in accordance with a request from the base station device, by using the one SC-FDMA symbol. The sounding reference signal is a reference signal for sounding of an uplink. In a case where the UpPTS is constituted by two SC-FDMA symbols, the terminal device may transmit an SRS in accordance with a request from the base station device, by using at least any of the two SC-FDMA symbols.

Here, in the normal CP, a normal downlink subframe is constituted by 14 OFDM symbols, and a normal uplink subframe is constituted by 14 SC-FDMA symbols. In the extended CP, the normal downlink subframe is constituted by 12 OFDM symbols, and the normal uplink subframe is constituted by 12 SC-FDMA symbols.

As the UL/DL configuration, any of the following seven configurations is configured.

In the UL/DL configuration 0, subframes 0 to 9 in one radio frame (10 subframes) respectively correspond to a downlink subframe, a special subframe, an uplink subframe, an uplink subframe, an uplink subframe, a downlink subframe, a special subframe, an uplink subframe, an uplink subframe, and an uplink subframe in this order. A cycle of a conversion point from a downlink toward an uplink is 5 subframes (5 milliseconds).

In the UL/DL configuration 1, subframes 0 to 9 in one radio frame respectively correspond to a downlink subframe, a special subframe, an uplink subframe, an uplink subframe, a downlink subframe, a downlink subframe, a special subframe, an uplink subframe, an uplink subframe, and a downlink subframe in this order. A cycle of a conversion point from a downlink toward an uplink is 5 subframes.

In the UL/DL configuration 2, subframes 0 to 9 in one radio frame respectively correspond to a downlink subframe, a special subframe, an uplink subframe, a downlink subframe, a downlink subframe, a downlink subframe, a special subframe, an uplink subframe, a downlink subframe, and a downlink subframe in this order. A cycle of a conversion point from a downlink toward an uplink is 5 subframes.

In the UL/DL configuration 3, subframes 0 to 9 in one radio frame respectively correspond to a downlink subframe, a special subframe, an uplink subframe, an uplink subframe, an uplink subframe, a downlink subframe, a downlink subframe, a downlink subframe, a downlink subframe, and a downlink subframe in this order. A cycle of a conversion point from a downlink toward an uplink is 10 subframes (10 milliseconds).

In the UL/DL configuration 4, subframes 0 to 9 in one radio frame respectively correspond to a downlink subframe, a special subframe, an uplink subframe, an uplink subframe, a downlink subframe, a downlink subframe, a downlink subframe, a downlink subframe, a downlink subframe, and a downlink subframe in this order. A cycle of a conversion point from a downlink toward an uplink is 10 subframes.

In the UL/DL configuration 5, subframes 0 to 9 in one radio frame respectively correspond to a downlink subframe, a special subframe, an uplink subframe, a downlink subframe, a downlink subframe, a downlink subframe, a downlink subframe, a downlink subframe, a downlink subframe, and a downlink subframe in this order. A cycle of a conversion point from a downlink toward an uplink is 10 subframes.

In the UL/DL configuration 6, subframes 0 to 9 in one radio frame respectively correspond to a downlink subframe, a special subframe, an uplink subframe, an uplink subframe, an uplink subframe, a downlink subframe, a special subframe, an uplink subframe, an uplink subframe, and a downlink subframe in this order. A cycle of a conversion point from a downlink toward an uplink is 5 subframes.

Here, in a case where the UL/DL configuration for at least one serving cell is the UL/DL configuration 5, serving cells of which the number is more than two are not configured.

$ES^{(L)}_k$ which is an USS of an EPDCCH at an aggregation level L is defined by a set of EPDCCH candidates. Here, L indicates any of 1, 2, 4, 8, 16, and 32. Regarding one EPDCCH-PRB set p, ECCEs corresponding to EPDCCH candidates of m in the search space $ES^{(L)}_k$ are given with $L((Y_{p,\,k}+\text{floor}(mN_{ECCE,\,p,\,k}/(LM^{(L)}_p))+b)$ mod (floor $(N_{ECCE,\,p,\,k}/L)))+i$. Here, i=0, . . . , L−1. In a case where a carrier indicator field (CIF) is configured for a serving cell in which an EPDCCH is monitored, b indicates the value of the CIF. In other cases, b=0 is satisfied. m=0, 1, . . . , $M^{(L)}_p-1$. In a case where a carrier indicator field (CIF) is not configured for a serving cell in which an EPDCCH is monitored, $M^{(L)}_p$ indicates the number of EPDCCHs to be monitored at an aggregation level L in an EPDCCH-PRB set p, in the serving cell in which an EPDCCH is monitored. In other cases, $M^{(L)}_p$ indicates the number of EPDCCHs to be monitored at an aggregation level L in an EPDCCH-PRB set p, in a serving cell indicated by the value of the CIF. Here, the CIF is a field in the DCI format. The value of the CIF is used for determining a serving cell in which PDSCH transmission, PUSCH transmission or a random access procedure correspond to the DCI format. The CIF has a value the same as a serving cell index corresponding to either of a primary cell and a secondary cell.

In a case where an ECCE corresponding to a certain EPDCCH candidate is mapped on a PRB pair for transmitting a PBCH, a primary synchronization signal, or a secondary synchronization signal, and for being overlapped on a frequency, in the same subframe, the terminal device does not monitor the EPDCCH candidate.

In a case where the same value of $n^{EPDCCH}_{ID,\,i}$ is configured in two EPDCCH-PRB sets in the terminal device, the terminal device receives an EPDCCH candidate which is an EPDCCH candidate which corresponds to one EPDCCH-PRB set and has a certain DCI payload size, and is mapped on a certain RE set, and the terminal device is also configured to monitor an EPDCCH candidate which is mapped on the same RE set and is an EPDCCH candidate which corresponds to another EPDCCH-PRB set and has the same DCI payload size, and in a case where the number of the first ECCE of the received EPDCCH is used in determination of a PUCCH resource for HARQ-ACK transmission, the number of the first ECCE is determined based on an EPDCCH-PRB set of p=0. Here, $n^{EPDCCH}_{ID,\,i}$ indicates a parameter used when pseudo random sequence generation of a demodulation reference signal (DMRS) associated with an EPDCCH is initialized. $n^{EPDCCH}_{ID, i}$ is configured by a higher layer. i has a value of 0 or 1. i indicates an EPDCCH set to which an EPDCCH associated with a DMRS belongs. That is, i has substantially the same meaning as p.

$Y_{p, k}$ is defined by $Y_{p, k}=(A_p Y_{p, k-1})\mod D$. Here, $Y_{p, -1}$ indicates a value of an RNTI which is an identifier configured in the terminal device in a physical layer. $A_0$ is 39827, $A_1$ is 39829, D is 65537, and $k=\text{floor}(n_s/2)$ is satisfied. That is, each subframe is constituted by two slots, and thus k indicates a subframe number in a radio frame.

FIGS. 22 to 31 are diagrams illustrating a correspondence table between the number of PRBs included in an EPDCCH-PRB set, an aggregation level, and the number of monitored EPDCCH candidates. An aggregation level for defining a search space and the number of monitored EPDCCH candidates is given as follows. Here, $N^{Xp}_{RB}$ indicates the number of PRB pairs constituting an EPDCCH-PRB set p.

In a case where only one EPDCCH-PRB for distributed transmission is configured in the terminal device, the aggregation level for defining a search space and the number of monitored EPDCCH candidates is listed up in FIGS. 22 and 23.

In a case where only one EPDCCH-PRB for localized transmission is configured in the terminal device, the aggregation level for defining a search space and the number of monitored EPDCCH candidates is listed up in FIGS. 24 and 25.

In a case where two EPDCCH-PRBs for distributed transmission are configured in the terminal device, the aggregation level for defining a search space and the number of monitored EPDCCH candidates is listed up in FIGS. 26 and 27.

In a case where two EPDCCH-PRBs for localized transmission are configured in the terminal device, the aggregation level for defining a search space and the number of monitored EPDCCH candidates is listed up in FIGS. 28 and 29.

In a case where one EPDCCH-PRB for distributed transmission and one EPDCCH-PRB for localized transmission are configured in the terminal device, the aggregation level for defining a search space and the number of monitored EPDCCH candidates is listed up in FIGS. 30 and 31. In FIGS. 30 and 31, p1 is a sign for identifying a localized EPDCCH-PRB set, and p2 is a sign for identifying a distributed EPDCCH-PRB set. That is, $N^{Xp1}_{RB}$ indicates the number of PRB pairs constituting a localized EPDCCH-PRB set, and $N^{Xp2}_{RB}$ indicates the number of PRB pairs constituting a distributed EPDCCH-PRB set. $M^{(L)}_p$ indicates the number of EPDCCHs to be monitored at the aggregation level L in the localized EPDCCH-PRB set. $M^{(L)}_{p2}$ indicates the number of EPDCCHs to be monitored at the aggregation level L in the distributed EPDCCH-PRB set.

Regarding the correspondence between the number of PRBs included in an EPDCCH-PRB set, an aggregation level, and the number of monitored EPDCCH candidates, which is illustrated in FIGS. 22 to 31, Case 1 is applied to the following cases (c1) to (c4). Case 2 is applied to the following cases (c5) to (c7). Case 3 is applied to the following case (c8).

(c1) A case where any of DCI formats 2, 2A, 2B, 2C, and 2D is monitored and $M^{DL}_{RB}$ is equal to or more than 25 in a normal subframe and a normal downlink CP. That is, a case where the number of REs which can be used in EPDCCH transmission, in one PRB pair is relatively large and the payload size of the DCI format is significantly large.

(c2) A case where any of DCI formats 2, 2A, 2B, 2C, and 2D is monitored, and $M^{DL}_{RB}$ is equal to or more than 25 in a special subframe of the special subframe configurations 3, 4, or 8, and a normal downlink CP (that is, special subframe in which a DwPTS is constituted by 11 OFDM symbols or more). That is, a case where the number of REs which can be used in EPDCCH transmission, in one PRB pair is relatively large and the payload size of the DCI format is significantly large.

(c3) A case where any of DCI formats 1A, 1B, 1D, 1, 2, 2A, 2B, 2C, 2D, 0, and 4 is monitored, and $n_{EPDCCH}$ is less than 104 in a normal subframe and a normal downlink CP. That is, a case where the number of REs which can be used in EPDCCH transmission, in one PRB pair is significantly small.

(c4) A case where any of DCI formats 1A, 1B, 1D, 1, 2, 2A, 2B, 2C, 2D, 0, and 4 is monitored, and $n_{EPDCCH}$ is less than 104 in a special subframe of the special subframe configurations 3, 4, or 8, and a normal downlink CP (that is, special subframe in which a DwPTS is constituted by 11 OFDM symbols or more). That is, a case where the number of REs which can be used in EPDCCH transmission, in one PRB pair is significantly small.

(c5) A case where any of DCI formats 1A, 1B, 1D, 1, 2, 2A, 2B, 2C, 2D, 0, and 4 is monitored in a normal subframe and an extended downlink CP. That is, a case where the number of REs which can be used in EPDCCH transmission, in one PRB pair is relatively small.

(c6) A case where any of DCI formats 1A, 1B, 1D, 1, 2, 2A, 2B, 2C, 2D, 0, and 4 is monitored in a special subframe of the special subframe configurations 1, 2, 6, 7, or 9, and a normal downlink CP (that is, special subframe in which a DwPTS is constituted by OFDM symbols of 6 to 10). That is, a case where the number of REs which can be used in EPDCCH transmission, in one PRB pair is relatively small.

(c7) A case where any of DCI formats 1A, 1B, 1D, 1, 2, 2A, 2B, 2C, 2D, 0, and 4 is monitored in a special subframe of the special subframe configurations 1, 2, 3, 5, or 6, and an extended downlink CP (that is, special subframe in which a DwPTS is constituted by OFDM symbols of 6 to 10). That is, a case where the number of REs which can be used in EPDCCH transmission, in one PRB pair is relatively small.

(c8) A case which is not any of (c1) to (c7). That is, a case where the number of REs which can be used in EPDCCH transmission, in one PRB pair is relatively large and the payload size of the DCI format is not large as much as the number of REs.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, in (c2) and (c4), the special subframe of the special subframe configuration 3, 4, or 8 means a special subframe based on a downlink reference UL/DL configuration of the special subframe configuration 3, 4, or 8, and is a special subframe in which a DwPTS includes 11 OFDM symbols or more. In (c6), the special subframe of the special subframe configuration 1, 2, 6, 7, or 9 means a special subframe based on a downlink reference UL/DL configuration of the special subframe configuration 1, 2, 6, 7, or 9. In (c7), the special subframe of the special subframe configuration 1, 2, 3, 5, or 6 means a special subframe based on a downlink reference UL/DL configuration of the special subframe configuration 1, 2, 3, 5, or 6. It is possible to define the above-described Cases for a special subframe in which an EPDCCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which case is applied can be set so as not to depend on whether or not a signal of explicit Layer 1 is detected. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

Here, in a case where a CIF is not configured for a serving cell in which an EPDCCH is monitored, in the terminal device, $M^{DL}_{RB}$ corresponds to $N^{DL}_{RB}$ of the serving cell in which an EPDCCH is monitored. In a case where, in the terminal device, a CIF is configured for a serving cell in which an EPDCCH is monitored, $M^{DL}_{RB}$ corresponds to $N^{DL}_{RB}$ of the serving cell designated by the value of the CIF. Here, $N^{DL}_{RB}$ corresponds to a downlink bandwidth configuration and is expressed by a multiple unit of a resource block size in the frequency direction. In other words, $N^{DL}_{RB}$ corresponds to the total number of resource blocks in a downlink component carrier in the frequency direction, in the serving cell. The DCI formats 1A, 1B, 2D, and 1 are DCI formats used in a transmission mode in which one transport block can be transmitted by using one PDSCH. The DCI formats 1A, 1B, 2D, and 1 are respectively used in transmission diversity, closed-loop spatial multiplexing which uses a single port, multi-user MIMO (Multiple Input Multiple Output), and a PDSCH transmission method which is referred to single antenna port transmission. The DCI formats 2, 2A, 2B, 2C, and 2D are DCI formats used in a transmission mode in which transport blocks of up to two can be transmitted by using one PDSCH. The DCI formats 2, 2A, 2B, 2C, and 2D are respectively used in closed-loop spatial multiplexing, large delay CDD (cyclic delay diversity), and 2 layer transmission, transmission of 8 layer or less, and a PDSCH transmission method which is referred to as transmission of 8 layer or less. The DCI formats 2 and 2A are also further used in a PDSCH transmission method of transmission diversity. The DCI formats 2B, 2C, and 2D are also used in a PDSCH transmission method of a single antenna port. The DCI formats 0 and 4 are DCI formats which are respectively used in transmission modes in which one transport block and transport blocks of up to two can be transmitted by using one PUSCH. The DCI formats 0 and 4 are respectively used in PDSCH transmission methods which are referred to as single antenna port transmission and closed-loop spatial multiplexing.

The transmission mode is a mode which is quasi-statically configured in the terminal device in order to receive PDSCH data transmission which is subjected to signaling through a PDCCH or an EPDCCH, through higher layer signaling. Regarding the transmission mode, any of the following transmission modes 1 to 10 is configured.

In the transmission mode 1, a PDSCH transmission method of single antenna port transmission (transmission by the antenna port 0) is used, and the DCI format 1 or 1A is used.

In the transmission mode 2, a PDSCH transmission method of transmission diversity is used, and the DCI format 1 or 1A is used.

In the transmission mode 3, a PDSCH transmission method of large delay CDD or transmission diversity is used, and the DCI format 1 or 2A is used.

In the transmission mode 4, a PDSCH transmission method of closed-loop spatial multiplexing or transmission diversity is used, and the DCI format 1 or 2 is used.

In the transmission mode 5, a PDSCH transmission method of multi-user MIMO or transmission diversity is used, and the DCI format 1 or 1D is used.

In the transmission mode 6, a PDSCH transmission method of closed-loop spatial multiplexing which uses a single port, or transmission diversity is used, and the DCI format 1 or 1B is used.

In the transmission mode 7, a PDSCH transmission method of any of single antenna port transmission (transmission by the antenna port 5), transmission diversity, and single antenna port transmission (transmission by the antenna port 0) is used, and the DCI format 1 is used.

In the transmission mode 8, a PDSCH transmission method of any of 2 layer transmission (transmission by the antenna port 7 and the antenna port 8), transmission diversity, and single antenna port transmission (transmission by the antenna port 0) is used, and the DCI format 1 or 2B is used.

In the transmission mode 9, a PDSCH transmission method of any of transmission of 8 layer or less (transmission by antenna ports from the antenna port 7 to the antenna port 14), transmission diversity, and single antenna port transmission (transmission by the antenna port 0) (single antenna port transmission by the antenna port 7 in a case of an MBSFN subframe) is used, and the DCI format 1 or 2C is used.

In the transmission mode 10, a PDSCH transmission method of any of transmission of 8 layer or less (transmission by antenna ports from the antenna port 7 to the antenna port 14), transmission diversity, and single antenna port transmission (transmission by the antenna port 0) (single antenna port transmission by the antenna port 7 in a case of an MBSFN subframe) is used, and the DCI format 1 or 2C is used.

A transmission mode (for example, the transmission mode 11 and the like by a rule similar to the transmission mode 9 or 10) other than the above transmission modes may be used.

In a case where a CIF is not configured in a terminal device, the terminal device monitors an USS of an EPDCCH at each aggregation level given by the correspondence tables in FIGS. 22 and 31, in each activated serving cell which is configured so as to monitor an EPDCCH. In a case where monitoring of an EPDCCH is configured in a terminal device and a CIF is configured in the terminal device, the terminal device monitors an USS of one or more EPDCCHs at each aggregation level given by the correspondence tables in FIGS. 22 and 31, in one or more activated serving cell, so as to be configured by higher layer signaling. A terminal device in which a CIF associated with monitoring of an EPDCCH is configured in a serving cell c monitors an EPDCCH (in which a CIF is configured and CRC scrambled by a C-RNTI is added) in an USS of the EPDCCH in the serving cell c. A terminal device in which a CIF associated with monitoring of an EPDCCH is configured in a primary cell monitors an EPDCCH (in which a CIF is configured and CRC scrambled by a semi-persistent scheduling-RNTI (SPS-RNTI) is added) in an USS of the EPDCCH in the primary cell. Here, the C-RNTI is an RNTI used in EPD- CCH transmission associated with dynamic PDSCH transmission or PUSCH transmission. The SPS-RNTI is an RNTI used in EPDCCH transmission associated with quasi-normal PDSCH transmission or PUSCH transmission.

In a case where a CIF is not configured in a terminal device in a serving cell in which an EPDCCH is monitored, the terminal device monitors an USS of an EPDCCH for the EPDCCH which does not include a CIF. In a case where a CIF is configured in a terminal device, the terminal device monitors an USS of an EPDCCH for the EPDCCH including a CIF. That is, it is determined whether or not an EPDCCH is decoded as an EPDCCH including a CIF or as an EPDCCH which does not include a CIF, in accordance with whether or not a CIF is configured. In a case where monitoring of an EPDCCH which includes a CIF corresponding to a secondary cell, in the other serving cell is configured in a terminal device, the terminal device does not monitor an EPDCCH in the secondary cell. In the serving cell in which an EPDCCH is monitored, the terminal device monitors EPDCCH candidates for at least the same serving cell.

In a terminal device which monitors EPDCCH candidates which include a CIF, have a certain DCI format size, and has attached CRC scrambled by a C-RNTI, in a certain serving cell, it is assumed that an EPDCCH candidate having the DCI format size may not be transmitted in the serving cell in all USSs of EPDCCHs corresponding to all values which may be taken with the DCI format size by a CIF.

In a case where a transmission opportunity of a positioning reference signal is configured for a serving cell in which an EPDCCH is monitored, only in an MBSFN subframe and a CP length used in the subframe 0 corresponds to a normal CP, the terminal device is not required to monitor an EPDCCH in a subframe which is configured as a portion of the transmission opportunity of the positioning reference signal, by a higher layer.

It is assumed that the same value of $C_{init}$ is used in the antenna ports 107 and 108 during when the terminal device monitors an EPDCCH candidate associated with any of the antenna ports 107 and 108. It is assumed that the same value of $C_{init}$ is used in the antenna ports 109 and 110 during when the terminal device monitors an EPDCCH candidate associated with any of the antenna ports 109 and 110.

In a case where configuring is performed for a certain serving cell through higher layer signaling such that a terminal device receives data transmission of a PDSCH in accordance with the transmission modes 1 to 9, the terminal device is operated in accordance with the following (s1) and (s2).

(s1) In a case where epdcch-StartSymbol-r11 which is a higher layer parameter is configured in the terminal device, a starting OFDM symbol for an EPDCCH, which is given by $l_{EPDCCHStart}$ which is an index in the first slot in one subframe is determined based on the higher layer parameter. The starting OFDM symbol is the first OFDM symbol when an EPDCCH is mapped in one subframe, and is also referred to as a start position of an EPDCCH. Here, epdcch-StartSymbol-r11 which is the higher layer parameter is a parameter which may be individually configured for each EPDCCH set and is a parameter for designating a starting OFDM symbol of an EPDCCH (information indicating the starting OFDM symbol). epdcch-StartSymbol-r11 which is the higher layer parameter is configured by using an RRC message.

(s2) In other cases, in a case where $N^{DL}_{RB}$ is more than 10, the starting OFDM symbol for an EPDCCH, which is given by $l_{EPDCCHStart}$ which is an index in the first slot in one subframe is given by a value of a control format indicator (CFI) in the subframe of the serving cell. In a case where $N^{DL}_{RB}$ is equal to or less than 10, 1 is added to the value of the CFI in the subframe of the serving cell, and the starting OFDM symbol is given by the value obtained by addition. Here, the CFI is a parameter which has any of 1, 2, and 3 as a value. The CFI is control information which is transmitted and received on a physical CFI channel (PCFICH). The CFI is information regarding the number of OFDM symbols used for transmitting a PDCCH in one subframe.

In a case where configuring is performed for a certain serving cell through higher layer signaling such that a terminal device receives data transmission of a PDSCH in accordance with the transmission mode 10, regarding each EPDCCH-PRB set, the starting OFDM symbol for monitoring an EPDCCH in a subframe k is determined in accordance with pdsch-Start-r11 which is a parameter in the higher layer, as in the following (s3) to (s6). Here, pdsch-Start-r11 which is a higher layer parameter is a parameter which may be individually configured for four types of parameter sets for a PDSCH, and is a parameter for designating a starting OFDM symbol of a PDSCH (information indicating the starting OFDM symbol). pdsch-Start-r11 which is the higher layer parameter is configured by using an RRC message.

(s3) In a case where the value of pdsch-Start-r11 belongs to a set of 1, 2, 3, and 4 (value is any of 1, 2, 3, and 4), $l'_{EPDCCHStart}$ is given by pdsch-Start-r11.

(s4) In other cases (case where the value of pdsch-Start-r11 does not belong to a set of 1, 2, 3, and 4), $l'_{EPDCCHStart}$ is given by the value of the CFI in the subframe k of the serving cell in a case where $N^{DL}_{RB}$ is more than 10. In a case where $N^{DL}_{RB}$ is equal to or less than 10, $l'_{EPDCCHStart}$ is given by a value which is obtained by adding 1 to the value of the CFI in the subframe k of the serving cell.

(s5) In a case where the subframe k is a subframe designated by mbsfn-SubframeConfigList-r11 which is a higher layer parameter or the subframe k is the subframe 1 or 6 in a TDD subframe constitution, $l_{EPDCCHStart}$ is given by $l_{EPDCCHStart}$=Min (2, $l'_{EPDCCHStart}$).

(s6) In other cases (case where the subframe k is not a subframe designated by mbsfn-SubframeConfigList-r11 which is a higher layer parameter, and the subframe k is not the subframe 1 or 6 in the TDD subframe constitution), $l_{EPDCCHStart}$ is given by $l_{EPDCCHStart}$=$l'_{EPDCCHStart}$.

In a case where configuring is performed for a certain serving cell through higher layer signaling such that a terminal device receives data transmission of a PDSCH in accordance with the transmission modes 1 to 9, and monitoring of an EPDCCH is configured for the certain serving cell, in the terminal device, it is assumed that the antenna ports 0 to 3, and 107 to 110 in the serving cell corresponds to pseudo collocation relating to Doppler shift, Doppler spread, an average delay, and delay spread (reception is performed on the assumption of being transmitted from the same transmission node or on the assumption of not being transmitted from a different transmission node).

In a case where configuring is performed for a certain serving cell through higher layer signaling such that a terminal device receives data transmission of a PDSCH in accordance with the transmission mode 10, and monitoring of an EPDCCH is configured for the certain serving cell, the following (q1) and (q1) are applied to each EPDCCH-PRB set.

(q1) In a case where decoding a PDSCH based on the pseudo collocation type A is configured in the terminal device by the higher layer, in the terminal device, it is assumed that the antenna ports 0 to 3, and 107 to 110 in the serving cell corresponds to pseudo collocation relating to Doppler shift, Doppler spread, an average delay, and delay spread.

(q2) In a case where decoding a PDSCH based on the pseudo collocation type B is configured in the terminal device by the higher layer, in the terminal device, it is assumed that the antenna ports 15 to 22 and 107 to 110 corresponding to qcl-CSI-RS-ConfigNZPId-r11 which is a higher layer parameter corresponds to pseudo collocation relating to Doppler shift, Doppler spread, an average delay, and delay spread. Here, qcl-CSI-RS-ConfigNZPId-r11 which is the higher layer parameter is a parameter which may be individually configured for four types of parameter sets for a PDSCH, and is a parameter for designating pseudo collocation of a PDSCH (information indicating whether an UE-specific reference signal associated with the PDSCH performs pseudo collocation with any CSIRS). qcl-CSI-RS-ConfigNZPId-r11 which is the higher layer parameter is configured by using an RRC message.

Here, the pseudo collocation type A and the pseudo collocation type B are parameters of which any one is configured for the terminal device in which the transmission mode 10 is configured, for each serving cell. The type A indicates that the antenna ports 7 to 14 are subjected to pseudo collocation with CRS antenna ports 0 to 3 of the serving cell. The type B indicates that the antenna ports 7 to 14 are subjected to pseudo collocation with any of CSIRS antenna ports 15 to 22. Conversely, in a case where the type B is configured, the CSIRS is not necessarily transmitted from a base station device corresponding to the serving cell, and may be transmitted from another base station device. In this case, an EPDCCH or a PDSCH which is subjected to pseudo collocation with the CSIRS is transmitted from a transmission node (for example, a remote radio head antenna device which is connected to a base station device through backhaul, or another base station device) which is the same as a transmission node which transmits the CSIRS.

In a case where configuring is performed for a certain serving cell through higher layer signaling such that a terminal device receives data transmission of a PDSCH in accordance with the transmission mode 10, and monitoring of an EPDCCH is configured for the certain serving cell, regarding an EPDCCH-PRB set, the terminal device uses a parameter designated by MappingQCL-ConfigId-r11 which is a parameter of the higher layer, in order to determine RE mapping of the EPDCCH and antenna port pseudo collocation. A parameter set includes parameters of the following (Q1) to (Q6) which are used for RE mapping of the EPDCCH and antenna port pseudo collocation.

(Q1) crs-PortsCount-r11. crs-PortsCount-r11 is a parameter indicating the number of ports of a CRS used when a PDSCH or an EPDCCH is mapped on an RE.

(Q2) crs-FreqShift-r11. crs-FreqShift-r11 is a parameter indicating frequency shift of the CRS used when a PDSCH or an EPDCCH is mapped on an RE.

(Q3) mbsdn-SubframeConfigList-r11. mbsdn-SubframeConfigList-r11 is a parameter indicating a position of an MBSFN subframe used when a PDSCH or an EPDCCH is mapped on an RE. In a subframe configured as an MBSFN subframe by the parameter, the PDSCH or the EPDCCH is mapped on the assumption that the CRS is provided only in an OFDM symbol to which a PDCCH is allocated (on the assumption that the CRS is not provided in an OFDM symbol to which a PDCCH is not allocated).

(Q4) csi-RS-ConfigZPId-r11. csi-RS-ConfigZPId-r11 is a parameter indicating a position of the zero power CSIRS used when a PDSCH or an EPDCCH is mapped on an RE.

(Q5) pdsch-Start-r11. pdsch-Start-r11 is a parameter indicating a starting OFDM symbol used when a PDSCH or an EPDCCH is mapped on an RE.

(Q6) qcl-CSI-RS-ConfigNZPId-r11. qcl-CSI-RS-ConfigNZPId-r11 is a parameter indicating a CSIRS which is collocated with a reference signal for demodulating a PDSCH or an EPDCCH. The parameter can designate an ID of any of one configured CSIRS or more. The reference signal for demodulating a PDSCH or an EPDCCH is set to be subjected to pseudo collocation with the CSIRS having a designated ID.

Next, a PUCCH format will be described. A PUCCH is for carrying uplink control information (UCI). Simultaneous transmission of a PUCCH and a PUSCH from the same terminal device is supported in a case where it is assumed that simultaneous transmission is possible. Regarding the frame constitution type 2, the PUCCH is not transmitted in an UpPTS field. The PUCCH supports a plurality of formats (PUCCH format 1, PUCCH format 1a, PUCCH format 1b, PUCCH format 2, PUCCH format 2a, PUCCH format 2b, and PUCCH format 3). As a modulation scheme, BPSK is used in the PUCCH format 1a, QPSK is used in the PUCCH format 1b, QPSK is used in the PUCCH format 2, QPSK and BPCK are used in the PUCCH format 2a, QPSK and QPCK are used in the PUCCH format 2b, and QPSK is used in the PUCCH format 3. As the number of bits of each subframe, the PUCCH format 1a carries 1 bit, the PUCCH format 1b carries 2 bits, the PUCCH format 2 carries 20 bits, the PUCCH format 2a carries 21 bits, the PUCCH format 2b carries 22 bits, and the PUCCH format 3 carries 48 bits. The PUCCH formats 2a and 2b are supported only for a normal CP.

The following combinations of the UCI in a PUCCH are supported.

- PUCCH format 1a. Supporting is performed for 1-bit HARQ-ACK or for 1-bit HARQ-ACK and a positive scheduling request (positive SR) in a case of FDD.
- PUCCH format 1b. Supporting is performed for two-bit HARQ-ACK or for two-bit HARQ-ACK and positive SR.
- PUCCH format 1b. Supporting is performed for HARQ-ACK of up to 4 bits, which uses channel selection, in a case where two serving cells or more are configured in a terminal device or in a case where a single serving cell is configured as TDD.
- PUCCH format 1. Supporting is performed for positive SR.
- PUCCH format 2. Supporting is performed for HARQ-ACK and one CSI report in a case of not being multiplexed.
- PUCCH format 2a. Supporting is performed for 1-bit HARQ-ACK and one CSI report in a case of being multiplexed, in a normal CP.
- PUCCH format 2b. Supporting is performed for 2-bit HARQ-ACK and one CSI report in a case of being multiplexed, in a normal CP.
- PUCCH format 2. Supporting is performed for HARQ-ACK and one multiplexed CSI report in an extended CP.
- PUCCH format 3. Supporting is performed for HARQ-ACK of up to 10 bits in FDD, and for HARQ-ACK of up to 20 bits in TDD.
- PUCCH format 3. Supporting is performed for 11 bits corresponding to 10-bit HARQ-ACK and 1-bit positive/negative SR in FDD, and for 21 bits which correspond to 20-bit HARQ-ACK and 1-bit positive/negative SR in TDD.

PUCCH format 3. Supporting is performed for HARQ-ACK (if provided) and 1-bit positive/negative SR, and for one CSI report for one serving cell.

The SR is used for requiring an UL-SCH resource, in order to perform new transmission of an UL-SCH which is an uplink data channel in a higher layer. The UL-SCH is transmitted and received in a physical layer, by using a PUSCH. In a case where HARQ-ACK and the SR are transmitted in the same subframe, HARQ-ACK is transmitted for negative SR transmission (transmission for indicating a negative SR), in a PUCCH resource assigned to HARQ-ACK (PUCCH format 1a/1b resource or PUCCH format 1b resource used in channel selection), and HARQ-ACK is transmitted for positive SR transmission (transmission for indicating a positive SR), in a PUCCH resource assigned to an SR. The PUCCH resource for the SR is configured by using an RRC message.

Channel selection is a method used along with the PUCCH format 1b. A PUCCH resource used when HARQ-ACK is transmitted among a plurality of PUCCH resources and the type of bit information (four types of {00, 01, 10, 00} in a case of the PUCCH format 1b) in the PUCCH resource are defined for each of plural combinations of HARQ-ACK (combination of ACK, NACK, or DTX as HARQ-ACK). The terminal device selects an appropriate PUCCH resource corresponding to the combination of HARQ-ACK and transmits a HARQ-ACK signal. The base station device monitors a plurality of PUCCH resources, and thus can recognize the combination of the HARQ-ACK, based on whether the HARQ-ACK signal is detected in each of the PUCCH resources, and what type of signal is detected. In the following descriptions, using PUCCH resources for the PUCCH format 1b with channel selection means that the PUCCH resources is used as the plurality of selected PUCCH resources. The phase of using PUCCH resources for the PUCCH format 1b with channel selection does not mean that the PUCCH resources are necessarily used for an actual HARQ-ACK signal. Basically, ACK means success in reception, and NACK means failure in reception (including failure of decoding in a state where transmission is detected). DTX means that transmission is not detected (not-transmission is detected).

Next, a procedure of HARQ-ACK feedback in TDD will be described. In the following descriptions, a procedure of HARQ-ACK feedback in a case where one serving cell is configured, and a procedure of HARQ-ACK feedback in a case where serving cells of which the number is more than 1 (two or more serving cells) are configured will be sequentially described. In descriptions for the procedure of HARQ-ACK feedback in the case where two serving cells or more are configured, HARQ-ACK feedback by the PUCCH format 1b with channel selection and HARQ-ACK feedback by the PUCCH format 3 will be sequentially described.

In TDD, two HARQ-ACK feedback modes are supported for a terminal device by a configuration of the higher layer. The terminal device does not support carrier aggregation (aggregating) of two serving cells or more (serving cell of which the number is more than 1) having the frame constitution type 2. HARQ-ACK bundling and HARQ-ACK multiplexing are supported. However, only HARQ-ACK bundling is supported for a terminal device which does not support carrier aggregation (aggregating) of two serving cells or more (serving cell of which the number is more than 1) having the UL/DL configuration 5 in TDD and the frame constitution type 2.

When two serving cells or more having the frame constitution type 2 are configured, in a terminal device which supports aggregation of the two serving cells or more having the frame constitution type 2, which one of the PUCCH format 1b with channel selection and the PUCCH format 3 is used for HARQ-ACK transmission is configured by the higher layer.

When (only) one serving cell having the frame constitution type 2 is configured, in a terminal device which supports aggregation of the two serving cells or more having the frame constitution type 2, which one of HARQ-ACK bundling, the PUCCH format 1b with channel selection, and the PUCCH format 3 is used for HARQ-ACK transmission is configured by the higher layer. The PUCCH format 1b with channel selection is not supported for the UL/DL configuration 5 in TDD.

FIG. 15 is a diagram illustrating a correspondence between a subframe (n−k) in which a PDSCH is allocated, and subframe n in which HARQ-ACK corresponding to the PDSCH is transmitted. Each of M pieces of numerical characters in each cell in the table indicates k. A numerical string constituted by the M pieces of numerical characters indicates $K(K=\{k_0, k_1, \ldots, k_{M-1}\})$ which is a set of k. K is referred to as a downlink association set. An order of $k_0, k_1, \ldots, k_{M-1}$ is an order from the left side of the numerical characters in the cell.

In the HARQ-ACK bundling in TDD, the logical AND operation of all of HARQ-ACKs for individual PDSCH transmission and ACKs as a response to a PDCCH/EPDCCH indicating SPS release of a downlink is performed over a plurality (M pieces) of DL subframes which are associated with a single uplink subframe n. The logical AND operation is performed for each code word, and the above PDSCH transmission includes a case where the transmission is performed along with the corresponding PDCCH/EPDCCH and a case of not being performed. Here, as described above, M indicates the number of elements in the downlink association set K. At this time, one or two HARQ-ACK bits which have been bundled are respectively transmitted to one serving cell, by using the PUCCH format 1a or the PUCCH format 1b. In this manner, HARQ-ACK is bundled, and thus, it is possible to reduce the number of bits which are actually transmitted. Accordingly, it is possible to use the PUCCH format 1a or the PUCCH format 1b which is a PUCCH format having small capacity.

Regarding HARQ-ACK in TDD, spatial HARQ-ACK bundling which is performed over a plurality of code words in one downlink subframe is performed for a subframe n in which M>1 is satisfied, by the logical AND operation of all of the corresponding individual HARQ-ACKs. In a case where one serving cell is configured, the PUCCH format 1b with channel selection is used. Regarding HARQ-ACK in TDD, spatial HARQ-ACK bundling which is performed over a plurality of code words in one downlink subframe is not performed for a subframe n in which M=1 is satisfied, and the HARQ-ACK bit of one bit or two bits is transmitted to one configured serving cell by respectively using the PUCCH format 1a and the PUCCH format 1b.

In TDD, in a case of two serving cells or more which are configured and have the PUCCH format 1b with channel selection, and of HARQ-ACK bits of which the number is more than 4 bits, for a plurality (M pieces) of DL subframes associated with the single uplink subframe n and serving cells, HARQ-ACK bundling which is performed over a plurality (M pieces) of downlink subframes associated with the single uplink subframe n is performed for all configured cells. HARQ-ACK bits which are bundled for each of the configured serving cells are transmitted by using the PUCCH 1b with channel selection. In TDD, in a case of two serving cells or more which are configured and have the PUCCH format 1b with channel selection, and of HARQ-ACK bits of up to 4 bits, for a plurality (M pieces) of downlink subframes associated with the single uplink subframe n and serving cells, the spatial HARQ-ACK bundling is not performed, and the HARQ-ACK bits are transmitted by using the PUCCH format 1b with channel selection.

In TDD, in a case of two serving cells or more which are configured and have the PUCCH format 3, and of HARQ-ACK bits of which the number is more than 20 bits, for a plurality (M pieces) of downlink subframes associated with the single uplink subframe n and serving cells, HARQ-ACK bundling which is performed over a plurality (M pieces) of DL subframes associated with the single uplink subframe n is performed for all configured cells, and transmission is performed by using the PUCCH 3. In TDD, in a case of two serving cells or more which are configured and have the PUCCH format 3, and of HARQ-ACK bits of up to 20 bits, for a plurality (M pieces) of downlink subframes associated with the single uplink subframe n and serving cells, the spatial HARQ-ACK bundling is not performed, and the HARQ-ACK bits are transmitted by using the PUCCH format 3.

In TDD, regarding the PUCCH format 3, the terminal device determines the number o of HARQ-ACK bits based on Expression 1, in association with one uplink subframe n.

Next, a procedure of HARQ-ACK in TDD for a case where one serving cell is configured will be described.

HARQ-ACK transmission on two antenna ports ($p_0$ and $p_1$ as the antenna port p) is supported for the PUCCH format 1a/1b using the HARQ-ACK bundling feedback mode of TDD, and for the PUCCH format 3. In a terminal device which supports aggregation of two serving cells or more having the frame constitution type 2, HARQ-ACK transmission on two antenna ports ($p_0$ and $p_1$ as the antenna port p) may be configured for the PUCCH format 1b with channel selection, by the higher layer.

The terminal device uses $n^{(1, p)}_{PUCCH}$ pieces of PUCCH resources for HARQ-ACK transmission of a subframe n on the antenna port p in the PUCCH format 1a/1b, regarding HARQ-ACK bundling of TDD for one configured serving cell or HARQ-ACK multiplexing of TDD, and for one subframe n in which M=1 is satisfied. Here, $n^{(1, p)}_{PUCCH}$ is determined in the following manner.

In a case where, in a subframe (n−k) (here, k corresponds to $k_0, k_1, \ldots$, and $k_{M-1}$ which are one element or more of K), PDSCH transmission indicated by detection of the corresponding PDCCH/EPDCCH is provided, a PDCCH/EPDCCH indicating downlink SPS release is provided, or the PDSCH transmission or a PDCCH indicating downlink SPS release is detected in a subframe (n−$k_m$) ($k_m$ is the minimum value in the set K used when the terminal device detects the PDSCH transmission or the PDCCH/EPDCCH indicating downlink SPS release in a subframe (n−k)), the terminal device, firstly, selects c which satisfies $N_c \leq n_{CCE} \leq N_{c+1}$ from {0, 1, 2, 3}, and uses $n^{(1, p0)}_{PUCCH} = (M-m-1)N_c + mN_{c+1} + n_{CCE} + N^{(1)}_{PUCCH}$ for the antenna port $p_0$. Here, $N^{(1)}_{PUCCH}$ is configured by the higher layer. $N_c = \max\{0, \text{floor}((N^{DL}_{RB}(N^{RB}_{sc} c-4))/36)\}$ is satisfied. n indicates the number of the first CCE used for PDCCH transmission corresponding to m which corresponds to a subframe (n−$k_m$). In a case where two antenna port transmissions are configured for the PUCCH format 1a/1b, a PUDCCH resource for HARQ-ACK bundling on the antenna port $p_1$ is given by $n^{(1, p1)}_{PUCCH} = (M-m-1)N_c + mN_{c+1} + n_{CCE} + 1 + N^{(1)}_{PUCCH}$. In this manner, c is selected and a PUCCH resource is determined. Thus, a PDCCH which is mapped on REs of the leading OFDM symbol in each subframe over the subframe set K is linked to a PUCCH resource having the lowest index. A PDCCH mapped on REs of the rear OFDM symbol in each subframe is linked to a PUCCH resource having a higher index. The leading OFDM symbol has a high probability of being used in PDCCH transmission. An OFDM symbol positioned more in the rear has a lower probability used in PDCCH transmission. Thus, in a case where only the forward OFDM symbol is used in PDCCH transmission, the PDCCH is linked to a PUCCH resource having a low index, and thus it is possible to use the remaining uplink resources in PUSCH transmission.

In a case where only PDSCH transmission in which there is no corresponding PDCCH/EPDCCH which has been detected in a subframe (n−k) (here, k corresponds to $k_0, k_1, \ldots$, and $k_{M-1}$ which are one element or more of K) is provided, the terminal device determines $n^{(1, p)}_{PUCCH}$ which is the value of the PUCCH resource $n^{(1, p)}_{PUCCH}$, based on a relationship table between a configuration of the higher layer, the value of the TPC command field for a PUCCH, and the value of $n^{(1)}_{PUCCH}$ configured in the higher layer. The determination is performed by using the PUCCH format 1a/1b. More specifically, values of four PUCCH resources are configured by the higher layer, and each of the four values which may be expressed by the TPC command field for the 2-bit PUCCH is correlated with each of the value of four PUCCH resources which are configured by the higher layer. The TPC command field for a PUCCH in a DCI format indicating SPS activation of a downlink is used as an index corresponding to one value among the values of the four PUCCH resources configured by the higher layer. For a terminal device in which two antenna port transmissions for the PUCCH format 1a/1b and HARQ-ACK bundling are configured, a value (index indicated by the TPC command field for the PUCCH) of a PUCCH resource in the correspondence relationship is mapped on two PUCCH resources which are the first PUCCH resource $n^{(1, p0)}_{PUCCH}$ for the antenna port $p_0$ and the second PUCCH resource $n^{(1, p1)}_{PUCCH}$ for the antenna port $p_1$. In other cases, the value (index indicated by the TPC command field for the PUCCH) of the PUCCH resource is mapped on a single PUCCH resource $n^{(1, p0)}_{PUCCH}$ for the antenna port $p_0$. In this manner, PUCCH resources can be quasi-normally allocated to PDSCH transmission in which there is no corresponding PDCCH/EPDCCH, that is, for PDSCH transmission by a downlink SPS (excluding PDSCH transmission which is performed simultaneously with SPS activation). The quasi-normal PUCCH resource is ensured in a region separate from a region of a PUCCH resource (dynamic PUCCH resource) calculated from an index of an element of a PDCCH/EPDCCH, and thus it is possible to optimize scheduling in the base station device.

In a case where, in a subframe (n−k) (here, k corresponds to $k_0, k_1, \ldots$, and $k_{M-1}$ which are one element or more of K), PDSCH transmission indicated by detection of the corresponding PDCCH/EPDCCH is provided, a PDCCH/EPDCCH indicating downlink SPS release is provided, or the PDSCH transmission or a PDCCH indicating downlink SPS release is detected in a subframe (n−$k_m$) ($k_m$ is the minimum value in the set K used when the terminal device detects the PDSCH transmission or the PDCCH/EPDCCH indicating downlink SPS release in a subframe (n−k)), the terminal device uses the following PUCCH resource $n^{(1, p0)}_{PUCCH}$ for the antenna port $p_0$.

If distributed transmission is configured in an EPDCCH-PRB set q, $n^{(1, p0)}_{PUCCH}$ is obtained by Expression 2.

If localized transmission is configured in an EPDCCH-PRB set q, $n^{(1, p0)}_{PUCCH}$ is obtained by Expression 3.

Here, $n_{ECCE, q}$ indicates the number of the first CCE used for transmission of DCI assignment (assignment by a DCI) corresponding to the EPDCCH-PRB set q in m corresponding to the subframe (n–$k_m$). That is, $n_{ECCE, q}$ indicates the lowest ECCE index used for constituting the EPDCCH. $N^{(e1)}_{PUCCH, q}$ in the EPDCCH-PRB set q is configured by pucch-ResourceStartOffset-r11 which is a higher layer parameter. $N^{ECCE, q}_{RB}$ for the EPDCCH-PRB set q in the subframe (n–$k_m$) is the number of ECCEs per PRB pair which has the same meaning as the above-described $N^{RB}_{ECCE}$. As described above, n' is determined based on an antenna port used for EPDCCH transmission in the subframe (n–$k_m$). FIGS. 32 and 33 are diagrams illustrating a relationship between a value of a HARQ-ACK resource offset field, and $\Delta_{ARO}$ which is a HARQ-ACK resource offset value. If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe (n–$k_{i1}$) is configured in a terminal device, $N_{ECCE, q, n-ki1}$ is equal to the number of ECCEs in the EPDCCH-PRB set q configured in the terminal device in the subframe (n–$k_{i1}$). If monitoring an EPDCCH in a subframe (n–$k_{i1}$) is not configured in a terminal device, $N_{ECCE, q, n-ki1}$ is equal to the number of ECCEs, which is calculated on the assumption that the EPDCCH-PRB set q configured in the terminal device is configured in the subframe (n–$k_{i1}$). If the subframe is a special subframe of the special subframe configuration 0 or 5 in the normal CP, $N_{ECCE, q, n-ki1}$ is equal to 0. If the subframe (n–$k_{i1}$) is a special subframe of the special subframe configuration 0, 4, or 7 in the extended CP, $N_{ECCE, q, n-ki1}$ is equal to 0. A PUCCH resource for the antenna port $p_1$ is given as follows.

If distributed transmission is configured in the EPDCCH-PRB set q, $n^{(1, p1)}_{PUCCH}$ is obtained by adding 1 to Expression 2.

If localized transmission is configured in the EPDCCH-PRB set q, $n^{(1, p1)}_{PUCCH}$ is obtained by adding 1 to Expression 3.

Here, $N^{(e1)}_{PUCCH, q}$ which is an offset of a PUCCH resource which may be configured so as to be specific to a terminal is applied when an EPDCCH is detected, and is not applied when a PDCCH is detected. Thus, it is possible to separate a region of PUCCH resources used when an EPDCCH is detected and a region of PUCCH resources used when a PDCCH is detected, from each other. As a result, it is possible to avoid collision of both regions with each other. A set of PUCCH resources linked to EPDCCHs in each subframe is shifted for each subframe by $N_{ECCE, q, n-ki1}$. Thus, since linking to PUCCH resource indices which become lower is performed in an order of $k_0, k_1, \ldots, k_{M-1}$, it is possible to avoid collision of PUCCH resources between the corresponding downlink subframes. $\Delta_{ARO}$ may be dynamically configured so as to be specific to a terminal. Thus, even when the same $N^{(e1)}_{PUCCH, q}$ is configured for two EPDCCH sets, it is possible to avoid collision of PUCCH resources between the EPDCCH sets. In a case where different $N^{(e1)}_{PUCCH, q}$ are configured for two EPDCCH sets, so as to assign a PUCCH resource linked to an EPDCCH in a second EPDCCH set, next to a PUCCH resource linked to an EPDCCH in a first EPDCCH set, the PUCCH resource linked to the EPDCCH in the first EPDCCH set may be used even when the EPDCCH in the second EPDCCH set is used by $\Delta_{ARO}$. Uplink resources may be efficiently used. The PUCCH resource is determined by using n' which is calculated from the antenna port, and thus it is possible to avoid collision of the PUCCH resource between the terminal devices, by using spatial multiplexing, even when one ECCE (the same ECCE) is used in EPDCCH transmission for two terminal devices or more.

$$n_{ECCE,q} + \sum_{i1=0}^{m-1} N_{ECCE,q,n-k_{i1}} + \Delta_{ARO} + N^{(e1)}_{PUCCH,q} \qquad \text{[Expression 2]}$$

$$\left\lfloor \frac{n_{ECCE,q}}{N^{ECCE,q}_{RB}} \right\rfloor \cdot N^{ECCE,q}_{RB} + \qquad \text{[Expression 3]}$$
$$\sum_{i1=0}^{m-1} N_{ECCE,q,n-k_{i1}} + n' + \Delta_{ARO} + N^{(e1)}_{PUCCH,q}$$

This means that PUCCH resources corresponding to the subframe is not reserved (it is assumed that the number of PUCCH resources corresponding to the subframe is 0) in a case where a subframe in which the number of OFDM symbols constituting a DwPTS is equal to or less than 5 (subframe in which the number of REs for EPDCCH transmission in one PRB is less than a predetermined number, and the number of REs for EPDCCH transmission is insufficient) is provided, when an implicit PUCCH resource is defined, the special subframe configuration 0 or 5 in the normal CP, or the special subframe configuration 0, 4, or 7 in the extended CP. Accordingly, the PUCCH resource can be compressed, and thus it is possible to efficiently use uplink resources.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe (n–$k_{i1}$) is a special subframe in the downlink reference UL/DL configuration of the special subframe configuration 0 or 5, in the normal CP, $N_{ECCE, q, n-ki1}$ is equal to 0. If the subframe (n–$k_{i1}$) is a special subframe in the downlink reference UL/DL configuration of the special subframe configuration 0, 4, or 7, in the extended CP, $N_{ECCE, q, n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

Regarding HARQ-ACK multiplexing of TDD for one configured serving cell, and one subframe n in which M>1 is satisfied, $n^{(1)}_{PUCCH, i}$ is presented by using a PUCCH resource which is obtained from a subframe (n−$k_i$) and HARQ-ACK(i) which is used as an ACL/NACK/DTX response formed from the subframe (n−$k_i$). Here, k indicates one element or more of K. 0≤i≤M−1 is satisfied. $n^{(1)}_{PUCCH, i}$ is determined in the following manner.

In the subframe (n−$k_i$), PUCCH resources for PDSCH transmission indicated by detecting the corresponding PDCCH, or a PDCCH indicating downlink SPS release satisfies $n^{(1)}_{PUCCH}$=(M−i−1)$N_c$+i$N_{c+1}$+$n_{CCE, i}$+$N^{(1)}_{PUCCH}$. Here, a value which is selected from {0, 1, 2, 3} so as to satisfy $N_c$≤$n_{CCE}$≤$N_{c+1}$ is used as c. $n_{CCE, i}$ indicates the number of the first CCE used for corresponding PDCCH transmission in the subframe (n−$k_i$). $N^{(1)}_{PUCCH}$ is configured by the higher layer.

The value $n^{(1)}_{PUCCH, i}$ of the PUCCH resource is determined for PDSCH transmission which is detected in the subframe (n−$k_i$) and has no corresponding PDCCH/EPDCCH. The determination is performed based on the configuration of the higher layer and the relationship table between the value of the TPC command field for a PUCCH, and the value of $n^{(1)}_{PUCCH}$ configured in the higher layer.

Regarding PDSCH transmission indicated by detection of the corresponding PDCCH/EPDCCH is provided, or a PDCCH/EPDCCH indicating downlink SPS release, the terminal device uses the following PUCCH resource $n^{(1, p0)}_{PUCCH}$ in the subframe (n−$k_i$).

If distributed transmission is configured in an EPDCCH-PRB set q, $n^{(1)}_{PUCCH, i}$ is obtained by Expression 4.

If localized transmission is configured in an EPDCCH-PRB set q, $n^{(1)}_{PUCCH, i}$ is obtained by Expression 5.

Here, $n_{ECCE, q}$ indicates the number of the first CCE used for transmission of DCI assignment corresponding to the EPDCCH-PRB set q in the subframe (n−$k_i$). That is, $n_{ECCE, q}$ indicates the lowest ECCE index used for constituting the EPDCCH. $N^{(e1)}_{PUCCH, q}$ in the EPDCCH-PRB set q is configured by pucch-ResourceStartOffset-r11 which is a higher layer parameter. $N^{ECCE, q}_{RB}$ for the EPDCCH-PRB set q in the subframe (n−$k_i$) is the number of ECCEs per PRB pair which has the same meaning as the above-described $N^{RB}_{ECCE}$. As described above, n' is determined based on an antenna port used for EPDCCH transmission in the subframe (n−$k_m$). If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe (n−$k_{i1}$) is configured in a terminal device, $N_{ECCE, q, n-ki1}$ is equal to the number of ECCEs in the EPDCCH-PRB set q configured in the terminal device in the subframe (n−$k_{i1}$). If monitoring an EPDCCH in a subframe (n−$k_{i1}$) is not configured in a terminal device, $N_{ECCE, q, n-ki1}$ is equal to the number of ECCEs, which is calculated on the assumption that the EPDCCH-PRB set q configured in the terminal device is configured in the subframe (n−$k_{i1}$). If the subframe (n−$k_{i1}$) is a special subframe of the special subframe configuration 0 or 5 in the normal CP, $N_{ECCE, q, n-ki1}$ is equal to 0. If the subframe (n−$k_{i1}$) is a special subframe of the special subframe configuration 0, 4, or 7 in the extended CP, $N_{ECCE, q, n-ki1}$ is equal to 0. In this manner, the HARQ-ACK resource offset field is used for performing determination based on one PUCCH resource of a plurality of PUCCH resources configured in the higher layer. Thus, the TPC field can be used in transmission of a TPC command.

$$n_{ECCE,q} + \sum_{i1=0}^{i-1} N_{ECCE,q,n-k_{i1}} + \Delta_{ARO} + N^{(e1)}_{PUCCH,q} \quad \text{[Expression 4]}$$

$$\left\lfloor \frac{n_{ECCE,q}}{N^{ECCE,q}_{RB}} \right\rfloor \cdot N^{ECCE,q}_{RB} + \quad \text{[Expression 5]}$$

$$\sum_{i1=0}^{i-1} N_{ECCE,q,n-k_{i1}} + n' + \Delta_{ARO} + N^{(e1)}_{PUCCH,q}$$

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe (n−$k_{i1}$) is a special subframe in the downlink reference UL/DL configuration of the special subframe configuration 0 or 5, in the normal CP, $N_{ECCE, q, n-ki1}$ is equal to 0. If the subframe (n−$k_{i1}$) is a special subframe in the downlink reference UL/DL configuration of the special subframe configuration 0, 4, or 7, in the extended CP, $N_{ECCE, q, n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

If two antenna port transmissions are not configured for the PUCCH format 1b with channel selection in a terminal device, the terminal device in which a single serving cell is configured performs channel selection based on higher layer signaling. The channel selection is performed based on either of a set of the first correspondence relationship, the second correspondence relationship, and the third correspondence relationship, and a set of the fourth correspondence relationship, the fifth correspondence relationship, and the sixth correspondence relationship. If two antenna port transmissions are configured for the PUCCH format 1b with channel selection in a terminal device, the terminal device performs channel selection based on the set of the fourth correspondence relationship, the fifth correspondence relationship, and the sixth correspondence relationship.

Here, the first correspondence relationship to the sixth correspondence relationship present correspondence tables indicating a correspondence relationship between the contents of HARQ-ACK, a PUCCH resource ($n^{(1)}_{PUCCH, 0}$, $n^{(1)}_{PUCCH, 1}$, $n^{(1)}_{PUCCH, 2}$, or $n^{(1)}_{PUCCH, 3}$), and a value (0 or 1) of two bits transmitted in the PUCCH resource, in transmission of HARQ-ACK multiplexing. The first correspondence relationship and the fourth correspondence relationship are correspondence relationships between two PDSCH transmissions. The second correspondence relationship and the fifth correspondence relationship are correspondence relationships between three PDSCH transmissions. The third correspondence relationship and the sixth correspondence relationship are correspondence relationships between four PDSCH transmissions. The first correspondence relationship, the second correspondence relationship, and the third correspondence relationship are correspondence relationships used only in a case where a single serving cell is configured. The fourth correspondence relationship, the fifth correspondence relationship, and the sixth correspondence relationship are correspondence relationships which are also used in a case where two serving cells or more are configured. The fourth correspondence relationship, the fifth correspondence relationship, and the sixth correspondence relationship are designed in a case where single PDSCH transmission (or PDCCH/EPDCCH indicating downlink SPS release) is performed actually only in a primary cell even when a plurality of serving cells is configured. The designing thereof is performed so as to have a transmission method which is the same as HARQ-ACK transmission in a case where only one serving cell (only primary cell) is configured.

More specifically, each of the correspondence relationships has the following features.

The first correspondence relationship is a correspondence table in which whether using as $n^{(1)}_{PUCCH}$ is performed, and the value of b(0) and b(1) which are two bits uniquely correspond to each combination of the contents (ACK, NACK, or DTX) of HARQ-ACK(0) and HARQ-ACK(1) which are two HARQ-ACKs. The two HARQ-ACKs correspond to two PDSCH transmissions (or transmission of a PDCCH/EPDCCH indicating SPS release). $n^{(1)}_{PUCCH}$ is a PUCCH resource obtained by selecting any PUCCH resource among $n^{(1)}_{PUCCH, 0}$ and $n^{(1)}_{PUCCH, 1}$ which are PUCCH resources corresponding to two PDSCH transmissions (or transmission of a PDCCH/EPDCCH indicating SPS release). In a case where all of the HARQ-ACK(0) and the HARQ-ACK(1) are DTX, HARQ-ACK is not transmitted.

The second correspondence relationship is a correspondence table in which whether using as $n^{(1)}_{PUCCH}$ is performed, and the value of b(0) and b(1) which are two bits uniquely correspond to each combination of the contents of HARQ-ACK(0), HARQ-ACK(1), and HARQ-ACK(2) which are three HARQ-ACKs. The three HARQ-ACKs correspond to three PDSCH transmissions (or transmission of a PDCCH/EPDCCH indicating SPS release). $n^{(1)}_{PUCCH}$ is a PUCCH resource obtained by selecting any PUCCH resource among $n^{(1)}_{PUCCH, 0}$, $n^{(1)}_{PUCCH, 1}$, and $n^{(1)}_{PUCCH, 2}$ which are PUCCH resources corresponding to three PDSCH transmissions (or transmission of a PDCCH/EPDCCH indicating SPS release). In a case where all of the HARQ-ACK(0), the HARQ-ACK(1), and the HARQ-ACK(2) are DTX, HARQ-ACK is not transmitted.

The third correspondence relationship is a correspondence table in which whether using as $n^{(1)}_{PUCCH}$ is performed, and the value of b(0) and b(1) which are two bits uniquely correspond to each combination of the contents of HARQ-ACK(0), HARQ-ACK(1), HARQ-ACK(2), and HARQ-ACK(3) which are four HARQ-ACKs. The four HARQ-ACKs correspond to four PDSCH transmissions (or transmission of a PDCCH/EPDCCH indicating SPS release). $n^{(1)}_{PUCCH}$ is a PUCCH resource obtained by selecting any PUCCH resource among $n^{(1)}_{PUCCH, 0}$, $n^{(1)}_{PUCCH, 1}$, $n^{(1)}_{PUCCH, 2}$, and $n^{(1)}_{PUCCH, 3}$ which are PUCCH resources corresponding to four PDSCH transmissions (or transmission of a PDCCH/EPDCCH indicating SPS release). In a case where all of the HARQ-ACK(0), the HARQ-ACK(1), the HARQ-ACK(2), and the HARQ-ACK(3) are DTX, HARQ-ACK is not transmitted.

The fourth correspondence relationship is a correspondence table in which whether using as $n^{(1)}_{PUCCH}$ is performed, and the value of b(0) and b(1) which are two bits uniquely correspond to each combination of the contents of HARQ-ACK(0) and HARQ-ACK(1) which are two HARQ-ACKs. The two HARQ-ACKs correspond to two PDSCH transmissions (or transmission of a PDCCH/EPDCCH indicating SPS release). $n^{(1)}_{PUCCH}$ is a PUCCH resource obtained by selecting any PUCCH resource among $n^{(1)}_{PUCCH, 0}$ and $n^{(1)}_{PUCCH, 1}$ which are PUCCH resources corresponding to two PDSCH transmissions (or transmission of a PDCCH/EPDCCH indicating SPS release). In a case where the HARQ-ACK(0) and the HARQ-ACK(1) are respectively DTX and NACK/DTX, HARQ-ACK is not transmitted.

The fifth correspondence relationship is a correspondence table in which whether using as $n^{(1)}_{PUCCH}$ is performed, and the value of b(0) and b(1) which are two bits uniquely correspond to each combination of the contents of HARQ-ACK(0), HARQ-ACK(1), and HARQ-ACK(2) which are three HARQ-ACKs. The three HARQ-ACKs correspond to three PDSCH transmissions (or transmission of a PDCCH/EPDCCH indicating SPS release). $n^{(1)}_{PUCCH}$ is a PUCCH resource obtained by selecting any PUCCH resource among $n^{(1)}_{PUCCH, 0}$, $n^{(1)}_{PUCCH, 1}$, and $n^{(1)}_{PUCCH, 2}$ which are PUCCH resources corresponding to three PDSCH transmissions (or transmission of a PDCCH/EPDCCH indicating SPS release). In a case where the HARQ-ACK(0), the HARQ-ACK(1), and the HARQ-ACK(2) are respectively DTX, NACK/DTX, and NACK/DTX, HARQ-ACK is not transmitted.

The sixth correspondence relationship is a correspondence table in which whether using as $n^{(1)}_{PUCCH}$ is performed, and the value of b(0) and b(1) which are two bits uniquely correspond to each combination of the contents of HARQ-ACK(0), HARQ-ACK(1), HARQ-ACK(2), and HARQ-ACK(3) which are four HARQ-ACKs. The four HARQ-ACKs correspond to four PDSCH transmissions (or transmission of a PDCCH/EPDCCH indicating SPS release). $n^{(1)}_{PUCCH}$ is a PUCCH resource obtained by selecting any PUCCH resource among $n^{(1)}_{PUCCH, 0}$, $n^{(1)}_{PUCCH, 1}$, $n^{(1)}_{PUCCH, 2}$, and $n^{(1)}_{PUCCH, 3}$ which are PUCCH resources corresponding to four PDSCH transmissions (or transmission of a PDCCH/EPDCCH indicating SPS release). In a case where the HARQ-ACK(0), the HARQ-ACK(1), the HARQ-ACK(2), and the HARQ-ACK(3) are DTX, NACK/DTX, NACK/DTX, and NACK/DTX, HARQ-ACK is not transmitted.

Regarding the selected set of the correspondence relationships, the terminal device transmits b(0) and b(1) with $n^{(1, p)}_{PUCCH}$ which is a resource of a subframe n on the antenna port p, by using the PUCCH format 1b. Here, regarding the antenna port $p_0$ and the values of b(0) and b(1), $n^{(1, p)}_{PUCCH} = n^{(1)}_{PUCCH}$ is satisfied, and the PUCCH resource $n^{(1)}_{PUCCH}$ is generated by channel selection, based on the set of the tables which are respectively selected in M=2, 3, and 4. The terms of M=2, 3, and 4 respectively means two, three, and four PDSCH transmission (or PDCCH/EPDCCH transmission indicating SPS release). When two antenna port transmission is configured for the PUCCH format 1b with channel selection in the terminal device, $n^{(1, p1)}_{PUCCH}$ corresponds to the antenna port p1. Here, $n^{(1, p1)}_{PUCCH}$ is substituted with $n^{(1, p1)}_{PUCCH}$, and $n^{(1)}_{PUCCH, i}$ is substituted with $n^{(1, p1)}_{PUCCH}$, and thus $n^{(1, p1)}_{PUCCH}$ is selected from $n^{(1, p1)}_{PUCCH, i}$ (0≤i≤M−1) which is PUCCH resources configured by the higher layer. The selection is performed based on the set of the correspondence relationships selected in M=2, 3, and 4.

Next, a procedure of HARQ-ACK in TDD for a case where two serving cells or more is configured will be described.

A HARQ-ACK feedback procedure in TDD for two or more configured serving cells is performed based on either of a procedure of the PUCCH format 1b with channel selection and a procedure of the PUCCH format 3. Regarding the PUCCH format 3 and TDD for the two or more configured serving cells, HARQ-ACK transmission on two antenna ports ($p_0$ and $p_1$ as the antenna port p) is supported. Regarding the PUCCH format 1b with channel selection and TDD for the two configured serving cells, HARQ-ACK transmission on two antenna ports is supported.

In a case where two serving cells or more are configured in a terminal device and TDD UL/DL configurations of all of the serving cells are the same as each other, the TDD UL/DL configuration 5 in the PUCCH format 3 is supported only for the configured serving cells of up to two. In a case where two serving cells are configured in a terminal device, and TDD UL/DL configurations of all of the serving cells are the same as each other, the TDD UL/DL configuration 5 in the PUCCH format 1b with channel selection is not supported for the two configured serving cell. In a case where two serving cells are configured in a terminal device, and TDD UL/DL configurations of the two serving cells are not the same as each other (TDD UL/DL configurations are different from each other), and in a case where a downlink reference UL/DL configuration is the TDD UL/DL configuration 5 in at least one serving cell, the PUCCH format 1b with channel selection is not supported.

Next, a HARQ-ACK procedure in TDD by the PUCCH format 1b with channel selection in a case where two serving cells are configured will be described.

If two serving cells having the same UL/DL configuration are configured in a terminal device, M indicates the number of elements for a subframe n of the set K, and $M_{primary}=M$ is satisfied. If two serving cells which have UL/DL configurations different from each other are configured in a terminal device, the terminal device determines M for the subframe n as $M=\max(M_{primary}, M_{secondary})$. Here, $M_{primary}$ indicates the number of elements for the subframe n of the set K in the TDD UL/DL configuration of a primary cell. $M_{secondary}$ indicates the number of elements for the subframe n of the set $K_c$ in the TDD UL/DL configuration of a secondary cell (secondary serving cell). If $M_{secondary}<M$ is satisfied, the terminal device sets DTX for $j=M_{secondary}$ from M−1 in HARQ-ACK(j), in the secondary cell. If $M_{primary}<M$ is satisfied, the terminal device sets DTX for $j=M_{primary}$ from M−1 in HARQ-ACK(j), in the primary cell.

If two serving cells having different UL/DL configurations are configured in a terminal device, K in the following descriptions may be set to be $K_c$. $K_c$ is a set of k for setting as a subframe (n−k) (downlink subframe or special subframe associated with a subframe n) corresponding to a downlink association set which is associated with a subframe n in a case where a downlink reference UL/DL configuration is determined based on a combination of an UL/DL configuration of a primary cell and an UL/DL configuration of a secondary cell, and the determined downlink reference UL/DL configuration is referred as the UL/DL configuration. In a system in which a base station device can dynamically configure the UL/DL configuration, the downlink reference UL/DL configuration may be configured through an RRC message.

Regarding two configured serving cells and one subframe n of M=1 in TDD HARQ-ACK multiplexing of the PUCCH format 1b with channel selection, a terminal device determines the number o of HARQ-ACK bits based on the number of configured serving cells and a downlink transmission mode configured for each of the serving cells. The terminal device uses a two-bit HARQ-ACK bit for a serving cell in which a downlink transmission mode of supporting transport blocks of up to two is configured. In other cases (for a serving cell in which a downlink transmission mode of supporting only one transport block is configured), a 1-bit HARQ-ACK bit is used.

Regarding two configured serving cells and one subframe n of M≤2 in TDD HARQ-ACK multiplexing of the PUCCH format 1b with channel selection, a terminal device transmits b(0) and b(1) which are HARQ-ACK bits, to the antenna port p in a PUCCH resource $n^{(1, p)}_{PUCCH}$ by using the PUCCH format 1b. Here, the terminal device transmits b(0) and b(1) on the antenna port p, in $n^{(1, p)}_{PUCCH}$ which is a resource of the subframe n. Here, $n^{(1, p)}_{PUCCH}=n^{(1)}_{PUCCH}$ is satisfied for the antenna port $p_0$, and the PUCCH resource $n^{(1)}_{PUCCH}$ is selected from A pieces of PUCCH resources $n^{(1)}_{PUCCH, j}$ (0≤j≤A−1, and A is a set of {2, 3, 4}), based on the fourth correspondence relationship, the fifth correspondence relationship, and the sixth correspondence relationship in a subframe using the PUCCH format 1b. A=2, 3, and 4 respectively mean two, three, and four PDSCH transmissions (or PDCCH/EPDCCH transmission indicating SPS release) among all PDSCH transmissions (or PDCCH/EPDCCH transmissions indicating SPS release). When the two antenna port transmission is configured for the PUCCH format 1b with channel selection in the terminal device, $n^{(1, p1)}_{PUCCH}$ corresponds to the antenna port p1. Here, $n^{(1)}_{PUCCH}$ is substituted with $n^{(1, p1)}_{PUCCH}$, $n^{(1)}_{PUCCH, i}$ is substituted with $n^{(1, p1)}_{PUCCH, i}$, and thus $n^{(1, p1)}_{PUCCH, i}$ is selected from $n^{(1, p1)}_{PUCCH, i}$ (0≤j≤A−1) which is A pieces of PUCCH resources configured by the higher layer. The selection is performed based on the fourth correspondence relationship, the fifth correspondence relationship, and the sixth correspondence relationship. For the subframe n in which M=1 is satisfied, HARQ-ACK(j) indicates an ACK/NACK/DTX response to one transport block associated with a serving cell or to a PDCCH/EPDCCH of SPS release. Here, the transport block for HARQ-ACK(j), the serving cell, and the A pieces of PUCCH resources are set to be the next correspondence relationship (first correspondence relationship from a subframe to HARQ-ACK). That is, in a case of A=2, HARQ-ACK(0) and HARQ-ACK(1) respectively correspond to the transport block 1 of the primary cell, and the transport block 1 of the secondary cell. In a case of A=3, HARQ-ACK(0), HARQ-ACK(1), and HARQ-ACK(2) respectively correspond to the transport block 1 of the serving cell 1, the transport block 2 of the serving cell 1, and the transport block 1 of the serving cell 2. In a case of A=4, HARQ-ACK(0), HARQ-ACK(1), HARQ-ACK(2), and HARQ-ACK(3) respectively correspond to the transport block 1 of the primary cell, the transport block 2 of the primary cell, the transport block 1 of the secondary cell, and the transport block 2 of the secondary cell. For the subframe n in which M=2 is satisfied, HARQ-ACK(j) indicates an ACK/NACK/DTX response to one PDSCH transmission associated with a subframe which is given by the set K (downlink association set) in the serving cell, or to a PDCCH/EPDCCH of SPS release. Here, the subframe, the serving cell, and the A pieces of PUCCH resources for HARQ-ACK(j) in each serving cell are set to be the next correspondence relationship (second correspondence relationship from a subframe to HARQ-ACK). That is, HARQ-ACK(0), HARQ-ACK(1), HARQ-ACK(2), and HARQ-ACK(3) respectively correspond to a first subframe of the primary cell, a second subframe of the primary cell, a first subframe of the secondary cell, and a second subframe of the secondary cell. In a case of M=1, the terminal device determines the A pieces of PUCCH resource $n^{(1)}_{PUCCH, i}$ associated with HARQ-ACK(j) (0≤j≤A−1) in the first correspondence relationship from the subframe to HARQ-ACK. In a case of M=2, the terminal device determines the A pieces of PUCCH resource $n^{(1)}_{PUCCH, i}$ associated with HARQ-ACK(j) (0≤j≤A−1) in the second correspondence relationship from the subframe to HARQ-ACK. The determination of PUCCH resource $n^{(1)}_{PUCCH, i}$ is performed based on the following descriptions.

The PUCCH resource for PDSCH transmission indicated by detecting the corresponding PDCCH in the subframe (n−$k_m$) (here, $k_m$ is one element or more of K in the primary cell), or the PUCCH resource for a PDCCH indicating downlink SPS release in the subframe (n−$k_m$) (here, $k_m$ is one element or more of K) in the primary cell corresponds to $n^{(1)}_{PUCCH, j}$=($M_{primary}$−m−1) $N_c$+m$N_{c+1}$+$n_{CCE, m}$+$N^{(1)}_{PUCCH}$. Here, a value which is selected from {0, 1, 2, 3} so as to satisfy $N_c$≤$n_{CCE}$≤$N_{c+1}$ and $N_c$=max{0, floor(($N^{DL}_{RB}$($N^{RB}_{sc}$c−4))/36)} is used as c. $N^{DL}_{RB}$ is determined from the primary cell. In a serving cell in which the corresponding PDSCH transmission occurs, the PUCCH resource $n^{(1)}_{PUCCH, j+1}$ is given by $n^{(1)}_{PUCCH, j+1}$=($M_{primary}$−m−1) $N_c$+m$N_{c+1}$+$n_{CCE, m}$+1+$N^{(1)}_{PUCCH}$, for the subframe n of M=1, and a transmission mode in which transport blocks of up to two are supported. Here, $n_{CCE, m}$ indicates the number of the first CCE used in transmission of the corresponding DCI assignment. $N^{(1)}_{PUCCH}$ is configured by the higher layer.

For PDSCH transmission (which is detected in the subframe (n−k) (here, k is one element or more of K)) in the primary cell in which there is no corresponding PDCCH/EPDCCH, the value of $n^{(1)}_{PUCCH, j}$ is determined based on a relationship table between the configuration of the higher layer, the value of the TPC command field for the PUCCH, and the value of $n^{(1)}_{PUCCH}$ configured in the higher layer.

In the subframe (n−$k_m$) (here, $k_m$ is one element or more of K in the primary cell), the PUCCH resource $n^{(1)}_{PUCCH, j}$ is given for PDSCH transmission indicated by detecting the corresponding EPDCCH, or for the EPDCCH indicating downlink SPS release, as follows.

If distributed transmission is configured in the EPDCCH-PRB set q, $n^{(1)}_{PUCCH, j}$ is obtained by Expression 2.

If localized transmission is configured in the EPDCCH-PRB set q, $n^{(1)}_{PUCCH, j}$ is obtained by Expression 3.

Here, $n_{ECCE, q}$ indicates the number of the first CCE used for transmission of DCI assignment corresponding to the EPDCCH-PRB set q in the subframe (n−$k_m$). That is, $n_{ECCE, q}$ indicates the lowest ECCE index used for constituting the EPDCCH. $N^{(e1)}_{PUCCH, q}$ in the EPDCCH-PRB set q is configured by pucch-ResourceStartOffset-r11 which is the higher layer parameter. $N^{ECCE, q}_{RB}$ for the EPDCCH-PRB set q in the subframe (n−$k_m$) is the number of ECCEs per PRB pair which has the same meaning as the above-described $N^{RB}_{ECCE}$. As described above, n' is determined based on an antenna port used for EPDCCH transmission in the subframe (n−$k_m$). If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe (n−$k_{i1}$) is configured in a terminal device, $N_{ECCE, q, n-ki1}$ is equal to the number of ECCEs in the EPDCCH-PRB set q configured in the terminal device in the subframe (n−$k_{i1}$). If monitoring an EPDCCH in a subframe (n−$k_{i1}$) is not configured in a terminal device, $N_{ECCE, q, n-ki1}$ is equal to the number of ECCEs, which is calculated on the assumption that the EPDCCH-PRB set q configured in the terminal device is configured in the subframe (n−$k_{i1}$). If the subframe (n−$k_{i1}$) is a special subframe of the special subframe configuration 0 or 5 in the normal CP, $N_{ECCE, q, n-ki1}$ is equal to 0. If the subframe (n−$k_{i1}$) is a special subframe of the special subframe configuration 0, 4, or 7 in the extended CP, $N_{ECCE, q, n-ki1}$ is equal to 0. In a serving cell in which the corresponding PDSCH transmission occurs, the PUCCH resource $n^{(1)}_{PUCCH, j+1}$ is given for a transmission mode in which the subframe n of M=1 and transport blocks of up to two are supported, as follows.

If distributed transmission is configured in an EPDCCH-PRB set q, $n^{(1)}_{PUCCH, j+1}$ is obtained by adding 1 to Expression 2.

If localized transmission is configured in an EPDCCH-PRB set q, $n^{(1)}_{PUCCH, j+1}$ is obtained by adding 1 to Expression 3.

This means that PUCCH resources corresponding to the subframe is not reserved (it is assumed that the number of PUCCH resources corresponding to the subframe is 0) in a case where a subframe in which the number of OFDM symbols constituting a DwPTS is equal to or less than 5 (subframe in which the number of REs for EPDCCH transmission in one PRB is less than a predetermined number, and the number of REs for EPDCCH transmission is insufficient) is provided, when an implicit PUCCH resource is defined, the special subframe configuration 0 or 5 in the normal CP, or the special subframe configuration 0, 4, or 7 in the extended CP. Accordingly, it is possible to efficiently use resources of an uplink. This assumption is used in a rule of the PUCCH resource based on EPDCCH transmission (rule of the implicit PUCCH resource to which block interleaving of an OFDM symbol base is not applied). In the rule of the PUCCH resource based on PDCCH transmission, a PUCCH resource corresponding to the subframe is also reserved, and block interleaving of the OFDM symbol base is applied without distinction from other subframes.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe (n−$k_{i1}$) is a special subframe in the downlink reference UL/DL configuration of the special subframe configuration 0 or 5, in the normal CP, $N_{ECCE, q, n-ki1}$ is equal to 0. If the subframe (n−$k_{i1}$) is a special subframe in the downlink reference UL/DL configuration of the special subframe configuration 0, 4, or 7, in the extended CP, $N_{ECCE, q, n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

A subframe is a subframe n of M=2 or a subframe n of M=1 for PDSCH transmission indicated by detecting the corresponding PDCCH/EPDCCH, in the subframe (n−k) (here, k is one element or more of K of the secondary cell). Regarding a transmission mode in the secondary cell, in which transport blocks of up to two are supported, the value of $n^{(1)}_{PUCCH,j}$ and the value of $n^{(1)}_{PUCCH,j+1}$ are determined based on the relationship table between the configuration of the higher layer, the value of the TPC command field for the PUCCH, and the value of $n^{(1)}_{PUCCH}$ configured in the higher layer. The TPC field in a DCI format of the corresponding PDCCH/EPDCCH is used for determining a value of a PUCCH resource from one of values of four resources configured by the higher layer. Regarding a terminal device in which a transmission mode in which transport blocks of up to two are supported is configured in the secondary cell, and for the subframe n of M=1 or a subframe n of M=2, the values of PUCCH resources in the relationship table are mapped on $n^{(1)}_{PUCCH,j}$ and $n^{(1)}_{PUCCH,j+1}$ which are two PUCCH resources. In other cases, the values of the PUCCH resources are mapped on a single PUCCH resource $n^{(1)}_{PUCCH,j}$. The terminal device performs processing such that a value of a PUCCH resource of the same HARQ-ACK is transmitted in all TPC fields of PDCCH/EPDCCH assignment in the secondary cell, in the subframe (n−k) (here, k is one element or more of K of the secondary cell). In this manner, it is possible to quasi-normally use PUCCH resources for PDSCH transmission in the secondary cell. The quasi-normal PUCCH resource is ensured in a region separate from that of a dynamic PUCCH resource. Thus, when a base station device schedules dynamic PUCCH resource, it is possible to reduce load of scheduling.

Then, regarding TDD HARQ-ACK multiplexing of the PUCCH format 1b with channel selection, the subframe n of M>2, and two configured serving cell, $n^{(1)}_{PUCCH,i}$ (0≤j≤3) is indicated as a PUCCH resource obtained from transmission in M pieces of downlink subframes which are associated with the uplink subframe n. $n^{(1)}_{PUCCH,0}$ and $n^{(1)}_{PUCCH,1}$ are associated with PDSCH transmission or PDCCH/EPDCCH transmission indicating downlink SPS release, in the primary cell. $n^{(1)}_{PUCCH,0}$ and $n^{(1)}_{PUCCH,1}$ are associated with PDSCH transmission in the secondary cell.

At this time, the following processing is performed for the primary cell.

For PDSCH transmission in the primary cell which is detected in the subframe (n−k) (here, k is one element or more of K) and has no corresponding PDCCH/EPDCCH, the PUCCH resource is determined as follows.

The value of $n^{(1)}_{PUCCH,0}$ is determined based on a relationship table between the configuration of the higher layer, the value of the TPC command field for the PUCCH, and the value of $n^{(1)}_{PUCCH}$ configured in the higher layer.

For PDSCH transmission in the primary cell indicated by detecting the corresponding PDCCH in the subframe (n−$k_m$) (here, $k_m$ is an element of K, in which the value of a downlink assignment index (DAI) in the PDCCH is equal to 1), or for the PDCCH indicating downlink SPS release in the subframe (n−$k_m$) (here, $k_m$ is an element of K, in which the value of a DAI in the PDCCH is equal to 1), the PUCCH resource $n^{(1)}_{PUCCH,1}$ is $n^{(1)}_{PUCCH,1}=(M_{primary}-m-1)N_c+mN_{c+1}+n_{CCE,m}+N^{(1)}_{PUCCH}$. Here, a value which is selected from {0, 1, 2, 3} so as to satisfy $N_c \le n_{CCE} \le N_{c+1}$ and $N_c=\max\{0, \text{floor}((N^{DL}_{RB}(N^{RB}_{sc}c-4))/36)\}$ is used as c. $n_{CCE,m}$ indicates the number of the first CCE used for transmission of the corresponding PDCCH in the subframe (n−$k_m$). $N^{(1)}_{PUCCH}$ is configured by the higher layer. Here, the DAI indicates the value indicated by a DAI field in a DCI format. The DAI indicates the number of subframes in a downlink association set, which has PDSCH transmission or transmission of a PDCCH/EPDCCH indicating downlink SPS release (including transmission associated with a PDCCH/EPDCCH which having the DAI). That is, the value of the DAI being 1 indicates that a downlink subframe with PDSCH transmission which is indicated by detecting a PDCCH/EPDCCH which has the DAI, or PDCCH/EPDCCH transmission which indicates downlink SPS release and has the DAI is the first subframe with the above PDSCH transmission or the above PDCCH/EPDCCH transmission, in the downlink association set. The value of the DAI being two or more indicates that a downlink subframe with PDSCH transmission which is indicated by detecting a PDCCH/EPDCCH which has the DAI, or PDCCH/EPDCCH transmission which indicates downlink SPS release and has the DAI is a subframe which is subsequent to the second subframe, and has the above PDSCH transmission or the above PDCCH/EPDCCH transmission, in the downlink association set.

For PDSCH transmission indicated by detecting the corresponding EPDCCH in the subframe (n−$k_m$) (here, $k_m$ is an element of K, in which the value of a DAI in the PDCCH is equal to 1), or for the EPDCCH indicating downlink SPS release in the subframe (n−$k_m$) (here, $k_m$ is an element of K, in which the value of a DAI in the PDCCH is equal to 1), the PUCCH resource $n^{(1)}_{PUCCH,j}$ is given as follows.

If distributed transmission is configured in the EPDCCH-PRB set q, $n^{(1)}_{PUCCH,1}$ is obtained by Expression 2.

If localized transmission is configured in the EPDCCH-PRB set q, $n^{(1)}_{PUCCH,1}$ is obtained by Expression 3.

Here, $n_{ECCE,q}$ indicates the number of the first CCE used for transmission of DCI assignment corresponding to the EPDCCH-PRB set q in the subframe (n−$k_m$). That is, $n_{ECCE,q}$ indicates the lowest ECCE index used for constituting the EPDCCH. $N^{(e1)}_{PUCCH,q}$ in the EPDCCH-PRB set q is configured by pucch-ResourceStartOffset-r11 which is the higher layer parameter. $N^{ECCE,q}_{RB}$ for the EPDCCH-PRB set q in the subframe (n−$k_m$) is the number of ECCEs per PRB pair which has the same meaning as the above-described $N^{RB}_{ECCE}$. As described above, n' is determined based on an antenna port used for EPDCCH transmission in the subframe (n−$k_m$). If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe (n−$k_{i1}$) is configured in a terminal device, $N_{ECCE, q, n-ki1}$ is equal to the number of ECCEs in the EPDCCH-PRB set q configured in the terminal device in the subframe (n−$k_{i1}$). If monitoring an EPDCCH in a subframe (n−$k_{i1}$) is not configured in a terminal device, $N_{ECCE, q, n-ki1}$ is equal to the number of ECCEs, which is calculated on the assumption that the EPDCCH-PRB set q configured in the terminal device is configured in the subframe (n−$k_{i1}$). If the subframe (n−$k_{i1}$) is a special subframe of the special subframe configuration 0 or 5 in the normal CP, $N_{ECCE, q, n-ki1}$ is equal to 0. If the subframe (n−$k_{i1}$) is a special subframe of the special subframe configuration 0, 4, or 7 in the extended CP, $N_{ECCE, q, n-ki1}$ is equal to 0.

This means that PUCCH resources corresponding to the subframe is not reserved (it is assumed that the number of PUCCH resources corresponding to the subframe is 0) in a case where a subframe in which the number of OFDM symbols constituting a DwPTS is equal to or less than 5 (subframe in which the number of REs for EPDCCH transmission in one PRB is less than a predetermined number, and the number of REs for EPDCCH transmission is insufficient) is provided, when an implicit PUCCH resource is defined, the special subframe configuration 0 or 5 in the normal CP, or the special subframe configuration 0, 4, or 7 in the extended CP.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe (n−$k_{i1}$) is a special subframe in the downlink reference UL/DL configuration of the special subframe configuration 0 or 5, in the normal CP, $N_{ECCE, q, n-ki1}$ is equal to 0. If the subframe (n−$k_{i1}$) is a special subframe in the downlink reference UL/DL configuration of the special subframe configuration 0, 4, or 7, in the extended CP, $N_{ECCE, q, n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

HARQ-ACK(0) is an ACK/NACK/DTX response to PDSCH transmission in which there is no corresponding PDCCH/EPDCCH. Regarding 1≤j≤M−1, if PDSCH transmission with the corresponding PDCCH/EPDCCH, and PDSCH transmission in which the value of a DAI in the PDCCH/EPDCCH is equal to j, or a PDCCH/EPDCCH indicating downlink SPS, and a PDCCH/EPDCCH in which the value of a DAI in the PDCCH/EPDCCH is equal to j are received, HARQ-ACK(j) is an ACK/NACK/DTX response corresponding to the received PDSCH transmission or the received PDCCH/EPDCCH. In other cases, HARQ-ACK(j) is set to be DTX.

In other cases, that is, in a case where PDSCH transmission is not performed in the primary cell which is detected in the subframe (n−k) (here, k is one element or more of K) and has no corresponding PDCCH/EPDCCH, the PUCCH resource is determined as follows.

For PDSCH transmission in the primary cell indicated by detecting the corresponding PDCCH in the subframe (n−$k_m$) (here, $k_m$ is an element of K), and for a PDSCH in which the DAI value in the PDCCH is equal to either of 1 and 2 in a state where the TDD UL/DL configuration in the primary cell belongs to {1, 2, 3, 4, 6}, or for PDCCH transmission indicating downlink SPS release in the subframe (n−$k_m$) (here, $k_m$ is an element of K), and for a PDCCH in which the DAI value in the PDCCH is equal to either of 1 and 2 in a state where the TDD UL/DL configuration in the primary cell belongs to {1, 2, 3, 4, 6}, the PUCCH resource $n^{(1)}_{PUCCH, i}$ is $n^{(1)}_{PUCCH, i}=(M_{primary}-m-1) N_c+mN_{c+1}+n_{CCE, m}+N^{(1)}_{PUCCH}$. Here, a value which is selected from {0, 1, 2, 3} so as to satisfy $N_c \leq n_{CCE} \leq N_{c+1}$ and $N_c=\max\{0, \text{floor}((N^{DL}_{RB}(N^{RB}_{SC}c-4))/36)\}$ is used as c. $n_{CCE, m}$ indicates the number of the first CCE used for transmission of the corresponding PDCCH in the subframe (n−$k_m$). $N^{(1)}_{PUCCH}$ is configured by the higher layer. In the primary cell of the TDD UL/DL configuration which belongs to {1, 2, 3, 4, 6}, i=0 is satisfied for the corresponding EPDCCH in which the DAI value is equal to 1, and i=1 is satisfied for the corresponding EPDCCH in which the DAI value is equal to 2. In the primary cell of the TDD UL/DL configuration 5, i=0 is satisfied for the corresponding EPDCCH.

For PDSCH transmission in the primary cell indicated by detecting the corresponding EPDCCH in the subframe (n−$k_m$) (here, $k_m$ is an element of K), and for a PDSCH in which the DAI value in the EPDCCH is equal to either of 1 and 2 in a state where the TDD UL/DL configuration in the primary cell belongs to {1, 2, 3, 4, 6}, or for EPDCCH transmission indicating downlink SPS release in the subframe (n−$k_m$) (here, $k_m$ is an element of K), and for an EPDCCH in which the DAI value in the EPDCCH is equal to either of 1 and 2 in a state where the TDD UL/DL configuration in the primary cell belongs to {1, 2, 3, 4, 6}, the PUCCH resource $n^{(1)}_{PUCCH, j}$ is given as follows.

If distributed transmission is configured in the EPDCCH-PRB set q, $n^{(1)}_{PUCCH, i}$ is obtained by Expression 2.

If localized transmission is configured in the EPDCCH-PRB set q, $n^{(1)}_{PUCCH, i}$ is obtained by Expression 3.

Here, $n_{ECCE, q}$ indicates the number of the first CCE used for transmission of DCI assignment corresponding to the EPDCCH-PRB set q in the subframe (n−$k_m$). That is, $n_{ECCE, q}$ indicates the lowest ECCE index used for constituting the EPDCCH. $N^{(e1)}_{PUCCH, q}$ in the EPDCCH-PRB set q is configured by pucch-ResourceStartOffset-r11 which is the higher layer parameter. $N^{ECCE, q}_{RB}$ for the EPDCCH-PRB set q in the subframe (n−$k_m$) is the number of ECCEs per PRB pair which has the same meaning as the above-described $N^{RB}_{ECCE}$. As described above, n' is determined based on an antenna port used for EPDCCH transmission in the subframe (n−$k_m$). If m=0 is satisfied, as shown in FIG.

32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe ($n-k_{i1}$) is configured in a terminal device, $N_{ECCE, q, n-ki1}$ is equal to the number of ECCEs in the EPDCCH-PRB set q configured in the terminal device in the subframe ($n-k_{i1}$). If monitoring an EPDCCH in a subframe ($n-k_{i1}$) is not configured in a terminal device, $N_{ECCE, q, n-ki1}$ is equal to the number of ECCEs, which is calculated on the assumption that the EPDCCH-PRB set q configured in the terminal device is configured in the subframe ($n-k_{i1}$). If the subframe ($n-k_{i1}$) is a special subframe of the special subframe configuration 0 or 5 in the normal CP, $N_{ECCE, q, n-ki1}$ is equal to 0. If the subframe ($n-k_{i1}$) is a special subframe of the special subframe configuration 0, 4, or 7 in the extended CP, $N_{ECCE, q, n-ki1}$ is equal to 0. Here, in the primary cell of the TDD UL/DL configuration which belongs to {1, 2, 3, 4, 6}, i=0 is satisfied for the corresponding EPDCCH in which the DAI value is equal to 1, and i=1 is satisfied for the corresponding EPDCCH in which the DAI value is equal to 2. In the primary cell of the TDD UL/DL configuration 5, i=0 is satisfied for the corresponding EPDCCH.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe ($n-k_{i1}$) is a special subframe in the downlink reference UL/DL configuration of the special subframe configuration 0 or 5, in the normal CP, $N_{ECCE, q, n-ki1}$ is equal to 0. If the subframe ($n-k_{i1}$) is a special subframe in the downlink reference UL/DL configuration of the special subframe configuration 0, 4, or 7, in the extended CP, $N_{ECCE, q, n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

Regarding 1≤j≤M−1, and the primary cell of the TDD UL/DL configuration which belongs to {1, 2, 3, 4, 6}, if PDSCH transmission with the corresponding PDCCH/EPDCCH, and PDSCH transmission in which the value of a DAI in the PDCCH/EPDCCH is equal to (j+1), or a PDCCH/EPDCCH indicating downlink SPS, and a PDCCH/EPDCCH in which the value of a DAI in the PDCCH/EPDCCH is equal to (j+1) are received, HARQ-ACK(j) is an ACK/NACK/DTX response corresponding to the received PDSCH transmission or the received PDCCH/EPDCCH. In other cases, HARQ-ACK(j) is set to be DTX. Regarding 1≤j≤M−1, and the primary cell of the TDD UL/DL configuration 0, if PDSCH transmission with the corresponding PDCCH/EPDCCH or a PDCCH/EPDCCH indicating downlink SPS is received, HARQ-ACK(0) is an ACK/NACK/DTX response corresponding to the received PDSCH transmission or PDCCH/EPDCCH. In other cases, HARQ-ACK(j) is set to be DTX.

The following processing is performed for the secondary cell.

For PDSCH transmission in the secondary cell, which has a DAI value equal to 1 or 2, and indicated by detecting the corresponding PDCCH in the primary cell, in the subframe ($n-k_m$) (here, $k_m$ is an element of K), the PUCCH resource $n^{(1)}_{PUCCH, i}$ is $n^{(1)}_{PUCCH, i} = (M_{primary}-m-1) N_c + mN_{c+1} + n_{CCE, m} + N^{(1)}_{PUCCH}$. Here, a value which is selected from {0, 1, 2, 3} so as to satisfy $N_c \leq n_{CCE} \leq N_{c+1}$ and $N_c = \max\{0, \text{floor}((N^{DL}_{RB}(N^{RB}_{SC}c-4))/36)\}$ is used as c. $N^{DL}_{RB}$ is determined from the primary cell. $n_{CCE, m}$ indicates the number of the first CCE used for transmission of the corresponding PDCCH in the subframe ($n-k_m$). $N^{(1)}_{PUCCH}$ is configured by the higher layer. i=2 is satisfied for the corresponding PDCCH in which the DAI value is equal to 1. i=3 is satisfied for the corresponding PDCCH in which the DAI value is equal to 2.

For PDSCH transmission in the secondary cell, which has a DAI value equal to 1 or 2, and indicated by detecting the corresponding EPDCCH in the primary cell, in the subframe ($n-k_m$) (here, $k_m$ is an element of K), the PUCCH resource $n^{(1)}_{PUCCH, j}$ is given as follows.

If distributed transmission is configured in the EPDCCH-PRB set q, $n^{(1)}_{PUCCH, i}$ is obtained by Expression 2.

If localized transmission is configured in the EPDCCH-PRB set q, $n^{(1)}_{PUCCH, i}$ is obtained by Expression 3.

Here, $n_{ECCE, q}$ indicates the number of the first CCE used for transmission of DCI assignment corresponding to the EPDCCH-PRB set q in the subframe ($n-k_m$). That is, $n_{ECCE, q}$ indicates the lowest ECCE index used for constituting the EPDCCH. $N^{(e1)}_{PUCCH, q}$ in the EPDCCH-PRB set q is configured by pucch-ResourceStartOffset-r11 which is the higher layer parameter. $N^{ECCE, q}_{RB}$ for the EPDCCH-PRB set q in the subframe ($n-k_m$) is the number of ECCEs per PRB pair which has the same meaning as the above-described $N^{RB}_{ECCE}$. As described above, n' is determined based on an antenna port used for EPDCCH transmission in the subframe ($n-k_m$). If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe ($n-k_{i1}$) is configured in a terminal device, $N_{ECCE, q, n-ki1}$ is equal to the number of ECCEs in the EPDCCH-PRB set q configured in the terminal device in the subframe ($n-k_{i1}$). If monitoring an EPDCCH in a subframe ($n-k_{i1}$) is not configured in a terminal device, $N_{ECCE, q, n-ki1}$ is equal to the number of ECCEs, which is calculated on the assumption that the EPDCCH-PRB set q configured in the terminal device is configured in the subframe ($n-k_{i1}$). If the subframe ($n-k_{i1}$) is a special subframe of the special subframe configuration 0 or 5 in the normal CP, $N_{ECCE, q, n-ki1}$ is equal to 0. If the subframe ($n-k_{i1}$) is a special subframe of the special subframe configuration 0, 4, or 7 in the extended CP, $N_{ECCE, q, n-k_{i1}}$ is equal to 0. Here, i=2 is satisfied for the corresponding EPDCCH in which the DAI value is equal to 1, and i=3 is satisfied for the corresponding EPDCCH in which the DAI value is equal to 2.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe $(n-k_{i1})$ is a special subframe in the downlink reference UL/DL configuration of the special subframe configuration 0 or 5, in the normal CP, $N_{ECCE, q, n-k_{i1}}$ is equal to 0. If the subframe $(n-k_{i1})$ is a special subframe in the downlink reference UL/DL configuration of the special subframe configuration 0, 4, or 7, in the extended CP, $N_{ECCE, q, n-k_{i1}}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

For PDSCH transmission which has a DAI value equal to 1 or 2, and is indicated by detecting the corresponding PDCCH/EPDCCH in the secondary cell, in the subframe $(n-k_m)$ (here, k is an element of K), the value of $n^{(1)}_{PUCCH, 2}$ and the value of $n^{(1)}_{PUCCH, 3}$ are determined based on a relationship table between the configuration of the higher layer, the value of the TPC command field for the PUCCH, and the value of $n^{(1)}_{PUCCH}$ configured in the higher layer. The TPC field in a DCI format of the corresponding PDCCH/EPDCCH is used for determining a value of a PUCCH resource from one of values of four resources configured by the higher layer. The terminal device performs processing such that a value of a PUCCH resource of the same HARQ-ACK is transmitted in all TPC fields of PDCCH/EPDCCH assignment in the secondary cell, in the subframe (n−k) (here, k is one element or more of K of the secondary cell).

Regarding 1≤j≤M−1, if PDSCH transmission with the corresponding PDCCH/EPDCCH, and PDSCH transmission in which the value of a DAI in the PDCCH/EPDCCH is equal to (j+1) are received, HARQ-ACK(j) is an ACK/NACK/DTX response corresponding to the received PDSCH transmission or the received PDCCH/EPDCCH. In other cases, HARQ-ACK(j) is set to be DTX.

The terminal device performs channel selection, and transmits b(0) and b(1) with $n^{(1, p)}_{PUCCH}$ which is a resource on the antenna port p, by using the PUCCH format 1b. Here, $n^{(1, p)}_{PUCCH}=n^{(1)}_{PUCCH}$ in a subframe n is satisfied for the antenna port $p_0$. The values of b(0) and b(1) and the PUCCH resource $n^{(1)}_{PUCCH}$ are generated based on the set of tables selected in M=3 and 4, by channel selection. When two antenna port transmission is configured for the PUCCH format 1b with channel selection in the terminal device, $n^{(1, p1)}_{PUCCH}$ corresponds to the antenna port p1. Here, $n^{(1)}_{PUCCH}$ is substituted with $n^{(1, p1)}_{PUCCH}$, and $n^{(1)}_{PUCCH, i}$ is substituted with $n^{(1, p1)}_{PUCCH, i}$, and thus $n^{(1, p1)}_{PUCCH}$ is selected from $n^{(1, p1)}_{PUCCH, i}$ (0≤i≤3) which is PUCCH resources configured by the higher layer. The selection is performed based on the set of the correspondence relationships selected in M=3 and 4.

Next, a HARQ-ACK procedure in TDD by the PUCCH format 3 will be described.

In a case where one serving cell is configured in a terminal device, or in a case where two serving cells or more are configured in the terminal device and UL/DL configurations of all of the serving cells are the same as each other, K is the general K as described above. M indicates the number of elements in the set K. If two serving cells or more are configured in the terminal device, and at least two cells have UL/DL configurations different from each other, K in the following descriptions may be set to be $K_c$. In this case, M also indicates the number of elements in the set K.

For the subframe n of M≥1 (M is the number of elements of the set K) in TDD HARQ-ACK transmission with the PUCCH format 3, and for two or more configured serving cell, the PUCCH resource $n^{(3, p)}_{PUCCH}$ or $n^{(1, p)}_{PUCCH}$ is used for HARQ-ACK transmission to the terminal device in the subframe n on the antenna port p. Here, $n^{(3, p)}_{PUCCH}$ or $n^{(1, p)}_{PUCCH}$ is determined as follows.

For single PDSCH transmission only in the primary cell indicated by detecting the corresponding PDCCH in the subframe $(n-k_m)$ (here, $k_m$ is one element or more of K), and PDSCH transmission in which the DAI value in the PDCCH is 1 in the primary cell of the TDD UL/DL configuration which belongs to {1, 2, 3, 4, 5, 6}, or for a PDCCH indicating downlink SPS release in the subframe $(n-k_m)$ and a PDCCH in which the DAI value in the PDCCH is 1 in the primary cell of the TDD UL/DL configuration which belongs to {1, 2, 3, 4, 5, 6}, the terminal device uses a PUCCH resource which corresponds to $n^{(1, p0)}_{PUCCH}=(M-m-1)N_c+mN_{c+1}+n_{CCE, m}+N^{(1)}_{PUCCH}$, for the antenna port $p_0$ in the PUCCH format 1a/1b. Here, $N^{(1)}_{PUCCH}$ is configured by the higher layer. A value which is selected from {0, 1, 2, 3} so as to satisfy $N_c \leq n_{CCE} \leq N_{c+1}$ and $N_c=\max\{0, \text{floor}((N^{DL}_{RB}(N^{RB}_{SC}c-4))/36)\}$ is used as c. $n_{CCE, m}$ indicates the number of the first CCE used in transmission of the corresponding PDCCH in the subframe $(n-k_m)$. In a case where two antenna port transmission is configured for the PUCCH format 1a/1b, the PUCCH resource for the antenna port $p_1$ is given by $n^{(1, p1)}_{PUCCH}=n^{(1, p0)}_{PUCCH}+1$.

For single PDSCH transmission only in the primary cell indicated by detecting the corresponding EPDCCH in the subframe $(n-k_m)$ (here, $k_m$ is one element or more of K), and PDSCH transmission in which the DAI value in the EPDCCH is 1 in the primary cell of the TDD UL/DL configuration which belongs to {1, 2, 3, 4, 5, 6}, or for an EPDCCH indicating downlink SPS release in the subframe $(n-k_m)$ and an EPDCCH in which the DAI value in the PDCCH is 1 in the primary cell of the TDD UL/DL configuration which belongs to {1, 2, 3, 4, 5, 6}, the terminal device uses a PUCCH resource $n^{(1, p)}_{PUCCH}$ which is obtained as follows, in the PUCCH format 1a/1b.

If distributed transmission is configured in the EPDCCH-PRB set q, $n^{(1, p)}_{PUCCH}$ is obtained by Expression 2.

If localized transmission is configured in the EPDCCH-PRB set q, $n^{(1,p)}_{PUCCH}$ is obtained by Expression 3.

Here, $n_{ECCE,q}$ indicates the number of the first CCE used for transmission of DCI assignment corresponding to the EPDCCH-PRB set q in the subframe $(n-k_m)$. That is, $n_{ECCE,q}$ indicates the lowest ECCE index used for constituting the EPDCCH. $N^{(e1)}_{PUCCH,q}$ in the EPDCCH-PRB set q is configured by pucch-ResourceStartOffset-r11 which is the higher layer parameter. $N^{ECCE,q}_{RB}$ for the EPDCCH-PRB set q in the subframe $(n-k_m)$ is the number of ECCEs per PRB pair which has the same meaning as the above-described $N^{RB}_{ECCE}$. As described above, n' is determined based on an antenna port used for EPDCCH transmission in the subframe $(n-k_m)$. If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe $(n-k_{i1})$ is configured in a terminal device, $N_{ECCE,q,n-ki1}$ is equal to the number of ECCEs in the EPDCCH-PRB set q configured in the terminal device in the subframe $(n-k_{i1})$. If monitoring an EPDCCH in a subframe $(n-k_{i1})$ is not configured in a terminal device, $N_{ECCE,q,n-ki1}$ is equal to the number of ECCEs, which is calculated on the assumption that the EPDCCH-PRB set q configured in the terminal device is configured in the subframe $(n-k_{i1})$. If the subframe $(n-k_{i1})$ is a special subframe of the special subframe configuration 0 or 5 in the normal CP, $N_{ECCE,q,n-ki1}$ is equal to 0. If the subframe $(n-k_{i1})$ is a special subframe of the special subframe configuration 0, 4, or 7 in the extended CP, $N_{ECCE,q,n-ki1}$ is equal to 0. In a case where two antenna port transmission is configured for the PUCCH format 1a/1b, the PUCCH resource for the antenna port $p_1$ is given by $n^{(1,p1)}_{PUCCH} = n^{(1,p0)}_{PUCCH} + 1$.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe $(n-k_{i1})$ is a special subframe in the downlink reference UL/DL configuration of the special subframe configuration 0 or 5, in the normal CP, $N_{ECCE,q,n-ki1}$ is equal to 0. If the subframe $(n-k_{i1})$ is a special subframe in the downlink reference UL/DL configuration of the special subframe configuration 0, 4, or 7, in the extended CP, $N_{ECCE,q,n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

For single PDSCH transmission only in the primary cell in which there is no corresponding PDCCH/EPDCCH which has been detected in a subframe $(n-k_m)$ (here, $k_m$ is one element or more of K), and for PDSCH transmission in a case where there is no PDCCH/EPDCCH indicating downlink SPS release in the subframe $(n-k_m)$, the terminal device uses the PUCCH resource $n^{(1,p)}_{PUCCH}$ in the PUCCH format 1a/1b. The PUCCH resource $n^{(1,p)}_{PUCCH}$ has a value of $n^{(1,p)}_{PUCCH}$ which is determined based on the relationship table between a configuration of the higher layer, the value of the TPC command field for a PUCCH, and the value of $n^{(1)}_{PUCCH}$ configured in the higher layer. For the terminal device in which two antenna port transmission is configured for the PUCCH format 1a/1b, the value of one PUCCH resource in the relationship table is mapped on two PUCCH resources which are the first PUCCH resource $n^{(1,p0)}_{PUCCH}$ for the antenna port $p_0$ and the second PUCCH resource $n^{(1,p1)}_{PUCCH}$ for antenna port $p_1$. In other cases, the value of the one PUCCH resource is mapped on one PUCCH resource $n^{(1,p0)}_{PUCCH}$ for the antenna port $p_0$.

For PDSCH transmission only in the primary cell in which M>1 is satisfied and detection of the corresponding PDCCH is performed in the subframe (n-k) (here, k is one element or more of K), additional PDSCH transmission only in the primary cell indicated by detecting the corresponding PDCCH in the subframe $(n-k_m)$ (here, $k_m$ is one element or more of K), and additional PDSCH transmission in which the DAI value in the PDCCH is 1, or for a PDCCH indicating downlink SPS release in the subframe $(n-k_m)$ (here, $k_m$ is one element or more of K), and a PDCCH in which the DAI value in the PDCCH is 1, the terminal device transmits b(0) and b(1) in the subframe n, by using the PUCCH format 1b in the PUCCH resource $n^{(1)}_{PUCCH}$. The PUCCH resource $n^{(1)}_{PUCCH}$ is selected from A pieces of resource blocks $n^{(1)}_{PUCCH,i}$ (0≤i≤A−1), based on the fourth correspondence relationship and the fifth correspondence relationship for A=2 and A=3. A=2 is satisfied for the terminal device in which a transmission mode of supporting transports of up to two is configured in the primary cell. A=3 is satisfied for other cases (terminal device in which a transmission mode of supporting one transport is configured in the primary cell). Here, the PUCCH resource $n^{(1)}_{PUCCH,0}$ is determined based on the relationship table between the configuration of the higher layer, the value of the TPC command field for the PUCCH, and the value of $n^{(1)}_{PUCCH}$ configured in the higher layer. $n^{(1)}_{PUCCH,1} = (M-m-1)N_c + mN_{c+1} + n_{CCE,m} + N^{(1)}_{PUCCH}$ is satisfied. Here, $N^{(1)}_{PUCCH}$ is configured by the higher layer. A value which is selected from {0, 1, 2, 3} so as to satisfy $N_c \le n_{CCE} \le N_{c+1}$ and $N_c = \max\{0, \text{floor}((N^{DL}_{RB}(N^{RB}_{SC}c-4))/36)\}$ is used as c. $n_{CCE,m}$ indicates the number of the first CCE used in transmission of the corresponding PDCCH in the subframe $(n-k_m)$. For the terminal device in which the transmission mode of supporting transports of up to two is configured in the primary cell, the PUCCH resource $n^{(1)}_{PUCCH,2}$ is determined by $n^{(1)}_{PUCCH,2} = n^{(1)}_{PUCCH} + 1$. HARQ-ACK(0) is an ACK/NACK/DTX response to PDSCH transmission which has no corresponding PDCCH. HARQ-ACK(1) is an ACK/NACK/DTX response to the first transport block of a PDSCH indicated by detecting the corresponding PDCCH, and a PDSCH in which the DAI value in the PDCCH is 1, or to a PDCCH indicating downlink SPS release, in which the DAI value in the PDCCH is 1. HARQ-ACK(2) is an ACK/NACK/DTX response to the second transport block of a PDSCH indicated by detecting the corresponding PDCCH, and a PDSCH in which the DAI value in the PDCCH is 1.

For PDSCH transmission only in the primary cell in which M>1 is satisfied and detection of the corresponding EPDCCH is performed in the subframe (n−k) (here, $k_m$ is one element or more of K), additional PDSCH transmission only in the primary cell indicated by detecting the corresponding EPDCCH in the subframe (n−$k_m$) (here, $k_m$ is one element or more of K), and additional PDSCH transmission in which the DAI value in the EPDCCH is 1, or for an EPDCCH indicating downlink SPS release in the subframe (n−$k_m$) (here, $k_m$ is one element or more of K), and an EPDCCH in which the DAI value in the EPDCCH is 1, the terminal device transmits b(0) and b(1) in the subframe n, by using the PUCCH format 1b in the PUCCH resource $n^{(1)}_{PUCCH}$. The PUCCH resource $n^{(1)}_{PUCCH}$ is selected from A pieces of resource blocks $n^{(1)}_{PUCCH,i}$ (0≤i≤A−1), based on the fourth correspondence relationship and the fifth correspondence relationship for A=2 and A=3. A=3 is satisfied for the terminal device in which a transmission mode of supporting transports of up to two is configured in the primary cell. A=2 is satisfied for other cases (terminal device in which a transmission mode of supporting one transport is configured in the primary cell). Here, the PUCCH resource $n^{(1)}_{PUCCH,0}$ is determined based on the relationship table between the configuration of the higher layer, the value of the TPC command field for the PUCCH, and the value of $n^{(1)}_{PUCCH}$ configured in the higher layer. $n^{(1)}_{PUCCH,1}$ is determined as follows.

If distributed transmission is configured in the EPDCCH-PRB set q, $n^{(1)}_{PUCCH,1}$ is obtained by Expression 2.

If localized transmission is configured in the EPDCCH-PRB set q, $n^{(1)}_{PUCCH,1}$ is obtained by Expression 3.

Here, $n_{ECCE,q}$ indicates the number of the first CCE used for transmission of DCI assignment corresponding to the EPDCCH-PRB set q in the subframe (n−$k_m$). That is, $n_{ECCE,q}$ indicates the lowest ECCE index used for constituting the EPDCCH. $N^{(e1)}_{PUCCH,q}$ in the EPDCCH-PRB set q is configured by pucch-ResourceStartOffset-r11 which is the higher layer parameter. $N^{ECCE,q}_{RB}$ for the EPDCCH-PRB set q in the subframe (n−$k_m$) is the number of ECCEs per PRB pair which has the same meaning as the above-described $N^{RB}_{ECCE}$. As described above, n' is determined based on an antenna port used for EPDCCH transmission in the subframe (n−$k_m$). If m=0 is satisfied, as shown in FIG. 32, $\Delta_{ARO}$ is determined based on the HARQ-ACK resource offset field in the corresponding EPDCCH DCI format. If m>0 is satisfied, as shown in FIG. 33, $\Delta_{ARO}$ is determined based on the HARQ-ACK resource offset field in the corresponding EPDCCH DCI format. If monitoring an EPDCCH in a subframe (n−$k_{i1}$) is configured in a terminal device, $N_{ECCE,q,n-ki1}$ is equal to the number of ECCEs in the EPDCCH-PRB set q configured in the terminal device in the subframe (n−$k_{i1}$). If monitoring an EPDCCH in a subframe (n−$k_{i1}$) is not configured in a terminal device, $N_{ECCE,q,n-ki1}$ is equal to the number of ECCEs, which is calculated on the assumption that the EPDCCH-PRB set q configured in the terminal device is configured in the subframe (n−$k_{i1}$). If the subframe (n−$k_{i1}$) is a special subframe of the special subframe configuration 0 or 5 in the normal CP, $N_{ECCE,q,n-ki1}$ is equal to 0. If the subframe (n−$k_{i1}$) is a special subframe of the special subframe configuration 0, 4, or 7 in the extended CP, $N_{ECCE,q,n-ki1}$ is equal to 0. For the terminal device in which a transmission mode of supporting transports of up to two is configured in the primary cell, the PUCCH resource $n^{(1)}_{PUCCH,2}$ is determined by $n^{(1)}_{PUCCH,2}=n^{(1)}_{PUCCH,1}+1$. HARQ-ACK(0) is an ACK/NACK/DTX response to PDSCH transmission which has no corresponding PDCCH. HARQ-ACK(1) is an ACK/NACK/DTX response to the first transport block of a PDSCH indicated by detecting the corresponding EPDCCH, and a PDSCH in which the DAI value in the EPDCCH is 1, or to an EPDCCH indicating downlink SPS release, in which the DAI value in the EPDCCH is 1. HARQ-ACK(2) is an ACK/NACK/DTX response to the second transport block of a PDSCH indicated by detecting the corresponding EPDCCH, and a PDSCH in which the DAI value in the EPDCCH is 1.

In a case where dynamic TDD is configured, it is preferable that a special subframe referred herein is a special subframe based on at least the downlink reference UL/DL configuration in the corresponding cell among the first to third UL/DL configurations. That is, the above procedures are performed in a state where a subframe which is a special subframe even in the uplink reference UL/DL configuration, but is a downlink subframe in the downlink reference UL/DL configuration is used herein as a subframe which is not a special subframe. That is, if the subframe (n−$k_{i1}$) is a special subframe in the downlink reference UL/DL configuration of the special subframe configuration 0 or 5, in the normal CP, $N_{ECCE,q,n-ki1}$ is equal to 0. If the subframe (n−$k_{i1}$) is a special subframe in the downlink reference UL/DL configuration of the special subframe configuration 0, 4, or 7, in the extended CP, $N_{ECCE,q,n-ki1}$ is equal to 0. The PUCCH resource for the antenna port $p_1$ is given as follows. It is possible to reserve PUCCH resources for a special subframe in which a PDSCH may be transmitted, by using the DL reference UL/DL configuration, not the UL reference UL/DL configuration as a base. The DL reference UL/DL configuration configured by using an RRC message, not a signal of explicit Layer 1 which has a probability that detection of the terminal device is impossible is used as a base, and thus which PUCCH resource is reserved (or is not reserved) can be set so as not to depend on whether or not detection is performed. In a case where dynamic TDD is not configured, the above procedures are performed in a state where a special subframe in the uplink reference UL/DL configuration is set to be a special subframe referred herein. The above uplink reference UL/DL configuration is an UL/DL configuration which is reported by the base station device and by using a system information block type 1 message, and is an UL/DL configuration used in a terminal device in which dynamic TDD is not configured (or capability of dynamic TDD is not provided).

In this manner, in a case where PDSCH transmission (or PDCCH/EPDCCH indicating downlink SPS release) is performed only in the primary cell even when transmission in the PUCCH format 3 is configured, similar to the case where only one serving cell is configured, the PUCCH format 1a/1b or the PUCCH format 1b with channel selection is used. This is referred to as feedback from the PUCCH format 3 to the PUCCH format 1a/1b or the PUCCH format 1b with channel selection. With the feedback, even when the quality of the secondary cell is poor, a method similar to a transmission and reception method of a single cell is set as the transmission and reception method of the primary cell. Thus, it is possible to ensure reliable communication.

For PDSCH transmission only in the primary cell in which M>1 is satisfied and detection of the corresponding PDCCH is performed in the subframe (n−$k_m$) (here, $k_m$ is one element or more of K), and PDSCH transmission in which the DAI value in the PDCCH is more than 1, or for a PDCCH indicating downlink SPS release in the subframe (n−$k_m$), and a PDCCH in which the DAI value in the PDCCH is more than 1, the terminal device uses the PUCCH resource $n^{(3)}_{PUCCH}$ in the PUCCH format 3. Here, $n^{(3)}_{PUCCH}$ is determined based on the relationship table between the configuration of the higher layer, the value of the TPC command field for the PUCCH, and the value of $n^{(3)}_{PUCCH}$ configured in the higher layer. The TPC field in PDCCH assignment, in which the DAI value is more than 1 is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. The terminal device performs processing such that a value of a PUCCH resource of the same HARQ-ACK is transmitted in EPDCCH assignment which is used for determining the PUCCH resource value, in the subframe (n–k) (here, k is one element or more of K).

In this manner, the PUCCH format 3 is a PUCCH resource different from the PUCCH format 1a/1b, and resources for the PUCCH format 3 are configured in a region different from the dynamic PUCCH format 1a/1b. Thus, it is possible to reduce complexity of scheduling of dynamic PUCCH resources.

If UL/DL configurations of all serving cells are the same as each other, for PDSCH transmission in the secondary cell, which is indicated by detecting the corresponding PDCCH/EPDCCH in the subframe (n–k) (here, k is one element or more of K), the terminal device uses the PUCCH resource $n^{(3)}_{PUCCH}$ in the PUCCH format 3. Here, the value of $n^{(3)}_{PUCCH}$ is determined based on the relationship table between the configuration of the higher layer, the value of the TPC command field for the PUCCH, and the value of $n^{(3)}_{PUCCH}$ configured in the higher layer. The TPC field in the corresponding PDCCH/EPDCCH is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. If a PDCCH corresponding to a PDSCH on the primary cell in the subframe (n–k) (here, k is one element or more of K), or a PDCCH indicating downlink SPS release in the subframe (n–k) (here, k is one element or more of K) is detected for the TDD UL/DL configurations 1 to 6, the TPC field in a PDCCH, in which the DAI value is more than 1 is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. The terminal device performs processing such that a value of a PUCCH resource of the same HARQ-ACK is transmitted in all PDCCH assignments in the primary cell and each secondary cell which are used for determining the PUCCH resource value, in the subframe (n–k) (here, k is one element or more of K). If an EPDCCH corresponding to a PDSCH on the primary cell in the subframe (n–k) (here, k is one element or more of K), or an EPDCCH indicating downlink SPS release in the subframe (n–k) (here, k is one element or more of K) is detected for the TDD UL/DL configurations 1 to 6, a HARQ-ACK resource offset (ARO) field in the EPDCCH in which the DAI value is more than 1 is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. The terminal device performs processing such that a value of a PUCCH resource of the same HARQ-ACK is transmitted in all PDCCH assignments in the primary cell and each secondary cell which are used for determining the PUCCH resource value, in the subframe (n–k) (here, k is one element or more of K). The terminal device performs processing such that a value of a PUCCH resource of the same HARQ-ACK is transmitted in all EPDCCH assignments in the primary cell and each secondary cell which are used for determining the PUCCH resource value, in the subframe (n–k) (here, k is one element or more of K).

If UL/DL configurations of at least two serving cells are different from each other, for PDSCH transmission in the secondary cell, which is indicated by detecting the corresponding PDCCH/EPDCCH in the subframe (n–k) (here, k is one element or more of K), the terminal device uses the PUCCH resource $n^{(3)}_{PUCCH}$ in the PUCCH format 3. Here, the value of $n^{(3)}_{PUCCH}$ is determined based on the relationship table between the configuration of the higher layer, the value of the TPC command field for the PUCCH, and the value of $n^{(3)}_{PUCCH}$ configured in the higher layer. The TPC field in the corresponding PDCCH/EPDCCH is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. If a PDCCH corresponding to a PDSCH on the primary cell in the subframe (n–k) (here, k is one element or more of K), or a PDCCH indicating downlink SPS release in the subframe (n–k) (here, k is one element or more of K) is detected for the primary cell of the TDD UL/DL configuration belonging to {1, 2, 3, 4, 5, 6}, a TPC field in the PDCCH in which the DAI value is more than 1 is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. The terminal device performs processing such that a value of a PUCCH resource of the same HARQ-ACK is transmitted in all PDCCH assignments in the primary cell and each secondary cell which are used for determining the PUCCH resource value, in the subframe (n–k) (here, k is one element or more of K). If an EPDCCH corresponding to a PDSCH on the primary cell in the subframe (n–k) (here, k is one element or more of K), or an EPDCCH indicating downlink SPS release in the subframe (n–k) (here, k is one element or more of K) is detected for the primary cell of the TDD UL/DL configuration belonging to {1, 2, 3, 4, 5, 6}, a HARQ-ACK resource offset field in the PDCCH in which the DAI value is more than 1 is used for determining a PUCCH resource value from one of four PUCCH resource values which are configured by the higher layer, and by using the PUCCH resource $n^{(1,\,p)}_{PUCCH}$ which has the value of $n^{(3,\,p)}_{PUCCH}$. The terminal device performs processing such that a value of a PUCCH resource of the same HARQ-ACK is transmitted in all EPDCCH assignments in the primary cell and each secondary cell which are used for determining the PUCCH resource value, in the subframe (n–k) (here, k is one element or more of K).

For a terminal device in which the PUCCH resource $n^{(3,\,p)}_{PUCCH}$ and the two antenna port transmission are configured in the PUCCH format 3, the value of one PUCCH resource in the relationship table is mapped on two PUCCH resources which are the first PUCCH resource $n^{(3,\,p0)}_{PUCCH}$ for the antenna port $p_0$ and the second PUCCH resource $n^{(3,\,p1)}_{PUCCH}$ for antenna port $p_1$. In other cases, the value of the one PUCCH resource is mapped on one PUCCH resource $n^{(3,\,p0)}_{PUCCH}$ for the antenna port $p_0$.

In the invention, the joint description of two terms by using "/" may be interpreted as "or". The dynamic TDD being configured includes a case where dynamic TDD itself is configured in a terminal device by a base station device, and by using a dedicated RRC message. In addition, a case where a parameter (for example, parameter indicating a downlink reference configuration, and the like) for performing dynamic TDD is configured in a terminal device by a base station device, and by using a dedicated RRC message may be also included.

A configuration of the device according to the embodiment will be described below.

Figure 34:
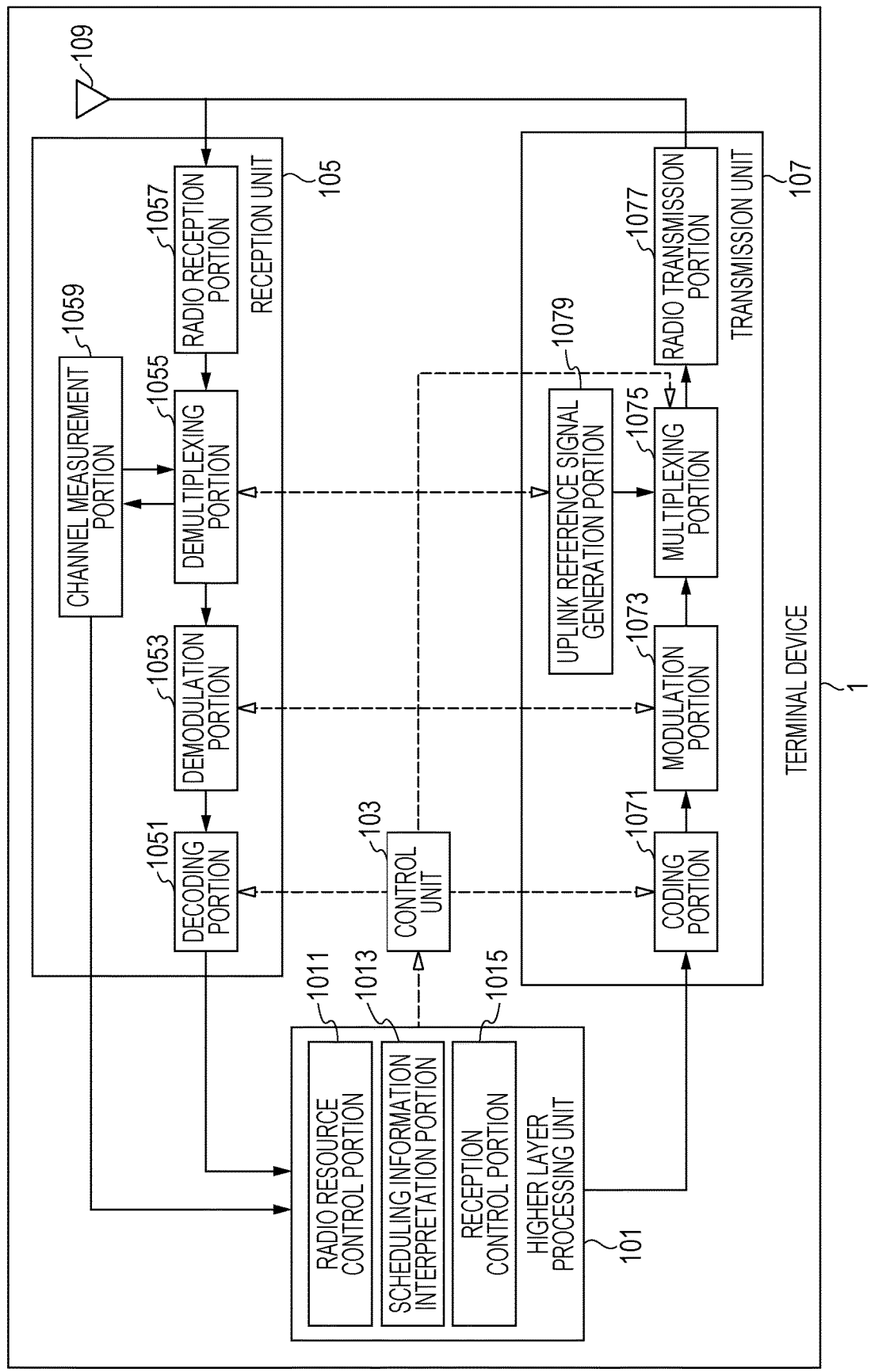
FIG. 34 is a schematic block diagram illustrating a configuration of a terminal device 1.

FIG. 34 is a schematic block diagram illustrating a configuration of the terminal device 1 in the embodiment. As illustrated in FIG. 34, the terminal device 1 includes a higher layer processing unit 101, a control unit 103, a reception unit 105, a transmission unit 107, and a transmit/receive antenna unit 109. The higher layer processing unit 101 includes a radio resource control portion 1011, a scheduling information interpretation portion 1013, and a reception control portion 1015. The reception unit 105 includes a decoding portion 1051, a demodulation portion 1053, a demultiplexing portion 1055, a radio reception portion 1057, and a channel measurement portion 1059. The transmission unit 107 includes a coding portion 1071, a modulation portion 1073, a multiplexing portion 1075, a radio transmission portion 1077, and an uplink reference signal generation portion 1079.

The higher layer processing unit 101 outputs uplink data (transport block) generated by an operation of a user, to the transmission unit 107. The higher layer processing unit 101 performs processing of a medium access control (MAC) layer, a packet data convergence protocol (PDCP) layer, a radio link control (RLC) layer, and a radio resource control (RRC) layer.

The radio resource control portion 1011 included in the higher layer processing unit 101 manages various types of setting information/parameters of the device. The radio resource control portion 1011 sets the various types of setting information/parameters, based on a signal of the higher layer which is received from the base station device 3. That is, the radio resource control portion 1011 sets the various types of setting information/parameters based on information which has been received from the base station device 3 and indicates the various types of setting information/parameters. The radio resource control portion 1011 generates information mapped on each channel of an uplink, and outputs the generated information to the transmission unit 107. The radio resource control portion 1011 is also referred to as a setting portion 1011.

That is, the radio resource control portion 1011 sets a first UL reference UL-DL configuration, a second UL reference UL-DL configuration, a first DL reference UL-DL configuration, a second DL reference UL-DL configuration, and a third UL-DL configuration.

The scheduling information interpretation portion 1013 in the higher layer processing unit 101 interprets the DCI format (scheduling information) received through the reception unit 105, generates control information for controlling the reception unit 105 and the transmission unit 107 based on the interpretation result of the DCI format, and outputs the generated control information to the control unit 103.

The reception control portion 1015 included in the higher layer processing unit 101 recognizes a subframe based on an RNTI used in scrambling a CRC parity bit which has been attached to the DCI format. The reception control portion 1015 controls the reception unit 105 to decode a PDSCH based on the recognized subframe. Here, the function of the reception control portion 1015 may be included in the reception unit 105.

The control unit 103 generates control signals to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes reception signals received from the base station device 3 through the transmit/receive antenna unit 109, in accordance with control signals input from the control unit 103. The reception unit 105 outputs the decoded information to the higher layer processing unit 101.

The radio reception portion 1057 converts the signals of a downlink received through the transmit/receive antenna unit 109 into a baseband signal (down covert) by quadrature demodulation. The radio reception portion 1057 removes unnecessary frequency components, controls an amplification level such that the signal levels are appropriately maintained, performs quadrature demodulation based on the in-phase components and quadrature components of the received signals, and converts the quadrature-demodulated analog signals to digital signals. The radio reception portion 1057 removes a portion corresponding to a cyclic prefix (CP) from the converted digital signals, performs fast Fourier transform (FFT) on the signals with the CP removed, and extracts the signals of the frequency domain.

The demultiplexing portion 1055 separates the extracted signals into the PHICH, the PDCCH, the EPDCCH, the PDSCH, and the downlink reference signal. The demultiplexing portion 1055 compensates for the propagation path of the PHICH, the PDCCH, the EPDCCH, and the PDSCH from an estimation value of the propagation path input from the channel measurement portion 1059. The demultiplexing portion 1055 outputs the separated downlink reference signal to the channel measurement portion 1059.

The demodulation portion 1053 synthesizes the signals by multiplying the PHICH by a corresponding code, performs demodulation according to a BPSK (Binary Phase Shift Keying) modulation system on the synthesized signals, and outputs the demodulation result to the decoding portion 1051. The decoding portion 1051 decodes the PHICH addressed to the mobile station device and outputs the decoded HARQ indicator to the higher layer processing unit 101. The demodulation portion 1053 performs demodulation according to a QPSK modulation system on the PDCCH and/or the EPDCCH and outputs the demodulation result to the decoding portion 1051. The decoding portion 1051 attempts to decode the PDCCH and/or the EPDCCH, and when decoding is successful, outputs the decoded downlink control information and the RNTI, to which the downlink control information corresponds, to the higher layer processing unit 101.

The demodulation portion 1053 performs demodulation according to a modulation system notified by the downlink grant, such as QPSK (Quadrature Phase Shift Keying), 16QAM (Quadrature Amplitude Modulation), or 64QAM, on the PDSCH and outputs the demodulation result to the decoding portion 1051. The decoding portion 1051 performs decoding based on information concerning a coding rate notified by the downlink control information and outputs the decoded downlink data (transport block) to the higher layer processing unit 101.

The channel measurement portion 1059 measures a path loss or a channel state of the downlink from the downlink reference signal input from the demultiplexing portion 1055 and outputs the measured path loss or the measured state of the channel to the higher layer processing unit 101. The channel measurement portion 1059 calculates an estimation value of the propagation path of the downlink from the downlink reference signal and outputs the estimation value to the demultiplexing portion 1055. The channel measurement portion 1059 performs channel measurement and/or interference measurement to calculate the CQI.

The transmission unit 107 generates the uplink reference signal according to the control signals from the control unit 103, encodes and modulates uplink data (transport block) input from the higher layer processing unit 101, multiplexes the PUCCH, PUSCH, and the generated uplink reference signal, and transmits the multiplexed signals to the base station device 3 through the transmit/receive antenna unit 109.

The coding portion 1071 performs encoding, such as convolutional coding or block encoding, on the uplink control information input from the higher layer processing unit 101. The coding portion 1071 performs turbo encoding based on information which is used for the scheduling of the PUSCH.

The modulation portion 1073 modulates coding bits input from the coding portion 1071 by a modulation system notified by the downlink control information, such as BPSK, QPSK, 16QAM, or 64QAM, or a modulation system determined in advance for each channel. The modulation portion 1073 determines the number of sequences of data to be spatially multiplexed based on information which is used for the scheduling of the PUSCH, and maps a plurality of pieces of uplink data transmitted by the same PUSCH to a plurality of sequences and performs precoding on the sequences using multiple input multiple output (MIMO) spatial multiplexing (SM).

The uplink reference signal generation portion 1079 generates a sequence obtained by a rule (expression) determined in advance based on a physical layer cell identifier (physical layer cell identity: PCI, referred to as a cell ID or the like) for identifying the base station device 3, a bandwidth where the uplink reference signal is allocated, a cyclic shift notified by the uplink grant, the values of parameters for generation of a DMRS sequence, and the like. The multiplexing portion 1075 rearranges the modulation symbols of the PUSCH in parallel according to the control signals input from the control unit 103 and then performs discrete Fourier transform (DFT). The multiplexing portion 1075 multiplexes the signals of the PUCCH and the PUSCH and the generated uplink reference signal for each transmit antenna port. That is, the multiplexing portion 1075 maps the signals of the PUCCH and the PUSCH and the generated uplink reference signal in the resource elements for each transmit antenna port.

The radio transmission portion 1077 performs inverse fast Fourier transform (IFFT) on the multiplexed signals so as to generate a SC-FDMA symbol. The radio transmission portion 1077 appends a CP to the SC-FDMA symbol, generates a baseband digital signal, converts the baseband digital signal to an analog signal, and removes excessive frequency components by using a low pass filter. The radio transmission portion 1077 performs conversion into a carrier frequency (up-conversion), performs power amplification, and outputs and transmits the power-amplified signals to the transmit/receive antenna unit 109.

Figure 35:
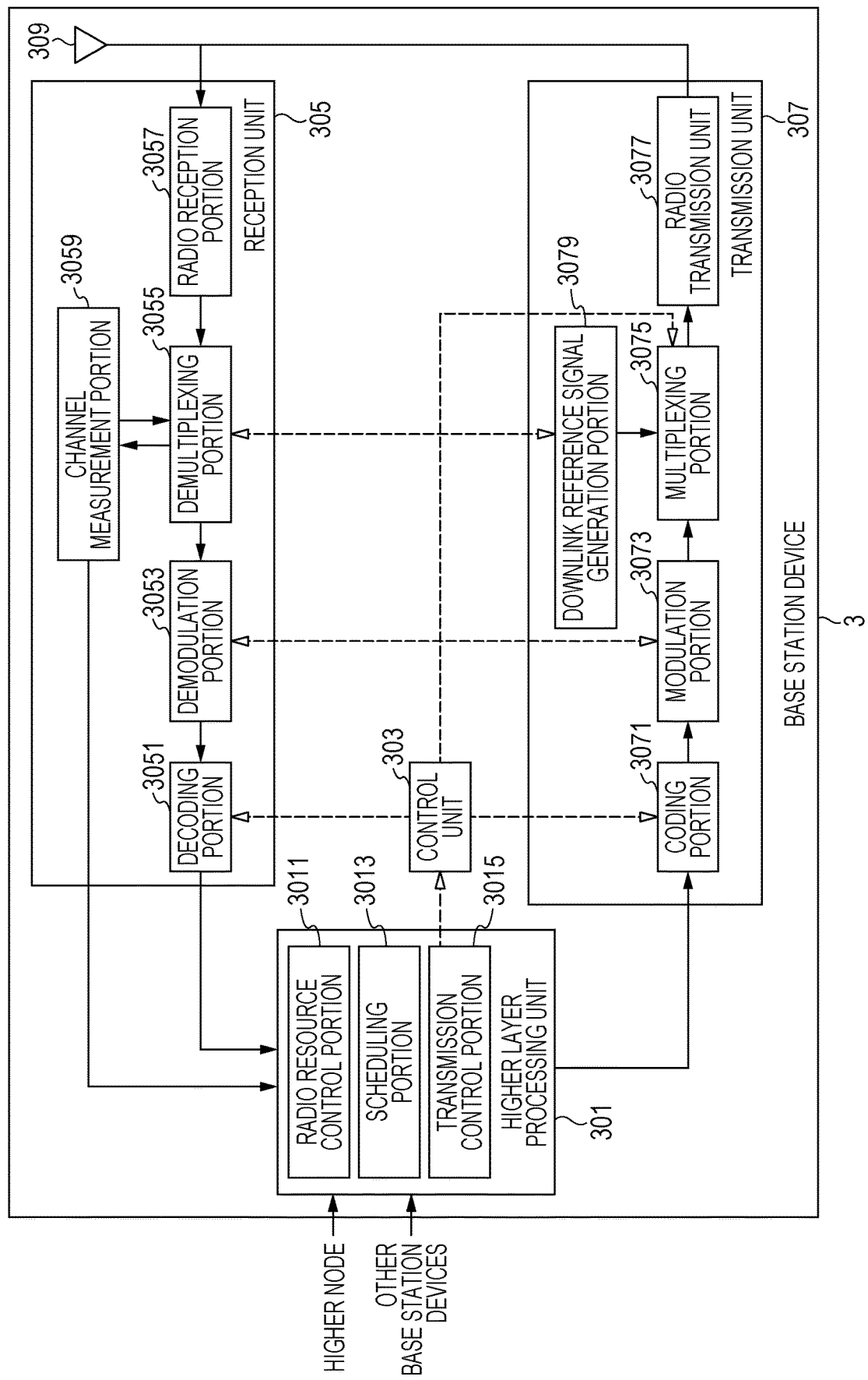
FIG. 35 is a schematic block diagram illustrating a configuration of a base station device 3.

FIG. 35 is a schematic block diagram illustrating a configuration of the base station device 3 in the embodiment. As illustrated in FIG. 35, the base station device 3 includes a higher layer processing unit 301, a control unit 303, a reception unit 305, a transmission unit 307, and a transmit/receive antenna unit 309. The higher layer processing unit 301 includes a radio resource control portion 3011, a scheduling portion 3013, and a transmission control portion 3015.

The reception unit 305 includes a decoding portion 3051, a demodulation portion 3053, a demultiplexing portion 3055, a radio reception portion 3057, and a channel measurement portion 3059. The transmission unit 307 includes a coding portion 3071, a modulation portion 3073, a multiplexing portion 3075, a radio transmission portion 3077, and a downlink reference signal generation portion 3079.

The higher layer processing unit 301 performs processing of the medium access control (MAC) layer, the packet data convergence protocol (PDCP) layer, the radio link control (RLC) layer, and the radio resource control (RRC) layer. The higher layer processing unit 301 generates control information to control the reception unit 305 and the transmission unit 307 and outputs the generated control information to the control unit 303.

The radio resource control portion 3011 in the higher layer processing unit 301 generates downlink data (transport block) arranged in the PDSCH of the downlink, system information, an RRC message, a MAC CE (Control Element), and the like, or acquires downlink data, the system information, the RRC message, and the MAC CE from a higher node, and outputs downlink data, the system information, the RRC message, and the MAC CE to the transmission unit 307. The radio resource control portion 3011 manages various types of setting information/parameters of each terminal device 1. The radio resource control portion 3011 may set the various types of setting information/parameters for each terminal device 1, by using a signal of the higher layer. That is, the radio resource control portion 1011 transmits/reports information indicating the various types of setting information/parameters. The radio resource control portion 3011 is also referred to as a setting portion 3011.

That is, the radio resource control portion 3011 sets the first UL reference UL-DL configuration, the second UL reference UL-DL configuration, the first DL reference UL-DL configuration, the second DL reference UL-DL configuration, and the third UL-DL configuration for each terminal device 1.

The scheduling portion 3013 in the higher layer processing unit 301 determines the frequency and the subframe to which the physical channels (PDSCH and PUSCH) are allocated, the coding rate and the modulation scheme of the physical channels (PDSCH and PUSCH), transmission power, and the like, based on the received channel state information, the estimation value of the channel or the channel quality input from the channel measurement portion 3059, and the like. The scheduling portion 3013 generates control information (for example, DCI format) for controlling the reception unit 305 and the transmission unit 307, based on the scheduling result. The scheduling portion 3013 outputs the generated control information to the control unit 303. The scheduling portion 3013 determines a timing at which transmission processing and reception processing is performed.

The transmission control portion 3015 included in the higher layer processing unit 301 controls the transmission unit 307 to map a PDSCH on a resource element based on an RNTI used in scrambling a CRC parity bit which has been attached to the DCI format, and to perform transmission on the PDSCH. Here, the function of the transmission control portion 3015 may be included in the transmission unit 307.

The control unit 303 generates control signals to control the reception unit 305 and the transmission unit 307 based on the control information from the higher layer processing unit 301. The control unit 303 outputs the generated control signals to the reception unit 305 and the transmission unit 307 to control the reception unit 305 and the transmission unit 307.

The reception unit 305 separates, demodulates, and decodes a reception signal received from the terminal device 1 through the transmit/receive antenna unit 309, in accordance with control signals input from the control unit 303. The reception unit 305 outputs the decoded information to the higher layer processing unit 301. The radio reception portion 3057 converts the signal of an uplink received through the transmit/receive antenna unit 309 into a baseband signal (down covert) by quadrature demodulation. The radio reception portion 3057 removes unnecessary frequency components, controls an amplification level such that the signal levels are appropriately maintained, performs quadrature demodulation based on the in-phase components and quadrature components of the received signal, and converts the quadrature-demodulated analog signal to a digital signal.

The radio reception portion 3057 removes a portion corresponding to a cyclic prefix (CP) from the converted digital signal. The radio reception portion 3057 performs fast Fourier transform (FFT) on the signal with the CP removed, and extracts the signal of the frequency domain. The radio reception portion 3057 outputs the extracted signal to the demultiplexing portion 3055.

The demultiplexing portion 1055 separates the signals input from the radio reception portion 3057 into the PUCCH, the PUSCH, the uplink reference signal, and the like. The separation is performed based on allocation information of radio resources included in the uplink grant determined by the radio resource control portion 3011 of the base station device 3 and notified to each terminal device 1. The demultiplexing portion 3055 compensates for the propagation path of the PUCCH and the PUSCH from the estimation value of the propagation input from the channel measurement portion 3059. The demultiplexing portion 3055 outputs the separated uplink reference signal to the channel measurement portion 3059.

The demodulation portion 3053 performs inverse discrete Fourier transform (IDFT) on the PUSCH, acquires the modulation symbols, and demodulates the reception signals using a modulation system determined in advance, such as BPSK (Binary Phase Shift Keying), QPSK, 16QAM, or 64QAM, or a modulation system notified in advance from the base station device to each terminal device 1 by the uplink grant on each of the modulation symbols of the PUCCH and the PUSCH. The demodulation portion 3053 separates the modulation symbols of a plurality of pieces of uplink data transmitted in the same PUSCH using MIMO SM based on the number of sequences to be spatially multiplexed notified in advance to each terminal device 1 by the uplink grant and information indicating precoding on the sequences.

The decoding portion 3051 decodes the coding bits of the demodulated PUCCH and PUSCH at a coding rate determined in advance of an encoding system determined in advance or a coding rate notified in advance from the base station device to each terminal device 1 by the uplink grant and outputs the decoded uplink data and the uplink control information to the higher layer processing unit 101. When retransmitting the PUSCH, the decoding portion 3051 decodes coding bits held in a HARQ buffer input from the higher layer processing unit 301 and the demodulated coding bits. The channel measurement portion 309 measures the estimation value of the propagation path, the channel quality, and the like from the uplink reference signal input from the demultiplexing portion 3055 and outputs the measurement result to the demultiplexing portion 3055 and the higher layer processing unit 301.

The transmission unit 307 generates the downlink reference signal according to the control signals input from the control unit 303, encodes and modulates the HARQ indicator and the downlink control information, and downlink data input from the higher layer processing unit 301, multiplexes the PHICH, the PDCCH, the EPDCCH, the PDSCH, and the downlink reference signal, and outputs the signals to the terminal device 1 through the transmit/receive antenna unit 309.

The coding portion 3071 encodes the HARQ indicator, the downlink control information, and downlink data input from the higher layer processing unit 301 using an encoding system determined in advance, such as block encoding, convolutional coding, or turbo encoding, or an encoding system determined by the radio resource control portion 3011. The modulation portion 3073 modulates the coding bits input from the coding portion 3071 by a modulation system determined in advance, such as BPSK, QPSK, 16QAM, or 64QAM, or a modulation system determined by the radio resource control portion 3011.

The downlink reference signal generation portion 3079 generates a sequence obtained by a rule determined in advance based on the physical layer cell identifier (PCI) or the like for identifying the base station device 3 and known to the terminal device 1 as the downlink reference signal. The multiplexing portion 3075 multiplexes the modulation symbols of each modulated channel and the generated downlink reference signal. That is, the multiplexing portion 3075 maps the modulation symbols of each modulated channel and the generated downlink reference signal in the resource elements.

The radio transmission portion 3077 performs inverse fast Fourier transform (IFFT) on the multiplexed modulation symbol so as to generate an OFDM symbol. The radio transmission portion 3077 appends a CP to the OFDM symbol, generates a baseband digital signal, converts the baseband digital signal to an analog signal, and removes excessive frequency components by using a low pass filter. The radio transmission portion 3077 performs conversion into a carrier frequency (up-conversion), performs power amplification, and outputs and transmits the power-amplified signal to the transmit/receive antenna unit 309.

More specifically, the terminal device 1 in the embodiment includes a control unit (radio resource control portion 1011) which sets the first UL-DL configuration (UL reference UL-DL configuration), sets the second UL-DL configuration (DL reference UL-DL configuration), and sets the third UL-DL configuration.

The terminal device 1 in the embodiment includes a control unit (control unit 103) which determines a subframe of which an instruction as a special subframe is performed based on the first UL-DL configuration (UL reference UL-DL configuration) is excluded from the determination of the HARQ-ACK codebook size, based on at least whether an instruction of the subframe as a special subframe is performed based on the second UL-DL configuration (DL reference UL-DL configuration), and whether an instruction of the subframe as a downlink subframe is performed based on the second UL-DL configuration (DL reference UL-DL configuration).

In a case where an instruction of the subframe as a special subframe is performed based on the second UL-DL configuration (DL reference UL-DL configuration), the control unit (control unit 103) determines whether or not the subframe is excluded from the determination of the HARQ-ACK codebook size, based on the length of the CP, and the configuration of the special subframe.

In a case where an instruction of the subframe as a downlink subframe is performed based on the second UL-DL configuration (DL reference UL-DL configuration), the control unit (control unit 103) does not exclude the subframe from the determination of the HARQ-ACK codebook size, regardless of the length of the CP, and the configuration of the special subframe. That is, the control unit (control unit 103) uses the subframe in determining the HARQ-ACK codebook size.

The terminal device 1 in the embodiment includes a reception unit (reception unit 105) which expects transmission on a PDSCH in a subframe of which an instruction as a downlink subframe and a special subframe is performed based on the third UL-DL configuration. In a case where an instruction of the subframe as a special subframe is performed based on the first UL-DL configuration (UL reference UL-DL configuration), and an instruction of the subframe as a special subframe is performed based on the second UL-DL configuration (DL reference UL-DL configuration), the terminal device 1 determines whether or not transmission on a PDSCH in the subframe is expected, based on the length of the CP, and the configuration of the special subframe. In a case where an instruction of the subframe as a special subframe is performed based on the first UL-DL configuration (UL reference UL-DL configuration), and an instruction of the subframe as a downlink subframe is performed based on the second UL-DL configuration (DL reference UL-DL configuration), the terminal device 1 expects the transmission on a PDSCH in the subframe regardless of the length of the CP, and the configuration of the special subframe.

The terminal device 1 in the embodiment includes a control unit (radio resource control portion 1011) and a reception unit (reception unit 105). The control unit (radio resource control portion 1011) configures a subframe in which an EPDCCH is monitored. The reception unit (reception unit 105) monitors an EPDCCH in a subframe of which an instruction as a downlink subframe and a special subframe is performed based on the third UL-DL configuration among the configured subframes. In a case where an instruction of the configured and instructed subframe as a special subframe is performed based on the first UL-DL configuration (UL reference UL-DL configuration), and an instruction thereof as a special subframe is performed based on the second UL-DL configuration (DL reference UL-DL configuration), the terminal device 1 determines whether or not an EPDCCH is monitored in the configured and instructed subframe, based on the length of the CP and the configuration of the special subframe. In a case where an instruction of the configured and instructed subframe as a special subframe is performed based on the first UL-DL configuration (UL reference UL-DL configuration), and an instruction thereof as a downlink subframe is performed based on the second UL-DL configuration (DL reference UL-DL configuration), the terminal device 1 monitors an EPDCCH regardless of the length of the CP and the configuration of the special subframe.

The base station device 3 in the embodiment includes a control unit (radio resource control portion 3011) which sets the first UL-DL configuration (UL reference UL-DL configuration), sets the second UL-DL configuration (DL reference UL-DL configuration), and sets the third UL-DL configuration.

The base station device 3 in the embodiment includes a control unit (control unit 303) which determines a subframe of which an instruction as a special subframe is performed based on the first UL-DL configuration (UL reference UL-DL configuration) is excluded from the determination of the HARQ-ACK codebook size, based on at least whether an instruction of the subframe as a special subframe is performed based on the second UL-DL configuration (DL reference UL-DL configuration), and whether an instruction of the subframe as a downlink subframe is performed based on the second UL-DL configuration (DL reference UL-DL configuration).

In a case where an instruction of the subframe as a special subframe is performed based on the second UL-DL configuration (DL reference UL-DL configuration), the control unit (control unit 303) determines whether or not the subframe is excluded from the determination of the HARQ-ACK codebook size, based on the length of the CP, and the configuration of the special subframe.

In a case where an instruction of the subframe as a downlink subframe is performed based on the second UL-DL configuration (DL reference UL-DL configuration), the control unit (control unit 303) does not exclude the subframe from the determination of the HARQ-ACK codebook size, regardless of the length of the CP, and the configuration of the special subframe. That is, the control unit (control unit 303) uses the subframe in determining the HARQ-ACK codebook size.

In addition, in the terminal device 1, the higher layer processing unit 101 may set the first UL-DL configuration (UL reference UL-DL configuration) or the second UL-DL configuration (DL reference UL-DL configuration).

In a case where dynamic TDD is not configured, the control unit 103 determines whether or not the number of enhanced control channel elements in one enhanced physical downlink control channel set in a subframe is set to 0 when an index of an uplink control channel resource is determined, based on whether or not the subframe is a predetermined special subframe in the first UL-DL configuration. The control unit 103 sets an antenna port for an enhanced physical downlink control channel, based on whether or not a subframe is a predetermined special subframe in the first UL-DL configuration, regarding transmission of a localized enhanced physical downlink control channel. The control unit 103 sets the number of an enhanced resource element group per enhanced control channel element, based on whether or not a subframe is a predetermined special subframe in the first UL-DL configuration. The transmission unit 107 transmits a signal including an uplink control channel. Here, the multiplexing portion 1075 maps the uplink control channel on an uplink control channel resource, based on an instruction of the control unit 103. The reception unit 105 receives a signal including an enhanced physical control channel. The demultiplexing portion 1055 separates the enhanced physical control channel, based on an instruction of the control unit 103.

The base station device 3 in the embodiment includes a transmission unit (transmission unit 307) which performs transmission on a PDSCH in a subframe of which an instruction as a downlink subframe and a special subframe is performed based on the third UL-DL configuration. In a case where an instruction of the subframe as a special subframe is performed based on the first UL-DL configuration (UL reference UL-DL configuration), and an instruction of the subframe as a special subframe is performed based on the second UL-DL configuration (DL reference UL-DL configuration), the transmission unit (transmission unit 307) determines whether or not transmission on a PDSCH in the subframe is performed, based on the length of the CP and the configuration of the special subframe. In a case where an instruction of the subframe as a special subframe is performed based on the first UL-DL configuration (UL reference UL-DL configuration), and an instruction of the subframe as a downlink subframe is performed based on the second UL-DL configuration (DL reference UL-DL configuration), the transmission unit (transmission unit 307) performs transmission on a PDSCH in the subframe regardless of the length of the CP and the configuration of the special subframe.

The base station device 3 in the embodiment includes a control unit (radio resource control portion 3011) and a transmission unit (transmission unit 307). The control unit (radio resource control portion 3011) configures a subframe in which the terminal device 1 monitors an EPDCCH. The transmission unit (transmission unit 307) performs transmission on an EPDCCH in a subframe of which an instruction as a downlink subframe and a special subframe is performed based on the third UL-DL configuration, among the configured subframes. In a case where an instruction of the configured and instructed subframe as a special subframe is performed based on the first UL-DL configuration (UL reference UL-DL configuration), and an instruction thereof as a special subframe is performed based on the second UL-DL configuration (DL reference UL-DL configuration), the transmission unit (transmission unit 307) determines whether or not an EPDCCH is monitored in the configured and instructed subframe, based on the length of the CP and the configuration of the special subframe. In a case where an instruction of the configured and instructed subframe as a special subframe is performed based on the first UL-DL configuration (UL reference UL-DL configuration), and an instruction thereof as a downlink subframe is performed based on the second UL-DL configuration (DL reference UL-DL configuration), the transmission unit (transmission unit 307) performs transmission on an EPDCCH in the configured and instructed subframe, regardless of the length of the CP and the configuration of the special subframe.

In the base station device 3, the higher layer processing unit 301 may configure the first UL-DL configuration (UL reference UL-DL configuration) or the second UL-DL configuration (DL reference UL-DL configuration) in the terminal device 1 by using a common RRC message or a dedicated RRC message.

In a case where dynamic TDD is not configured, the control unit 303 determines whether or not the number of enhanced control channel elements in one enhanced physical downlink control channel set is set to 0 in a subframe, when an index of an uplink control channel resource is determined based on whether or not the subframe is a predetermined special subframe in the first UL-DL configuration. The control unit 303 sets an antenna port for an enhanced physical downlink control channel based on whether or not the subframe is a predetermined special subframe in the first UL-DL configuration, regarding localized transmission of the enhanced physical downlink control channel. The control unit 303 sets the number of enhanced resource element groups per an enhanced control channel element, based on whether or not the subframe is a predetermined special subframe in the first UL-DL configuration. The reception unit 305 receives a signal including an uplink control channel. Here, the demultiplexing portion 3055 acquires an uplink control channel from an uplink control channel resource, based on an instruction of the control unit 303. The transmission unit 107 transmits a signal including an enhanced physical control channel. The multiplexing portion 1075 maps the enhanced physical control channel, based on an instruction of the control unit 303.

As described above, communication using a PDSCH, an EPDCCH, or a PUCCH is performed based on the UL-reference UL-DL configuration, the DL reference UL-DL configuration, the third configuration, the length of the CP, and/or the configuration of a subframe. Thus, it is possible to efficiently use radio resources.

For example, communication using a PDSCH, an EPDCCH, or a PUCCH is performed based on only a parameter configured by using a signal of the higher layer, and thus it is possible to perform more robust communication. As a result, it is possible to efficiently use radio resources.

For example, communication using a PDSCH, an EPDCCH, or a PUCCH is performed based on a parameter configured by using a signal of the higher layer, and a parameter configured by using a signal of the physical layer, and thus it is possible to perform more dynamic communication. As a result, it is possible to efficiently use radio resources.

As described above, transmission on an EPDCCH (monitoring of an EPDCCH) is controlled based on the UL-reference UL-DL configuration, the DL reference UL-DL configuration, the third configuration, the length of the CP, and/or the configuration of a subframe. Thus, it is possible to simplify an operation in the terminal device 1.

A program operating in the base station device 3 and the terminal device 1 of the invention is a program (a program for causing a computer to function) to control a CPU (Central Processing Unit) and the like so as to implement the functions of the foregoing embodiment of the invention. Information which is handled by the devices is temporarily accumulated in a RAM (Random Access Memory) while processed, and is then stored in various ROMs, such as a Flash ROM (Read Only Memory), or an HDD (Hard Disk Drive). Information is read by the CPU as necessary, and is modified and written.

Part of the terminal device 1 and the base station device 3 in the foregoing embodiment may be implemented by a computer. In this case, a program for implementing the control function may be recorded in a computer-readable recording medium, and the program recorded in the recording medium may be read on a computer system and executed.

The term "computer system" used herein is a computer system which is incorporated in the terminal device 1 or the base station device 3, and includes an OS or hardware, such as peripherals. The term "computer-readable recording medium" refers to a portable medium, such as a flexible disk, a magneto-optical disk, a ROM, or a CD-ROM, or a storage device, such as a hard disk incorporated in the computer system.

The term "computer-readable recording medium" may include a medium which holds the program in a short period of time or dynamically, such as a communication line when transmitting the program through a network, such as Internet, or a communication line, such as a telephone line, and a medium which holds the program in a certain period of time, such as a volatile memory inside the computer system to be a server or a client. The program may implement some of the above-described functions or may implement the above-described functions in combination with the program already recorded in the computer system.

The base station device 3 in the foregoing embodiment may be implemented as an aggregate (device group) of a plurality of devices. Each device in the device group may include part or all of the functions or the function blocks of the base station device 3 of the foregoing embodiment. As the device group, the general functions or functional blocks of the base station device 3 may be provided. The terminal device 1 of the foregoing embodiment may communicate with the base station device as an aggregate.

The base station device 3 in the foregoing embodiment may be EUTRAN (Evolved Universal Terrestrial Radio Access Network). The base station device 3 in the foregoing embodiment may have part or all of the functions of a higher node to eNodeB.

Part or all of the terminal device 1 and the base station device 3 of the foregoing embodiment may be typically implemented as an LSI, which is an integrated circuit, or may be implemented as a chipset. The functional blocks of the terminal device 1 and the base station device 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the foregoing embodiment, a terminal device has been described as a communication device, the invention is not limited thereto and may be applied to stationary or immovable electronic devices indoors and outdoors, for example, terminal devices, such as an AV system, kitchen equipment, cleaning and washing equipment, air conditioner, office equipment, vending machine, and other living appliances, or communication devices.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

INDUSTRIAL APPLICABILITY

The present invention can be applied to a portable phone, a personal computer, a tablet type computer, and the like.

REFERENCE SIGNS LIST

1(1A, 1B, 1C) TERMINAL DEVICE
3 BASE STATION DEVICE
101, 301 HIGHER LAYER PROCESSING UNIT
103, 303 CONTROL UNIT
105, 305 RECEPTION UNIT
107, 307 TRANSMISSION UNIT
109, 309 ANTENNA
1011, 3011 RADIO RESOURCE CONTROL PORTION
1013 SCHEDULING INFORMATION INTERPRETATION PORTION
1015 RECEPTION CONTROL PORTION
1051, 3051 DECODING PORTION
1053, 3053 DEMODULATION PORTION
1055, 3055 DEMULTIPLEXING PORTION
1057, 3057 RADIO RECEPTION PORTION
1059, 3059 CHANNEL MEASUREMENT PORTION
1071, 3071 CODING PORTION
1073, 3073 MODULATION PORTION
1075, 3075 MULTIPLEXING PORTION
1077, 3077 RADIO TRANSMISSION PORTION
1079 UPLINK REFERENCE SIGNAL GENERATION PORTION
3013 SCHEDULING PORTION
3015 TRANSMISSION CONTROL PORTION
3079 DOWNLINK REFERENCE SIGNAL GENERATION PORTION

The invention claimed is:

1. A terminal device comprising:
higher layer processing circuitry that sets a first Uplink-Downlink (UL-DL) configuration configured by using a common radio resource control (RRC) message; and
control circuitry that sets an antenna port for an enhanced physical downlink control channel for localized transmission of the enhanced physical downlink control channel, wherein in a case that a second UL-DL configuration indicated by downlink control information which is transmitted on a physical downlink control channel is not set, a subframe is a special subframe in the first UL-DL configuration,
in a case that the special subframe has a special subframe configuration 3, 4, or 8, candidates of the antenna port are antenna ports 107, 108, 109 and 110,
in a case that the special subframe has a special subframe configuration 1, 2, 6, 7, or 9, candidates of the antenna port are antenna ports 107 and 109,
in a case that the second UL-DL configuration is set, the subframe is a normal subframe in the second UL-DL configuration and candidates of the antenna port are antenna ports 107, 108, 109, and 110, and
the special subframe is a subframe including three regions which are a Downlink Pilot Time Slot (DwPTS) region in which downlink transmission is performed, a guard period (GP), and an Uplink Pilot Time Slot (UpPTS) region in which uplink transmission is performed, in this order.

2. The terminal device according to claim 1, wherein the DwPTS region in the special subframe is constituted by Orthogonal frequency-division multiplexing (OFDM) symbols of which the number is equal to or more than a predetermined number.

3. The terminal device according to claim 1, wherein the special subframe has a special subframe configuration 3, 4, or 8 in a normal cyclic prefix.

4. The terminal device according to claim 1, wherein the terminal device monitors the physical downlink control channel, on which the downlink control information is transmitted, only in a common search space and not in a UE-specific search space.

5. A base station device comprising:
higher layer processing circuitry that configures a first Uplink-Downlink (UL-DL) configuration by using a common radio resource control (RRC) message; and
control circuitry that sets an antenna port for an enhanced physical downlink control channel for localized transmission of the enhanced physical downlink control channel, wherein
in a case that a second UL-DL configuration indicated by downlink control information which is transmitted on a physical downlink control channel is not set, a subframe is a special subframe in the first UL-DL configuration, in a case that the special subframe has a special subframe configuration 3, 4, or 8, candidates of the antenna port are antenna ports 107, 108, 109 and 110, in a case that the special subframe has a special subframe configuration 1, 2, 6, 7, or 9, candidates of the antenna port are antenna ports 107 and 109, in a case that the second UL-DL configuration is configured, the subframe is a normal subframe in the second UL-DL configuration and candidates of the antenna port are antenna ports 107, 108, 109, and 110, and the special subframe is a subframe including three regions which are a Downlink Pilot Time Slot (DwPTS) region in which downlink transmission is performed, a guard period (GP), and an Uplink Pilot Time Slot (UpPTS) region in which uplink transmission is performed, in this order.

6. The base station device according to claim 5, wherein the DwPTS region in the special subframe is constituted by Orthogonal frequency-division multiplexing (OFDM) symbols of which the number is equal to or more than a predetermined number.

7. The base station device according to claim 5, wherein the special subframe has a special subframe configuration 3, 4, or 8 in a normal cyclic prefix.

8. The base station device according to claim 5, wherein the base station device transmits the physical downlink control channel, on which the downlink control information is transmitted, only in a common search space and not in a UE-specific search space.

9. A communication method of a terminal device, the method comprising:

setting a first uplink-downlink (UL-DL) configuration which is configured by using a common radio resource control (RRC) message; and setting an antenna port for an enhanced physical downlink control channel for localized transmission of the enhanced physical downlink control channel; wherein in a case that a second UL-DL configuration indicated by downlink control information which is transmitted on a physical downlink control channel is not set, a subframe is a special subframe in the first UL-DL configuration, in a case that the special subframe has a special subframe configuration 3, 4, or 8, candidates of the antenna port are antenna ports 107, 108, 109 and 110, in a case that the special subframe has a special subframe configuration 1, 2, 6, 7, or 9, candidates of the antenna port are antenna ports 107 and 109, in a case that the second UL-DL configuration is set, the subframe is a normal subframe in the second UL-DL configuration and candidates of the antenna port are antenna ports 107, 108, 109, and 110, and the special subframe is a subframe including three regions which are a Downlink Pilot Time Slot (DwPTS) region in which downlink transmission is performed, a guard period (GP), and an Uplink Pilot Time Slot (UpPTS) region in which uplink transmission is performed, in this order.

10. A communication method of a base station device, the method comprising:

setting a first Uplink-Downlink (UL-DL) configuration which is configured by using a common radio resource control (RRC) message; and setting an antenna port for an enhanced physical downlink control channel for localized transmission of the enhanced physical downlink control channel; wherein in a case that a second UL-DL configuration indicated by downlink control information which is transmitted on a physical downlink control channel is not set, a subframe is a special subframe in the first UL-DL configuration, in a case that the special subframe has a special subframe configuration 3, 4, or 8, candidates of the antenna port are antenna ports 107, 108, 109 and 110, in a case that the special subframe has a special subframe configuration 1, 2, 6, 7, or 9, candidates of the antenna port are antenna ports 107 and 109, in a case that the second UL-DL configuration is configured, the subframe is a normal subframe in the second UL-DL configuration and candidates of the antenna port are antenna ports 107, 108, 109, and 110, and the special subframe is a subframe including three regions which are a Downlink Pilot Time Slot (DwPTS) region in which downlink transmission is performed, a guard period (GP), and an Uplink Pilot Time Slot (UpPTS) region in which uplink transmission is performed, in this order.

\* \* \* \* \*